United States Patent
Depraete

(10) Patent No.: US 10,393,247 B2
(45) Date of Patent: Aug. 27, 2019

(54) HYDROKINETIC TORQUE COUPLING DEVICE WITH TORSIONAL VIBRATION DAMPER IN COMBINATION WITH TWO VIBRATION ABSORBERS

(71) Applicant: VALEO EMBRAYAGES, Amiens (FR)

(72) Inventor: Alexandre Depraete, Bloomfield, MI (US)

(73) Assignee: Valeo Embrayages, Amiens (FR)

( * ) Notice: Subject to any disclaimer, the term of this patent is extended or adjusted under 35 U.S.C. 154(b) by 476 days.

(21) Appl. No.: 15/161,858

(22) Filed: May 23, 2016

(65) Prior Publication Data

US 2017/0335937 A1    Nov. 23, 2017

(51) Int. Cl.
*F16H 45/02*    (2006.01)
*F16F 15/14*    (2006.01)

(52) U.S. Cl.
CPC .......... *F16H 45/02* (2013.01); *F16F 15/145* (2013.01); *F16H 2045/0221* (2013.01); *F16H 2045/0226* (2013.01); *F16H 2045/0263* (2013.01)

(58) Field of Classification Search
CPC ................. F16H 2045/0226; F16H 2045/0263
See application file for complete search history.

(56) References Cited

U.S. PATENT DOCUMENTS

| 4,844,216 | A | 7/1989 | Fukushima | |
| 9,068,624 | B2 * | 6/2015 | Verhoog | F16F 15/12 |
| 2012/0080281 | A1 * | 4/2012 | Takikawa | F16H 45/02 |
| | | | | 192/3.28 |

(Continued)

FOREIGN PATENT DOCUMENTS

| DE | 102011017661 A1 * | 11/2011 | .......... F16F 15/1315 |
| DE | 102012214680 | 4/2013 | |

(Continued)

OTHER PUBLICATIONS

DE 102011017661 A1 machine translation to English from espacenet. 2011.*

(Continued)

*Primary Examiner* — Michael Leslie
*Assistant Examiner* — Michael Quandt
(74) *Attorney, Agent, or Firm* — Berenato & White, LLC

(57) ABSTRACT

A hydrokinetic torque coupling device for coupling together driving and driven shafts, comprises a casing, impeller and turbine wheels, a torsional vibration damper, a turbine hub non-rotatably connected to the turbine wheel, and first and second vibration absorbers. Each of the first and second vibration absorbers is one of a dynamic absorber and a pendulum oscillator. The turbine hub is non-rotatably coupled to a driven member of the torsional vibration damper. The first vibration absorber is mounted to the turbine hub and the second vibration absorber is mounted to one of the turbine hub and the casing. The first vibration absorber and the second vibration absorber are tuned to address different orders of vibrations. The dynamic absorber includes an inertial member and a connecting plate coupled to the inertial member. The pendulum oscillator includes a support member and flyweights configured to oscillate relative to the support member.

13 Claims, 46 Drawing Sheets

(56) References Cited

U.S. PATENT DOCUMENTS

| | | |
|---|---|---|
| 2013/0206529 A1 | 8/2013 | Tomiyama |
| 2014/0048371 A1 | 2/2014 | Rossner |
| 2015/0337920 A1 | 11/2015 | Kawahara |
| 2015/0345565 A1 | 12/2015 | Tomiyama |
| 2016/0208885 A1 | 7/2016 | Takikawa et al. |

FOREIGN PATENT DOCUMENTS

| | | | |
|---|---|---|---|
| DE | 102012220278 A1 | 6/2013 | |
| DE | 2853773 A1 * | 4/2015 | ............ F16F 15/145 |
| DE | 102014207257 A1 | 10/2015 | |
| EP | 2600030 A2 | 6/2013 | |
| WO | WO2004018897 | 3/2004 | |
| WO | WO20120977988 | 7/2012 | |
| WO | WO2012146450 | 11/2012 | |
| WO | WO2012146451 | 11/2012 | |
| WO | WO2014123174 | 8/2014 | |
| WO | WO2014132906 | 9/2014 | |
| WO | WO2015056733 A1 | 4/2015 | |

OTHER PUBLICATIONS

EP 2853773 A1 machine translation to English from espacenet. 2015.*

* cited by examiner

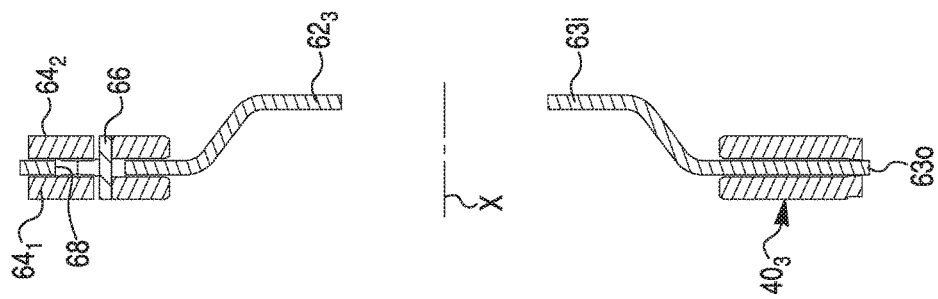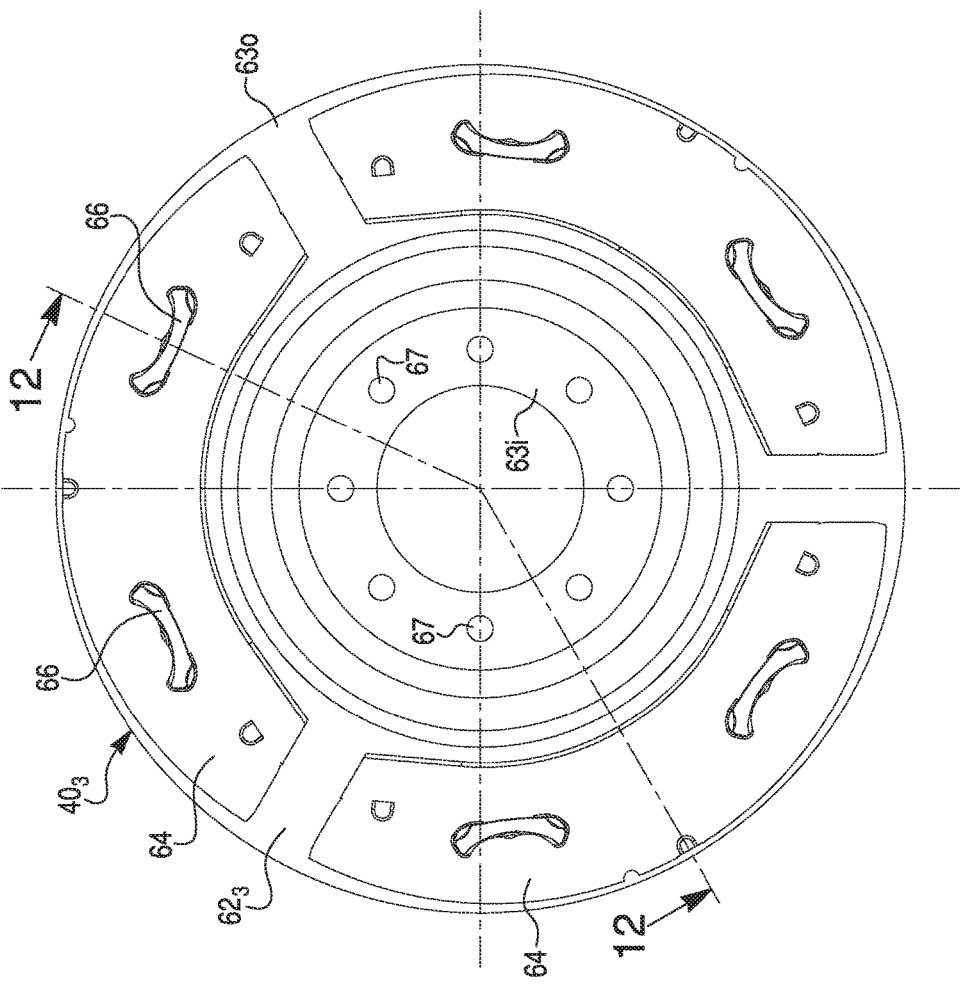

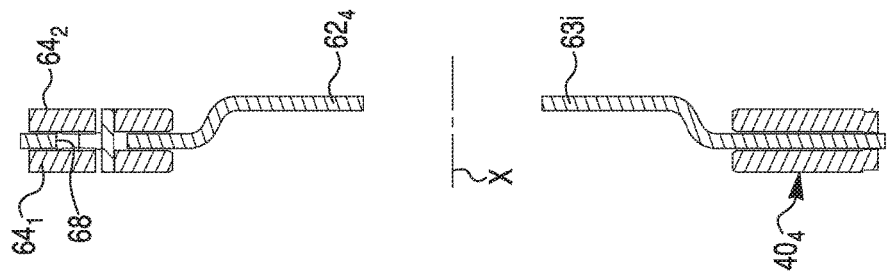
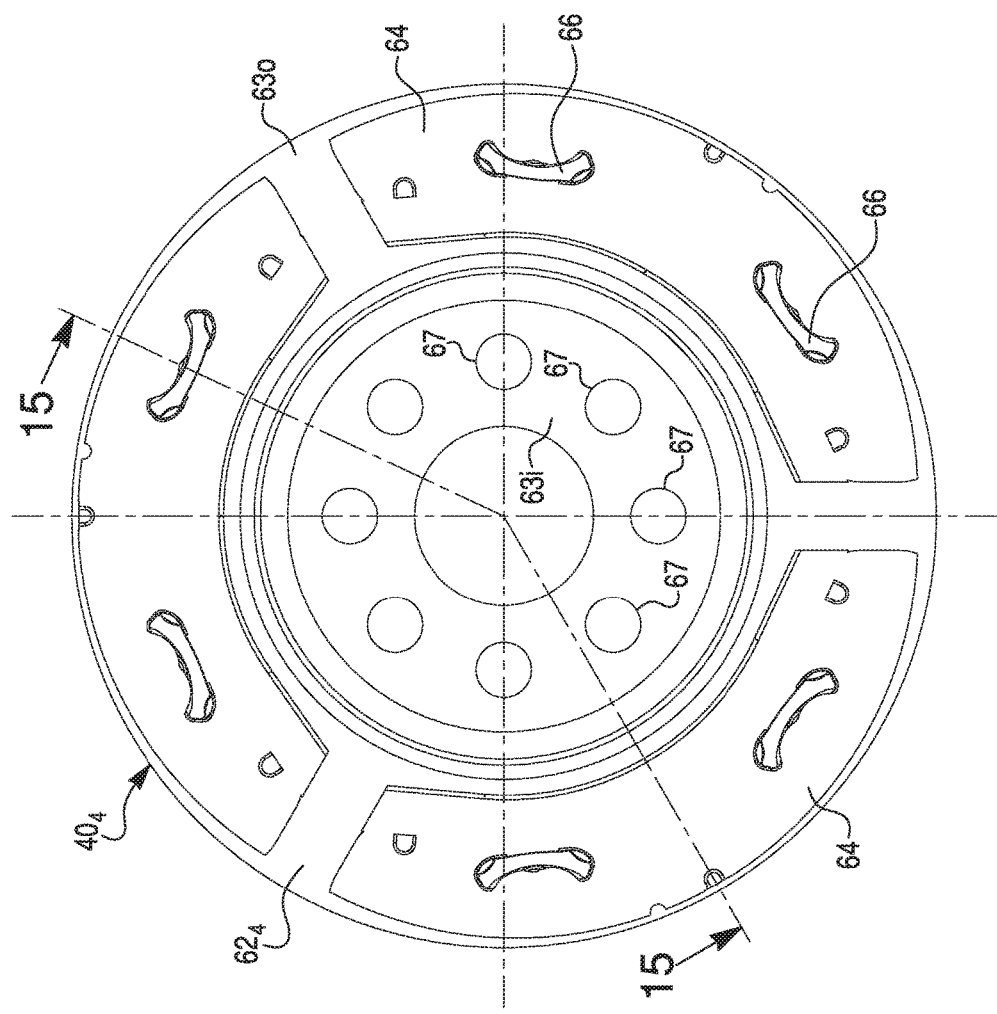

FIG. 45

HYDROKINETIC TORQUE COUPLING DEVICE WITH TORSIONAL VIBRATION DAMPER IN COMBINATION WITH TWO VIBRATION ABSORBERS

BACKGROUND OF THE INVENTION

1. Field of the Invention

The present invention generally relates to hydrokinetic torque coupling devices, and more particularly to hydrokinetic torque coupling devices with torsional vibration dampers and combinations with two vibration absorbers tuned to address different orders of vibrations.

2. Background of the Invention

An internal combustion engine exhibits irregularities (vibrations) due to the succession of combustion events in the engine cylinders. The vibrations preferably are damped before they enter the transmission and produce what may be considered unacceptably troublesome noise. To accomplish damping, it is known to interpose a torsion damping device between a drive shaft and a transmission (or driven) shaft. Torsion damping devices allow these irregularities to be filtered before the drive torque is transmitted to an automotive transmission. The torsion damping device is typically arranged in a hydrokinetic torque coupling device that allows temporary rotational connection of the drive shaft to the transmission shaft.

Normally, a hydrokinetic torque coupling device includes a hydrodynamic torque converter and a torsion damping device positioned between an axially oriented coaxial drive shaft and a driven shaft of the automotive transmission. A torque converter of this kind typically has a rotating casing that is capable of transmitting drive torque to the torsion damping device by means of a friction locking clutch, traditionally called a lock-up clutch. The torque converter also usually has a turbine wheel mounted rotatably inside the casing.

The torsion damping device includes a torque input element and a torque output element, and frequently circumferentially acting elastic members. The circumferentially acting elastic members are interposed between the torque input element and the torque output element. In so-called "long travel" damping devices, the elastic members are mounted, in groups of at least two elastic members, in series between the input element and output element.

For some applications, the torsion damping device may also include a dynamic absorber (or dynamic damper) having a heavy inertia member. A dynamic absorber having a heavy inertia member is arranged around the rotation axis of the engine shaft and is free to oscillate around an axis substantially parallel to the rotation axis of the engine shaft. The dynamic absorber is provided to lower a resonance frequency at low rotational speed of the engine and further improve the vibration damping performance. When, for example, a 3-cylinder engine goes to a deactivated cylinder mode (i.e., when one cylinder is deactivated), it generates a specific acyclic behavior. For a 3-cylinder engine, which is deactivated to 2 cylinders, the best solution is a dynamic damper without hysteresis. However, the dynamic damper requires a lot of space because of the needed inertia. Then, an outer damper of a torsion damping device (torsional vibration damper) has to be reduced in size or removed.

While hydrokinetic torque coupling devices and torsion damping devices or torsion damping devices with dynamic absorbers, including but not limited to those discussed above, have proven to be acceptable for vehicular driveline applications and conditions, improvements that may enhance their performance and cost are possible.

BRIEF SUMMARY OF THE INVENTION

According to a first aspect of the invention, there is provided a hydrokinetic torque coupling device for coupling together a driving shaft and a driven shaft. The hydrokinetic torque coupling device of the present invention comprises a hollow casing, an impeller wheel coaxially aligned with a rotation axis, a turbine wheel coaxially aligned with and drivable by the impeller wheel, a torsional vibration damper, a turbine hub non-rotatably connected to the turbine wheel, and first and second vibration absorbers. Each of the first and second vibration absorbers is one of a dynamic absorber and a centrifugal pendulum oscillator. The torsional vibration damper comprises a first retainer plate rotatable about the rotation axis, a driven member rotatable relative to the first retainer plate coaxially with the rotation axis, and a plurality of damper elastic members interposed between the first retainer plate and the driven member. The damper elastic members elastically couple the first retainer plate to the driven member. The turbine hub is non-rotatably coupled to the driven member of the torsional vibration damper. The first vibration absorber is mounted to the turbine hub and the second vibration absorber is mounted to one of the turbine hub and the casing. The first vibration absorber and the second vibration absorber are tuned to address different orders of vibrations. The dynamic absorber includes an inertial member and a connecting plate coupled to the inertial member. The centrifugal pendulum oscillator includes a support member and at least one pair of first and second flyweights configured to oscillate with respect to the support member in a rotation plane orthogonal to the rotation axis. The first and second flyweights are mounted on axially opposite sides of the support member and connected axially to one another.

According to a second aspect of the present invention, there is provided an internal combustion engine in combination with a hydrokinetic torque coupling device. The engine comprises a driving shaft rotatable about a rotation axis. The torque coupling device of the present invention is configured for drivingly coupling together the driving shaft and a driven shaft. The torque coupling device comprises a hydrodynamic torque converter including a hollow casing non-rotatably coupled to the driving shaft, an impeller wheel coaxial with the rotation axis and a turbine wheel coaxial with and drivable by the impeller wheel, a torsional vibration damper, a turbine hub non-rotatably connected to the turbine wheel, and first and second vibration absorbers. Each of the first and second vibration absorbers is one of a dynamic absorber and a centrifugal pendulum oscillator. The torsional vibration damper comprises a first retainer plate rotatable about the rotation axis, a driven member rotatable relative to the first retainer plate coaxially with the rotation axis, and a plurality of damper elastic members interposed between the first retainer plate and the driven member. The damper elastic members elastically couple the first retainer plate to the driven member. The turbine hub is non-rotatably coupled to the driven member of the torsional vibration damper. The turbine wheel, the turbine hub, the torsional vibration damper and the first vibration absorber are disposed within the casing. The first vibration absorber is mounted to the turbine hub and the second vibration absorber is mounted to one of the turbine hub, the casing and the driving shaft. The first vibration absorber and the second vibration absorber are tuned to address different orders of vibrations. The dynamic absorber includes an inertial member and a connecting plate coupled to the inertial member. The centrifugal pendulum oscillator includes a support member and at least one pair of first and second flyweights configured to oscillate with respect to the support member in a rotation plane orthogonal to the rotation axis. The first and second flyweights are mounted axially on axially opposite sides of the support member and connected axially to one another.

According to a third aspect of the invention, there is provided a method for assembling a hydrokinetic torque coupling device for coupling together a driving shaft and a driven shaft. The method of the present invention comprises the steps of providing a casing including a first casing shell and a second casing shell, providing a turbine wheel, an impeller wheel and a turbine hub, providing a preassembled torsional vibration damper, and providing preassembled first and second vibration absorbers. Each of the first and second vibration absorbers is one of a dynamic absorber and a centrifugal pendulum oscillator. The first vibration absorber and the second vibration absorber are tuned to address different orders of vibrations. The method of the present invention further comprises the steps of non-rotatably connecting the turbine hub to the turbine wheel, mounting the first vibration absorber to the turbine hub, mounting the second vibration absorber to one of the turbine hub and the second casing shell, and fixedly securing the first casing shell to the second casing shell.

Other aspects of the invention, including apparatus, devices, systems, converters, processes, and the like which constitute part of the invention, will become more apparent upon reading the following detailed description of the exemplary embodiments.

BRIEF DESCRIPTION OF THE SEVERAL VIEWS OF THE DRAWING(S)

The accompanying drawings are incorporated in and constitute a part of the specification. The drawings, together with the general description given above and the detailed description of the exemplary embodiments and methods given below, serve to explain the principles of the invention. The objects and advantages of the invention will become apparent from a study of the following specification when viewed in light of the accompanying drawings, in which like elements are given the same or analogous reference numerals and wherein:

FIG. 11 is a front plan view of the centrifugal pendulum oscillator of the torsional vibration damper assembly in accordance with the third exemplary embodiment of the present invention;

FIG. 12 is a cross-sectional half-view of the centrifugal pendulum oscillator in accordance with the third exemplary embodiment of the present invention taken along the line 12-12 in FIG. 11;

FIG. 14 is a front plan view of the centrifugal pendulum oscillator of the torsional vibration damper assembly in accordance with the fourth exemplary embodiment of the present invention;

FIG. 15 is a cross-sectional half-view of the centrifugal pendulum oscillator in accordance with the fourth exemplary embodiment of the present invention taken along the line 15-15 in FIG. 14;

FIG. 45 is a fragmented half-view in axial section of a hydrokinetic torque coupling device in accordance with a nineteenth exemplary embodiment of the present invention;

Figure 47:
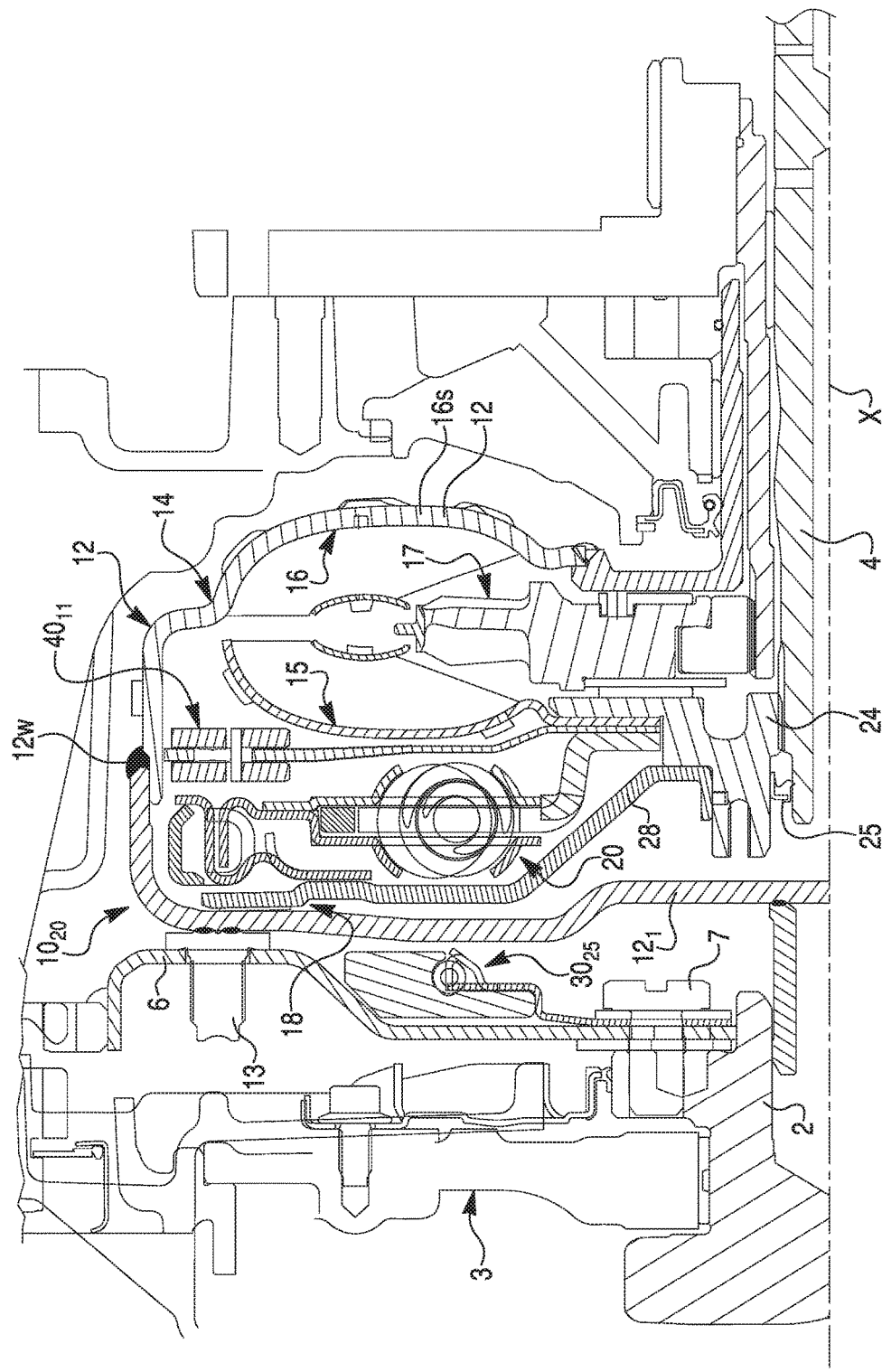
Figure 48:
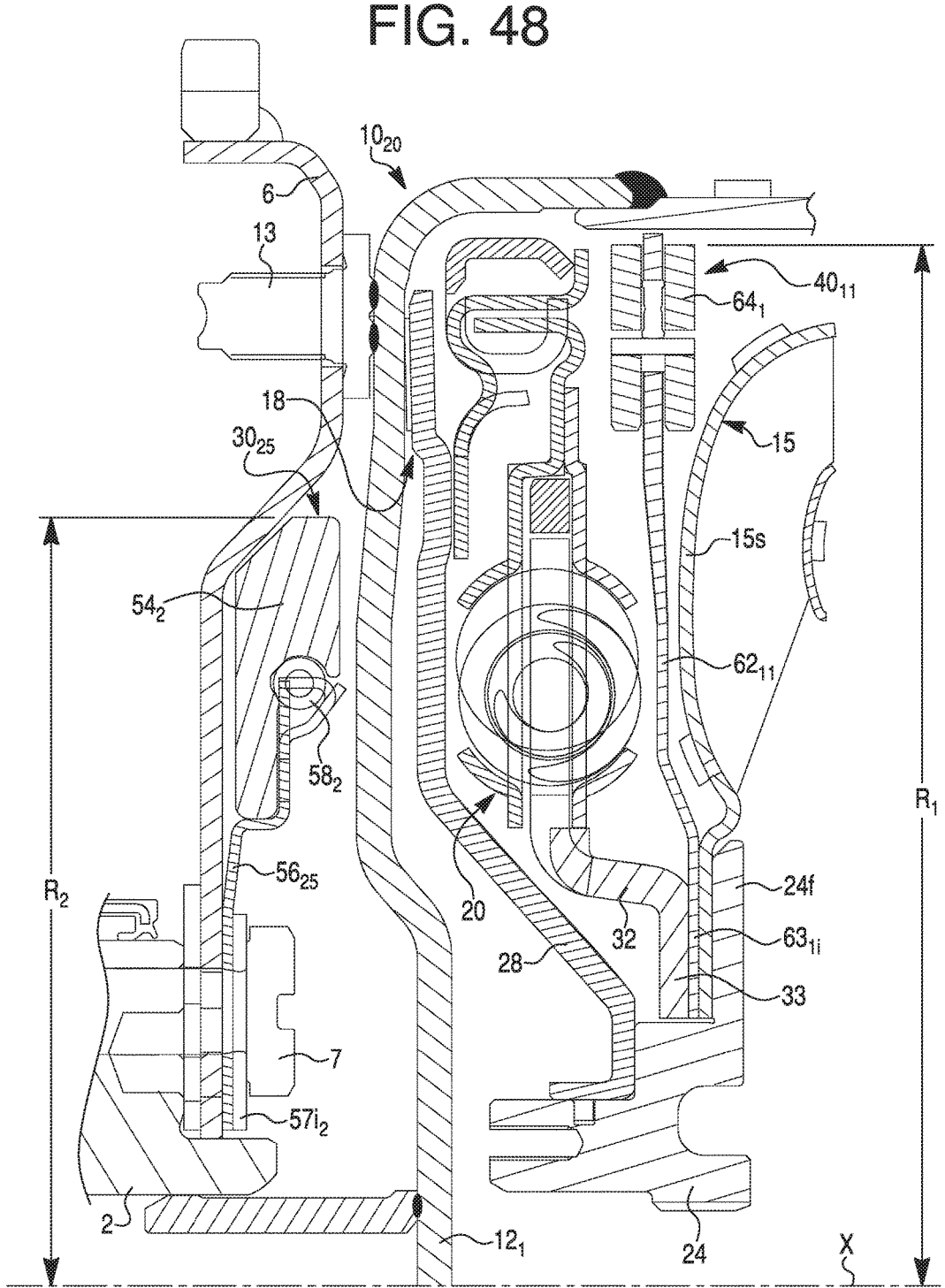

FIG. 47 is a fragmented half-view in axial section of a hydrokinetic torque coupling device in accordance with a twentieth exemplary embodiment of the present invention; and FIG. 48 is a fragmentary cross-sectional half-view of a torsional vibration damper and first and second vibration absorbers of the hydrokinetic torque coupling device in accordance with the twentieth exemplary embodiment of the present invention.

DETAILED DESCRIPTION OF EXEMPLARY EMBODIMENT(S) AND EMBODIED METHOD(S) OF THE INVENTION

Reference will now be made in detail to exemplary embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in connection with the exemplary embodiments and methods.

This description of exemplary embodiments is intended to be read in connection with the accompanying drawings, which are to be considered part of the entire written description. In the description, relative terms such as "horizontal," "vertical," "up," "down," "upper", "lower", "right", "left", "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship. Additionally, the word "a" and "an" as used in the claims means "at least one" and the word "two" as used in the claims means "at least two".

Figure 1:
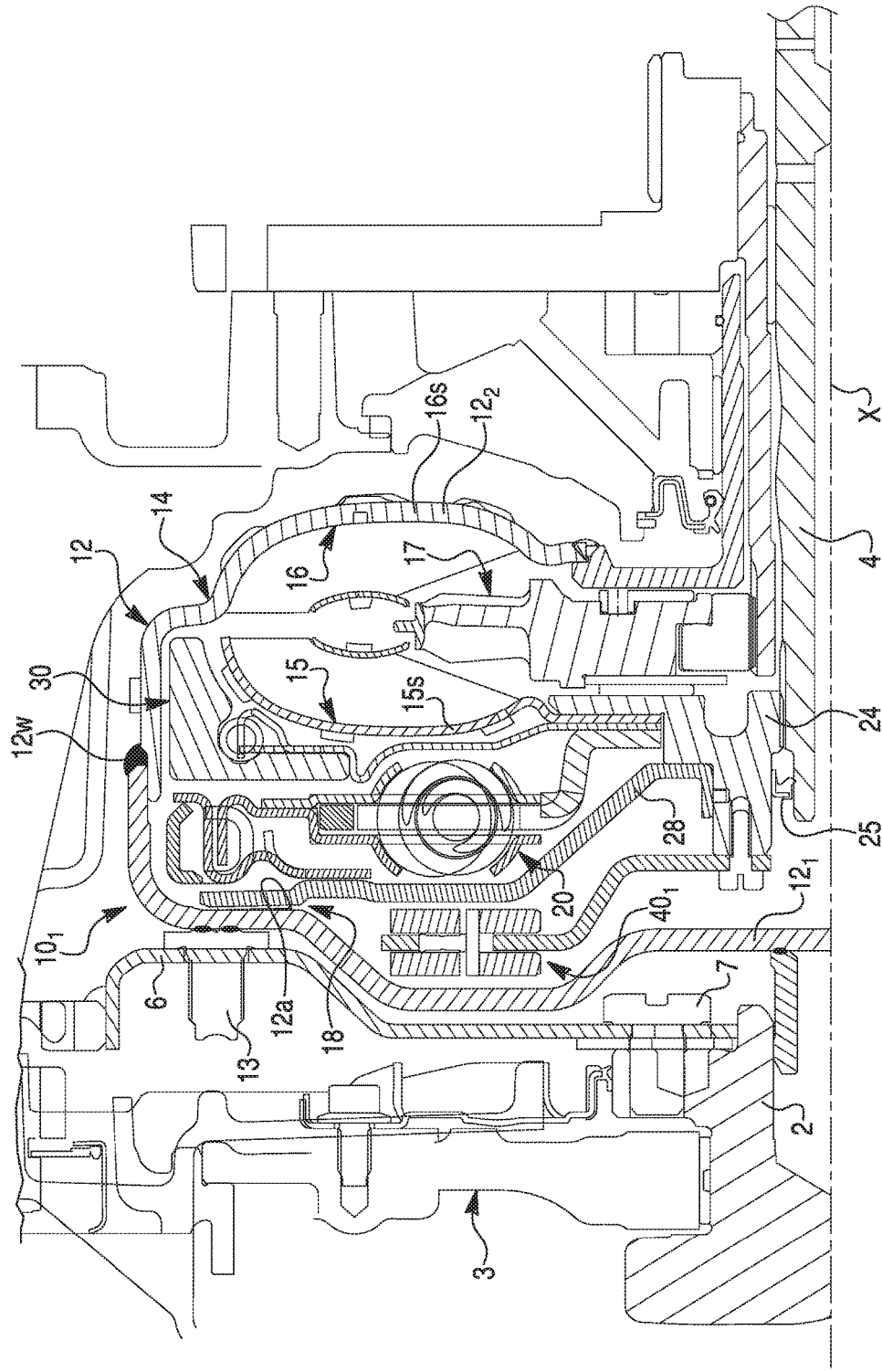
FIG. 1 is a fragmented half-view in axial section of a hydrokinetic torque coupling device in accordance with a first exemplary embodiment of the present invention.

A first exemplary embodiment of a hydrokinetic torque coupling device is generally represented in the accompanying drawings by reference numeral $10_1$, as best shown in the fragmentary sectional view in FIG. 1. The hydrokinetic torque coupling device $10_1$ is operable in known manner to fluidly couple a driving shaft 2 and a driven shaft 4 of a motor vehicle, such as of an automobile. In the typical case, the driving shaft 2 is an output shaft (or crankshaft) of an internal combustion engine 3 of the motor vehicle and the driven shaft 4 is connected to an automatic transmission of the motor vehicle. The internal combustion engine 3 also conventionally includes a flexplate 6 non-rotatably coupled (i.e., fixed) to the driving shaft 2. The term "flexplate" (or "flex plate") is known in the automotive art as a metal disk that connects the output from an engine to the input of a hydrokinetic torque coupling device in a vehicle equipped with an automatic transmission. It takes the place of the flywheel found in a conventional manual transmission setup. Like flywheels, flexplates normally may couple to a starter motor via teeth formed along an outer edge of the flexplate.

The hydrokinetic torque coupling device $10_1$ comprises a sealed casing 12 filled with oil and rotatable about a rotation axis X. The hydrokinetic torque coupling device $10_1$ further comprises a hydrodynamic torque converter 14, a lock-up clutch 18, a torsional vibration damper 20, a first vibration absorber in the form of a dynamic absorber 30 (also referred to herein as a dynamic damper) and a second vibration absorber in the form of a centrifugal pendulum oscillator $40_1$ (also referred to herein as a pendulum oscillator), all disposed in the sealed casing 12. Each of the torsional vibration damper 20, the dynamic absorber 30 and the centrifugal pendulum oscillator $40_1$ is mounted to the torque converter 14. Hereinafter the axial and radial orientations are considered with respect to the rotation axis X of the torque coupling device $10_1$.

According to the present invention, the first vibration absorber 30 and the second vibration absorber $40_1$ are tuned to address different orders or frequency ranges of vibrations.

It should be understood that the term "order of vibration" refers to a frequency that is a multiple of a reference rotational speed. In other words, an order is the normalization of the rotational speed. The first order is the rotational speed, a frequency equal to twice the rotational frequency corresponds to an order of two, and order n is n times the rotational speed. Order components thus are the harmonics of the rotational speed.

The dynamic damper 30 filters a frequency and an order of vibration, while the pendulum oscillator $40_1$ filters an order of vibration. According to the first exemplary embodiment of the present invention, the pendulum oscillator $40_1$ is tuned for an order 1.5 (3 cylinder mode of a 3 cylinder engine), the dynamic damper 30 is specifically tuned for the order 0.75 or 0.5 by changing the weight of the oscillator when one cylinder (of the 3 cylinder engine) is deactivated (cylinder deactivation mode) and the 3 cylinder engine generates a specific acyclic behavior unique to a three cylinder engine. Other engines likewise have a unique acyclic behavior. The pendulum oscillator $40_1$ compensates and filters the remaining vibration that the torsional vibration damper 20 is not able to filter. Thus, by selecting and/or tuning the pendulum oscillator $40_1$ and the dynamic damper 30 for specific engine applications, the NVH (noise, vibration and harshness) characteristics of a particular engine can be significantly improved.

The sealed casing 12, the torque converter 14, the lock-up clutch 18, the torsional vibration damper 20, the dynamic absorber 30 and the centrifugal pendulum oscillator $40_1$ are all rotatable about the rotation axis X. The sealed casing 12 according to the present invention as illustrated in FIG. 1 includes a first casing shell $12_1$ and a second casing shell $12_2$ disposed coaxially with and axially opposite to the first casing shell $12_1$. The first and second casing shells $12_1$, $12_2$ are non-movably (i.e., fixedly) interconnected sealingly together, such as by weld $12w$ at their outer peripheries. The first casing shell $12_1$ is non-movably (i.e., fixedly) connected to the driving shaft 2, more typically to the flexplate 6 that is non-rotatably fixed to the driving shaft 2, so that the casing 12 turns at the same speed at which the engine operates for transmitting torque. Specifically, in the illustrated embodiment of FIG. 1 the casing 12 is rotatably driven by the internal combustion engine 3 and is non-rotatably coupled to the flexplate 6 thereof with stud bolts 13. As best shown in FIG. 1, the stud bolts 13 are fixedly secured, such as by welding, to the first casing shell $12_1$. Each of the first and second casing shells $12_1$, $12_2$ may be made, for example, integrally by press-forming one-piece metal sheets.

The torque converter 14 comprises a turbine wheel 15, an impeller wheel 16, and a reactor (or stator) 17 interposed axially between the turbine wheel 15 and the impeller wheel 16. The turbine wheel 15 includes a substantially semi-toroidal turbine shell $15s$, as best shown in FIGS. 1 and 2. The impeller wheel 16 includes a substantially semi-toroidal impeller shell $16s$, as best shown in FIG. 1. As further shown in FIG. 1, at least a portion of the second casing shell 122 of the casing 12 forms and serves as the impeller shell $16s$ of the impeller wheel 16. Accordingly, the impeller shell $16s$ is also referred to as the second casing shell $12_2$, while the first casing shell $12_1$ is also referred to as a cover shell.

The torque converter 14 of the torque coupling device $10_1$ also includes a substantially annular turbine (or output) hub 24 rotatable about the rotation axis X, which is arranged to non-rotatably couple together the driven shaft 4 and the turbine wheel 15. The turbine hub 24, as best shown in FIG. 2, has an integrally formed and radially outwardly extending flange $24f$.

The turbine shell 15s of the turbine wheel 15 is non-movably (i.e., fixedly) secured to the flange 24f of the turbine hub 24 by appropriate means, such as by rivets or welding. The turbine hub 24 has internal splines and is non-rotatably coupled to the driven shaft 4, such as an input shaft of the automatic transmission of the motor vehicle, which is provided with complementary external splines. Alternatively, a weld or other connection may be used to fix (i.e., non-movably secure) the turbine hub 24 to the driven shaft 4. The turbine hub 24 is rotatable about the rotation axis X and is coaxial with the driven shaft 4 so as to center the turbine wheel 15 on the driven shaft 4. A sealing member 25 (shown in FIG. 1), mounted to a radially inner peripheral surface of the turbine hub 24, creates a seal at the interface of the transmission input shaft 4 and the turbine hub 24.

The lock-up clutch 18 is provided for selectively locking the driving and driven shafts 2 and 4, respectively. The lock-up clutch 18 is generally activated after starting of the motor vehicle and after hydraulic coupling of the driving and driven shafts 2 and 4, in order to avoid the loss of efficiency caused in particular by slip phenomena between the turbine wheel 15 and the impeller wheel 16. Specifically, the lock-up clutch 18 is provided to bypass the turbine wheel 15 when in a locked position. When the lock-up clutch 18 is in the locked (engaged) position, the engine torque is transmitted by the casing 12 to the turbine hub 24 through the torsional vibration damper assembly 20.

The lock-up clutch 18 includes a substantially annular locking piston 28, including an annular friction liner 29 fixedly attached to an axially outer surface of the locking piston 28 that faces a substantially radial locking wall 12a of the casing 12 by appropriate means known in the art, such as by adhesive bonding. As best shown in FIG. 2, the friction liner 29 is fixedly attached to the axially outer surface of the locking piston 28 at a radially outer peripheral end thereof. The locking piston 28 is slidably mounted to the turbine hub 24 for axially reciprocating movement thereon. The locking piston 28 is axially displaceable toward (the locked (or engaged) position of the lock-up clutch 18) and away (an open (or disengaged) position of the lock-up clutch 18) from the locking wall 12a inside the casing 12. Moreover, the locking piston 28 is axially displaceable away from (the engaged (or locked) position of the lock-up clutch 18) and toward (the disengaged (or open) position of the lock-up clutch 18) the turbine hub 24. A radially outer surface of the turbine hub 24 includes an annular slot 26 for receiving a sealing member 27, such as an O-ring, as best shown in FIG. 2. The locking piston 28 is mounted to slidingly engage the turbine hub 24 (which is splined with or mounted on the driven shaft 4) with the sealing member 27 therebetween.

The torsional vibration damper 20, the dynamic absorber 30 and the centrifugal pendulum oscillator $40_1$ advantageously allow the impeller wheel 16 of the torque converter 14 to be coupled, with torque damping, to the turbine hub 24, and thus to the input shaft 4 of the automatic transmission. The torsional vibration damper 20, the dynamic absorber 30 and the centrifugal pendulum oscillator $40_1$ also allow damping of stresses between a first (or drive) shaft 2 and a second (or driven) shaft 4 that are coaxial with the rotation axis X, with torsion damping.

The torsional vibration damper 20, as best shown in FIGS. 1 and 2, is disposed between the turbine hub 24 that is fixedly (i.e., non-movably) connected with the turbine shell 15s of the turbine wheel 15, and the locking piston 28 of the lock-up clutch 18. Moreover, the locking piston 28 of the lock-up clutch 18 is rotatably coupled to the turbine wheel 15 and the turbine hub 24 by the torsional vibration damper 20. The torsional vibration damper 20 is arranged on the turbine hub 24 in a limited, movable and centered manner. The turbine hub 24 forms an output part of the torsional vibration damper 20 and a driven side of the torque coupling device $10_1$, and is splined with the driven shaft 4. The locking piston 28, on the other hand, forms an input part of the torsional vibration damper 20.

Figure 2A:
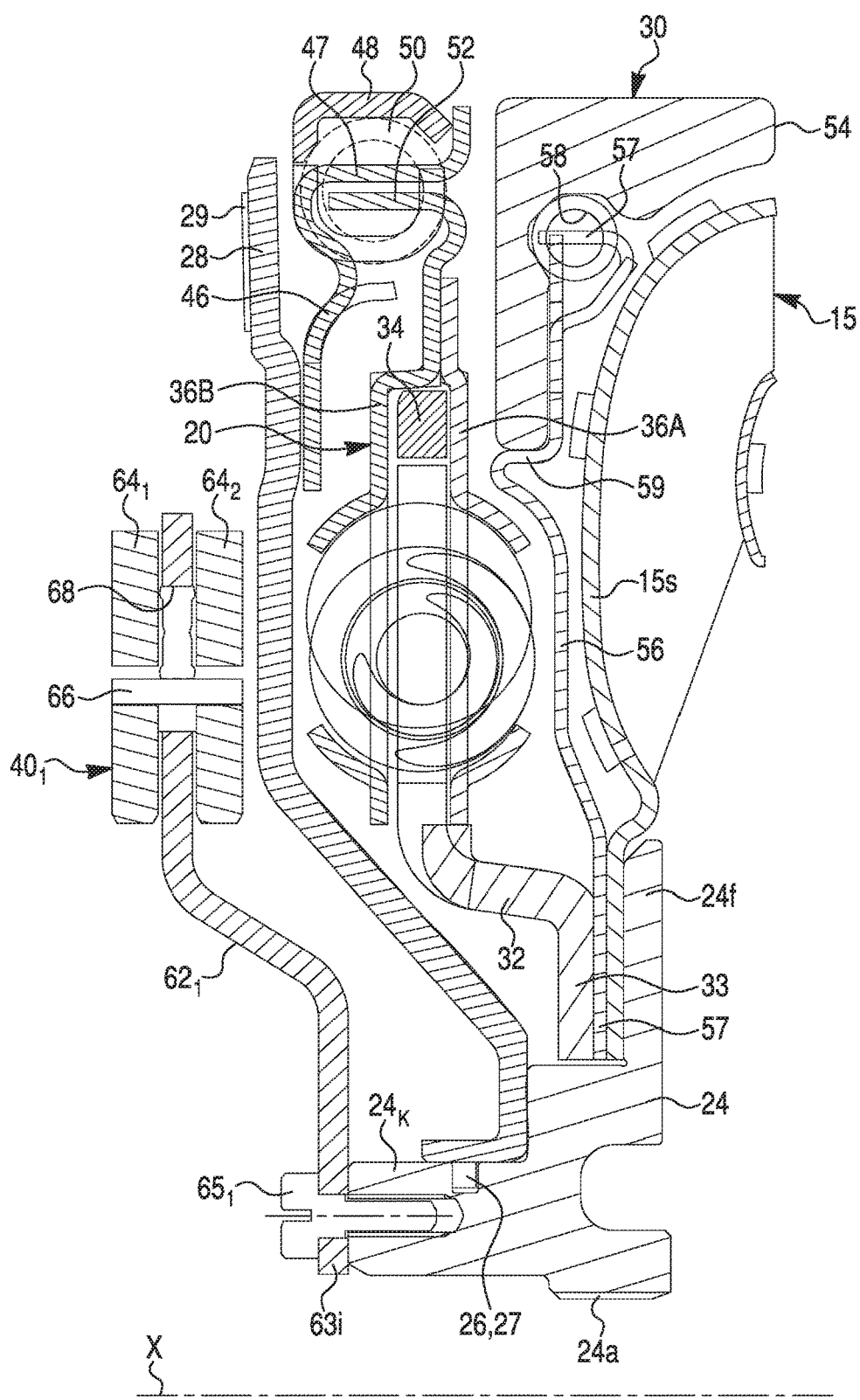
FIG. 2A is a fragmentary cross-sectional half-view of a torsional vibration damper, a dynamic absorber and a centrifugal pendulum oscillator of the hydrokinetic torque coupling device in accordance with the first exemplary embodiment of the present invention.
Figure 2B:
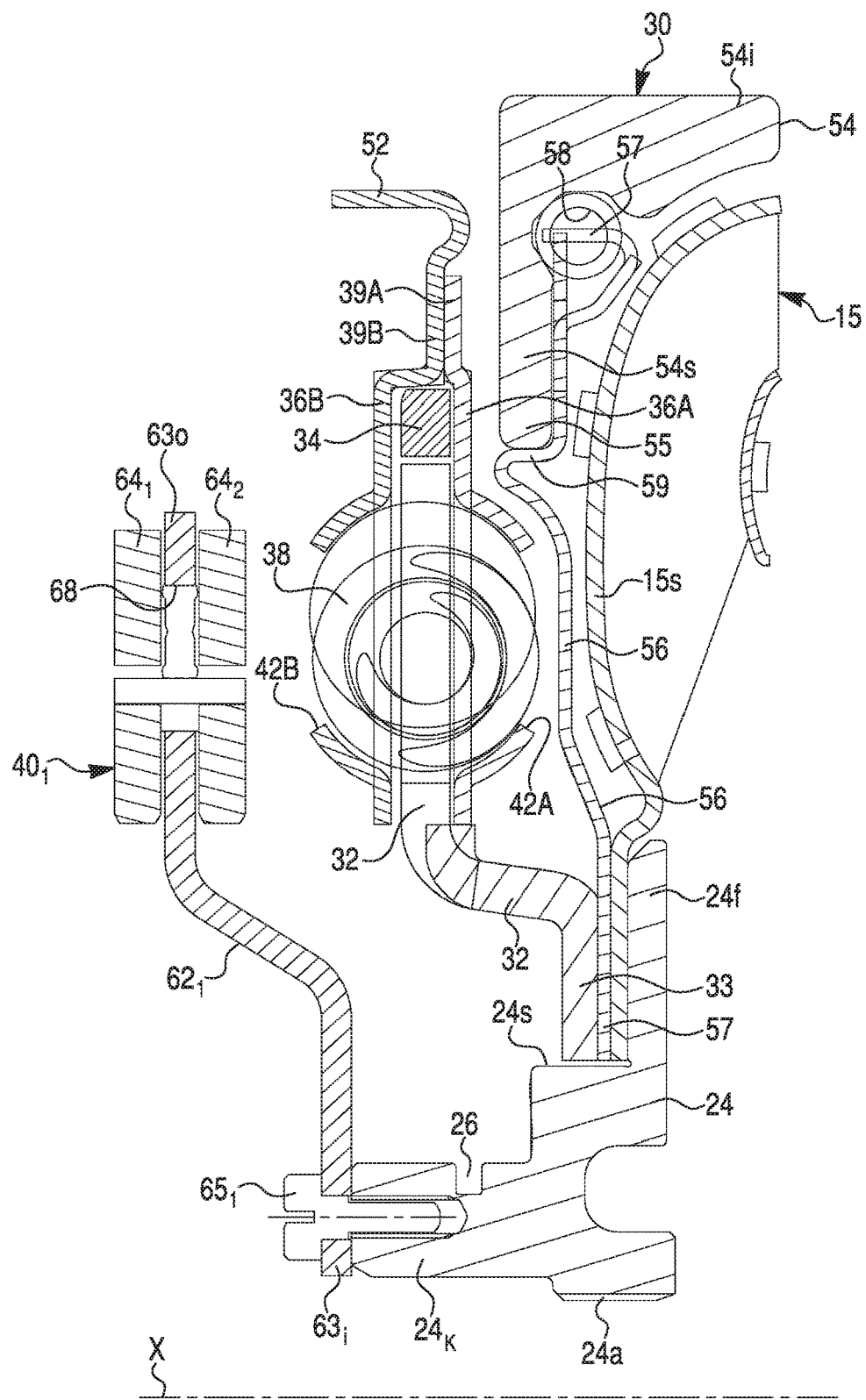
FIG. 2B is a partial fragmentary cross-sectional half-view of the torsional vibration damper, the dynamic absorber and the centrifugal pendulum oscillator of the hydrokinetic torque coupling device in accordance with the first exemplary embodiment of the present invention shown without a locking piston of a lock-up clutch.

The dynamic absorber 30, as best shown in FIG. 1, is disposed between the turbine hub 24 that is fixedly (i.e., non-movably) connected with the turbine shell 15s of the turbine wheel 15, and the torsional vibration damper 20. Moreover, the dynamic absorber 30, as best shown in FIGS. 1 and 2B, is disposed axially between the turbine shell 15s and the torsional vibration damper 20. Also, the torsional vibration damper 20, as best shown in FIGS. 1 and 2A, is disposed axially between the dynamic absorber 30 and the locking piston 28.

The centrifugal pendulum oscillator $40_1$, as best shown in FIGS. 1 and 2, is disposed between the turbine hub 24 and the first casing shell $12_1$ of the casing 12. Also, the centrifugal pendulum oscillator $40_1$, as best shown in FIGS. 1 and 2, is disposed axially between the first casing shell $12_1$ and the locking piston 28.

During vehicle operation, when the lock-up clutch 18 is in the disengaged (open) position, the engine torque is transmitted by the turbine wheel 15 of the torque converter 14 from the impeller wheel 16 to the turbine hub 24 through the dynamic absorber 30 and the centrifugal pendulum oscillator $40_1$ only, bypassing the torsional vibration damper 20. However, when the lock-up clutch 18 is in the engaged (locked) position, the engine torque is transmitted by the casing 12 to the turbine hub 24 through the torsional vibration damper 20, as well as through the dynamic absorber 30 and the centrifugal pendulum oscillator $40_1$.

As best shown in FIGS. 1 and 2, each of the torsional vibration damper 20, the dynamic absorber 30 and the pendulum oscillator $40_1$ is operatively coupled to the turbine wheel 15 and the turbine hub 24 of the torque converter 14.

As best shown in FIGS. 2A and 2B, the torsional vibration damper 20 comprises a substantially annular driven member 32 fixedly (i.e., non-movably) secured to the turbine hub 24, and a substantially annular intermediate member 34 mounted about the driven member 32 and rotatably moveable relative thereto. The driven member 32, as best shown in FIGS. 2A and 2B, has an integrally formed and radially inwardly extending flange 33. The flange 33 of the driven member 32 is fixedly (i.e., non-movably) secured to the flange 24f of the turbine hub 24 by appropriate means, such as by the rivets or welding. Thus, the turbine shell 15s of the turbine wheel 15 is fixedly secured to both the turbine hub 24 and the driven member 32 of the torsional vibration damper 20 by appropriate means, such as by the rivets or welding. The driven member 32 constitutes an output member of the torsional vibration damper 20.

The torsional vibration damper 20 further comprises a substantially annular first retainer plate 36A, a substantially annular second retainer plate 36B disposed axially opposite the first retainer plate 36A, and a plurality of circumferentially acting damper elastic members (or torque transmitting elements) 38 (also referred to herein as radially inner (or first) damper elastic members) disposed in series relative to each other between the driven member 32 and the first and second retainer plates 36A, 36B, as best shown in FIGS. 2A and 2B. The first and second retainer plates 36A, 36B are mounted adjacent to axially opposite sides (surfaces) of the driven member 32 and the intermediate member 34 so as to be oriented parallel to each other and coaxially with the rotation axis X. The first and second retainer plates 36A, 36B are non-movably (i.e., fixedly) secured to one another by appropriate means, such as by fasteners or welding, so as to be rotatable relative to the driven member 32. Thus, the first and second damper retainer plates 36A, 36B are non-rotatable relative to one another, but rotatable relative to the driven member 32 and the intermediate member 34. Each of the damper elastic members 38 is disposed circumferentially in series between the driven member 32 and the first and second damper retainer plates 36A, 36B. Specifically, the damper elastic members 38 are interposed between the first and second damper retainer plates 36A, 36B and the intermediate member 34, and between the intermediate member 34 and the driven member 32 in series.

According to the first exemplary embodiment of the present invention, the damper elastic members 38 are identical to each other. In non-limiting fashion, the torsional vibration damper 20 according to the exemplary embodiment of the present invention has six damper elastic members 38. Further according to the present invention, each of the damper elastic members 38 is in the form of helical (or coil) spring having a principal axis oriented substantially circumferentially. Furthermore according to the first exemplary embodiment of the present invention, each of the damper elastic members 38 includes only one coaxial helical spring. Alternatively, each of the damper elastic members 38 may include a pair of coaxial helical springs. Specifically, each of the damper elastic members 38 may include an external large-diameter spring and an internal small-diameter spring, arranged coaxially so that the internal spring is disposed within the external spring.

Moreover, the first and second retainer plates 36A, 36B are arranged axially on either side of the damper elastic members 38 and are operatively connected therewith. The first and second retainer plates 36A, 36B are non-movably (i.e., fixedly) secured to one another by appropriate means, such as by rivets or welding, so as to be rotatable relative to the driven member 32. Thus, the first and second retainer plates 36A, 36B are non-rotatable relative to one another, but rotatable relative to the driven member 32 and the intermediate member 34. Each of the damper elastic members 38 is disposed circumferentially between the driven member 32 and the intermediate member 34.

According to the first exemplary embodiment of the present invention as best illustrated in FIG. 2B, the first retainer plate 36A has a substantially annular outer mounting flange 39A provided with a plurality of circumferentially spaced holes. The second retainer plate 36B, on the other hand, has a substantially annular outer mounting flange 39B provided with a plurality of circumferentially spaced holes. The first and second retainer plates 36A, 36B are non-movably (i.e., fixedly) secured to one another so that the outer mounting flanges 39A, 39B of the first and second retainer plates 36A, 36B engage axially opposite surfaces through rivets extending through the holes in the outer mounting flanges 39A, 39B of the first and second damper retainer plates 36A, 36B. Thus, the first and second retainer plates 36A, 36B are non-rotatable relative to one another, but rotatable relative to the driven member 32 and the intermediate member 34.

According to the first exemplary embodiment of the present invention, as best shown in FIG. 2B, each of the first and second retainer plates 36A, 36B is preferably a stamped integral member of suitable metallic construction, e.g., made of a single or unitary component, but may be separate components fixedly connected together.

Each of the first and second retainer plates 36A, 36B is provided with a plurality of circumferentially extending windows (or window-shaped openings) 42A, 42B, respectively, each of which is arranged in correspondence with a pair of the elastic damping members 38, as best depicted in FIG. 2B. The windows 42A, 42B are separated circumferentially from one another.

The torsional vibration damper 20 further comprises a substantially annular drive member 46 and a substantially annular connecting member 48 rotatably coupled to the drive member 46 (as best shown in FIG. 2A). The driven member 32 is rotatably moveable relative to both the drive member 46 and the connecting member 48. The drive member 46 constitutes an input member of the torsional vibration damper 20, while the driven member 32 constitutes an output member of the torsional vibration damper 20. As best shown in FIGS. 1 and 2A, the drive member 46, the connecting member 48 and the annular driven member 32 are coaxial with each other and rotatable about the rotation axis X. The drive member 46 is non-movably (i.e., fixedly) secured to the locking piston 28 by appropriate means, such as by rivets or welding. The driven member 32 is operatively associated with the turbine wheel 15 and coaxial with the turbine hub 24. The turbine shell 15s of the turbine wheel 15 is fixedly secured to both the turbine hub 24 and the driven member 32 by any appropriate means, such as by the rivets or welding.

The annular drive member 46 includes external (or peripheral), radially outwardly extending driving tabs (or abutment elements) 47 circumferentially equidistantly disposed about an outer periphery thereof, as best shown in FIG. 2A. The drive member 46 with the driving tabs 47 is preferably an integral part, e.g., made of a single or unitary component, but may be separate components fixedly connected together. Preferably, the driving tabs 47 are integrally press-formed on the drive member 46 so as to be equiangularly spaced from each other.

The connecting member 48 includes internal, radially inwardly extending tabs (or abutment elements) circumferentially equiangularly disposed about an inner periphery thereof. The connecting member 48 is preferably a stamped member of suitable metallic construction with the inwardly extending tabs preferably being an integral part, e.g., made of a single or unitary component, but may be separate components fixedly connected together. Preferably, the inwardly extending tabs are integrally press-formed on the connecting member 48 so as to be equiangularly spaced from each other.

The torsional vibration damper 20 further comprises a plurality of ancillary damper elastic members (or torque transmitting elements) 50 (also referred to herein as radially outer (or second) damper elastic members), such as coil springs (damper springs) disposed in series relative to each other between the drive member 46 and the connecting member 48, as best shown in FIGS. 1 and 2A. As best shown in FIGS. 1 and 2A, the ancillary damper elastic members (or outer damper elastic members) 50 are disposed radially outwardly of the damper elastic members (or inner damper elastic members) 38. The radially outer damper elastic members 50 include circumferentially acting elastic members, such as coil springs, disposed in series relative to each other between the drive member 46 and the connecting member 48, as best shown in FIG. 1. The ancillary damper elastic members 50 are distributed circumferentially around the rotation axis X. As further illustrated in FIGS. 1 and 2A, the radially inner and outer elastic damping members 38 and 50, respectively, are radially spaced from each other.

The connecting member 48 defines a substantially annular groove (or channel) that partially houses the ancillary damper elastic members 50, which are distributed about the circumference of the annular channel of the connecting member 48 so as to support the ancillary damper elastic members 50 against centrifugal force. Moreover, each of the ancillary damper elastic members 50 is disposed circumferentially between the driving tabs 47 of the drive member 46 and the internal tabs of the connecting member 48.

As best shown in FIGS. 2A and 2B, the first retainer plate 36B further includes one or more peripheral abutment elements 52 extending axially outwardly from the outer mounting flange 39B of the second retainer plate 36B away from the first retainer plate 36A toward the drive member 46 and the locking piston 28. According to the first exemplary embodiment of the present invention, the abutment elements 52 are integrally press-formed with the second retainer plate 36B so as to be equiangularly spaced from each other. The abutment elements 52 have circumferentially opposite abutment surfaces on circumferential ends of the mutually facing abutment elements 52. The abutment elements 52 of the second damper retainer plate 36B engage the ancillary damper elastic members 50. Thus, the second damper retainer plate 36B is operatively and rotatably connected to the drive member 46 through the ancillary damper elastic members 50.

The radially outer damper elastic members 50 are held in the interface between the internal tabs of the connecting member 48, the driving tabs 47 of the drive member 46 and the abutment elements 52 of the second damper retainer plate 36B so as to transmit damped rotational torque from the locking piston 28 to the first and second retainer plates 36A, 36B through the radially outer damper elastic members 50 and the connecting member 48. As best shown in FIGS. 1 and 2A, the driving tabs 47 of the drive member 46 and the abutment elements 52 of the second damper retainer plate 36B are circumferentially (or angularly) aligned with each other. In other words, the connecting member 48 is drivingly connected to the first and second retainer plates 36A, 36B through the radially outer damper elastic members 50. In turn, the drive member 46 is drivingly connected to the connecting member 48 through the radially outer damper elastic members 50. Thus, the radially outer damper elastic members 50 are disposed and compressible between the driving tabs 47 of the drive member 46 and the internal tabs of the connecting member 48, and between the internal tabs of the connecting member 48 and the abutment elements 52 of the second damper retainer plate 36B.

During operation, when the lock-up clutch 18 is in the disengaged (open) position, the engine torque is transmitted from the impeller wheel 16 by the turbine wheel 15 of the torque converter 14 to the turbine hub 24. When the lock-up clutch 18 is in the engaged (locked) position (i.e., when the locking piston 28 is engaged (or locked) against the locking wall 12a of the casing 12 by action of the hydraulic pressure), the engine torque is transmitted by the casing 12 to the turbine hub 24 through the torsional vibration damper 20. Specifically, the drive member 46 is drivingly and elastically connected to the first and second retainer plates 36A, 36B through the connecting member 48 and the radially outer damper elastic members 50. In turn, the first and second retainer plates 36A, 36B are drivingly and elastically connected to the driven member 32 through the intermediate member 34 and the inner damper elastic members 38.

The dynamic absorber 30 is operatively connected to the turbine shell 15s of the turbine wheel 15 and the turbine hub 24. The dynamic absorber 30 functions as a dynamic damper for further dampening the torsional vibration (variation in speed of rotation) transmitted to the turbine hub 24 of the torque converter 14.

The dynamic absorber 30 includes a substantially annular inertial member (or absorber mass) 54, a substantially annular connecting plate 56 rotatably connected to the inertial member 54 coaxially with the rotation axis X, and a plurality of circumferentially acting absorber elastic members 58 interposed between the inertial member 54 and the connecting plate 56, as best shown in FIGS. 2A and 2B. The inertial member 54 is drivingly and elastically coupled to the connecting plate 56 through the absorber elastic members 58.

The inertial member 54 is a substantially annular heavy wheel (i.e., having a relatively large mass) for opposing and resisting by its inertia fluctuations in speed of the machinery, such as the hydrokinetic torque coupling device, with which it rotates. The inertial member 54 includes a substantially annular support (or connection) portion 54s and a substantially annular inertial portion 54i formed integrally with the support portion 54s, as best shown in FIGS. 2A and 2B. The inertial member 54 with the support portion 54s and the inertial portion 54i is an integral part, e.g., made of a single-piece or unitary component, but may be separate components fixedly connected together. Preferably, the inertial member 54 is integrally made by stamping into an L-shape or by roll forming from a strip. Moreover, the inertial portion 54i of the inertial member 54 has a thickness and a mass substantially larger than the thickness and mass of the support portion 54s.

A radially inner end 57 of the connecting plate 56 is non-movably (i.e., fixedly) attached to the flange 24f of the turbine hub 24 by appropriate means, such as by rivets or welding. Further according to the exemplary embodiment of the present invention, each of the absorber elastic members 58 is in the form of helical (or coil) spring having a principal axis oriented substantially circumferentially about the rotation axis X. Thus, the turbine hub 24 is operatively, elastically and rotatably connected to the inertial member 54 of the dynamic absorber 30 through the absorber elastic members 58. In other words, the inertial member 54 is rotatable relative to the turbine shell 15s of the turbine wheel 15, the torsional vibration damper 20, and the turbine hub 24 coaxially with the rotation axis X.

The connecting plate 56 has a substantially annular mounting flange 59 extending axially inwardly from the connecting plate 56 toward the first retainer plate 36A for radially mounting and supporting the inertial member 54 thereon. The connecting plate 56 is preferably made as a single or unitary component. Also preferably, the mounting flange 59 is integrally press-formed with the connecting plate 56 from a single sheet-metal blank. As best shown in FIG. 2B, a substantially annular radially inner end 55 of the inertial member 54 is rotationally slidingly supported in the radial direction by the mounting flange 59 of the connecting plate 56. In other words, the inertial member 54 is radially, rotationally guided and centered relative to the rotation axis X by the mounting flange 59 of the connecting plate 56 of the dynamic absorber 30. Thus, the relatively heavy inertia member 54 of the dynamic absorber 30 is centered and guided in order to not generate high imbalance and load in the components of the torque converter 14 of the torque coupling device $10_1$.

The inertial member 54 is elastically and rotatably coupled to the connecting plate 56 through the absorber elastic members 58 interposed circumferentially in series between the connecting plate 56 and the inertial member 54. The connecting plate 56 of the dynamic absorber 30 is rotationally guided and radially centered relative to the rotation axis X by a substantially cylindrical support surface 24*s* of the turbine hub 24, as best shown in FIG. 2B.

The centrifugal pendulum oscillator $40_1$ is operatively connected to the turbine hub 24, as best shown in FIG. 2A. The pendulum oscillator $40_1$ functions as a dynamic damper for filtering the vibrations caused by irregularities, and takes effect before engine torque is transmitted to the automotive transmission or gearbox, thus further dampening the torsional vibration (variation in speed of rotation) transmitted to the turbine hub 24 of the torque converter 14.

Figure 4:
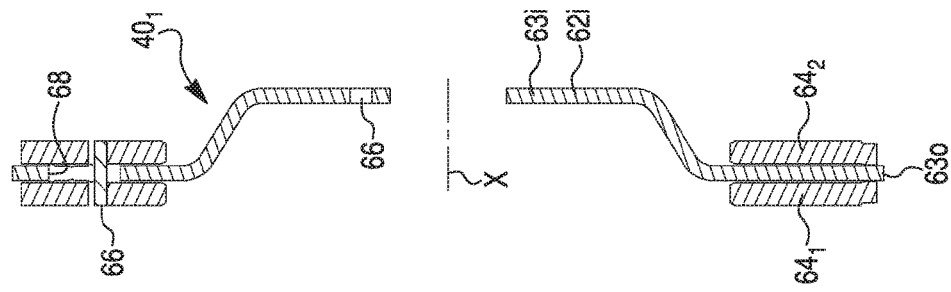
FIG. 4 is a cross-sectional half-view of the centrifugal pendulum oscillator in accordance with the first exemplary embodiment of the present invention taken along the line 4-4 in FIG. 3.
Figure 3:
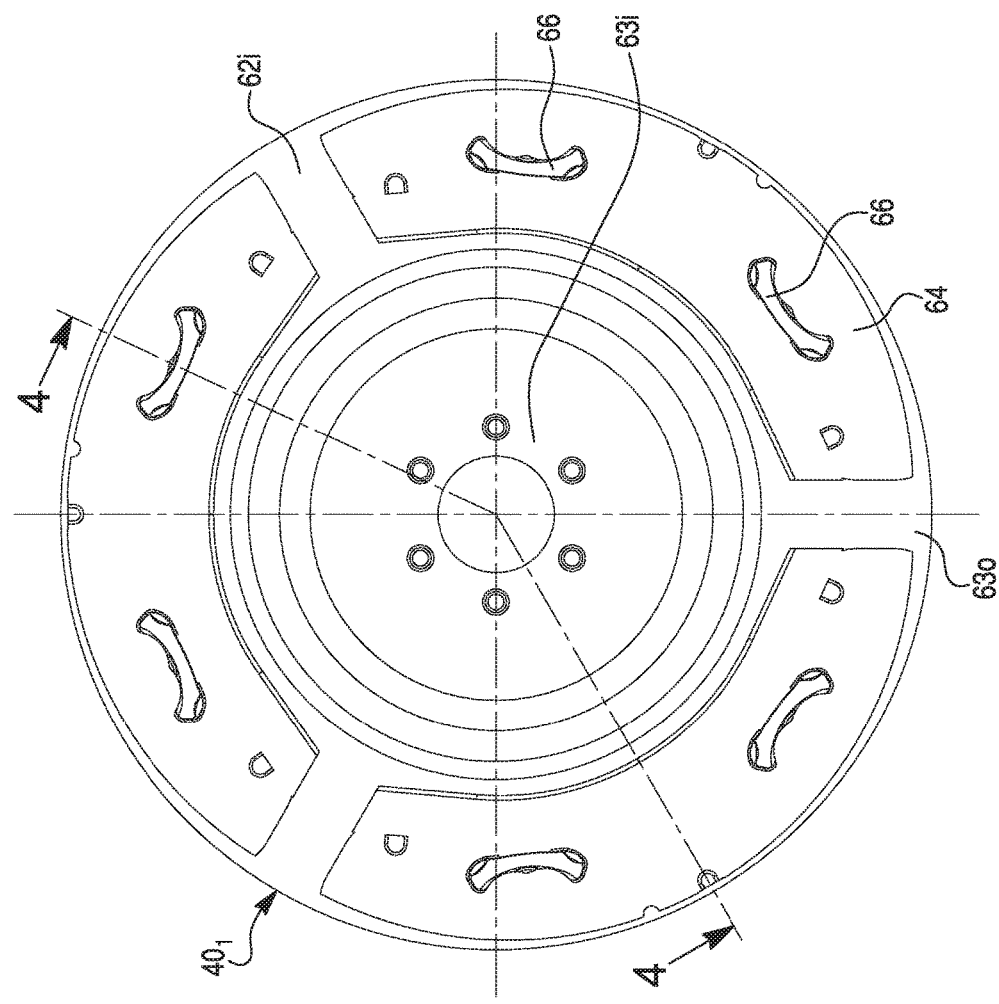
FIG. 3 is a front plan view of the centrifugal pendulum oscillator of the torsional vibration damper assembly in accordance with the first exemplary embodiment of the present invention.

The pendulum oscillator $40_1$ includes a substantially annular support member $62_1$ and at least one pair of flyweights; respectively a first flyweight $64_1$ and a second flyweight $64_2$, that are arranged (mounted) axially on axially opposite sides of the support member $62_1$. The first and second flyweights $64_1$ and $64_2$ are connected axially to one another by at least one connecting member $66_1$ passing axially through an associated opening $68_1$ in a radially outer end 63*o* of the support member $62_1$. As best shown in FIGS. 3 and 4, the pendulum oscillator $40_1$ includes three pairs of the first and second flyweights $64_1$ and $64_2$, and each pair of the first and second flyweights $64_1$ and $64_2$ is connected axially to one another by two connecting members 66 passing axially through the associated openings 68 in the support member $62_1$. Advantageously, each of the connecting members 66 defines a spacer that determines an axial spacing between the flyweights $64_1$ and $64_2$, and a clearance with respect to the support member $62_1$.

The pendulum oscillator $40_1$ may include one, two, three, four, five, six, or more pairs of the first and second flyweights $64_1$ and $64_2$. In the illustrated embodiments of FIG. 3, the first and second flyweights $64_1$ and $64_2$ are substantially structurally and functionally similar. In view of the similarities of the illustrated first and second flyweights $64_1$ and $64_2$, and in the interest of simplicity, the following discussion will occasionally use reference numeral 64 without a subscript number when generically referring to each of the first and second flyweights $64_1$ and $64_2$ rather than reciting all reference numerals with subscripts.

The first and second flyweights $64_1$ and $64_2$ are configured to oscillate with respect to the support member $62_1$ in a rotation plane orthogonal to the rotation axis X. Accordingly, in reaction to rotational irregularities of the internal combustion engine 3, each of the first and second flyweights $64_1$ and $64_2$ shifts so that a center of mass thereof oscillates in pendulum fashion. The oscillation frequency of each of the first and second flyweights $64_1$ and $64_2$ is proportional to the rotation speed of the crankshaft 2 of the internal combustion engine 3. This pendulum motion of the first and second flyweights $64_1$ and $64_2$ allows vibrations and rotational irregularities of the engine to be damped and absorbed.

A radially inner end 63*i* of the support member $62_1$ for a radially inner portion of the centrifugal pendulum oscillator $40_1$) is non-moveably attached to an axial end portion 24*k* of the turbine hub 24 by appropriate means, such as by threaded fasteners $65_1$ or, alternatively, by riveting, welding, press-fitting, gear spline connection with snap ring or interference, etc. In the exemplary embodiment of FIGS. 1-4, the threaded fasteners $65_1$ axially extend through holes 66 in the radially inner end 63*i* of the support member $62_1$ into the turbine hub 24, best shown in FIGS. 2A, 2B and 4.

An exemplary method for assembling the hydrokinetic torque coupling device $10_1$ according to the embodiment of FIGS. 1-4 will now be explained. It should be understood that this exemplary method may be practiced in connection with the other embodiments described herein. This exemplary method is not the exclusive method for assembling the hydrokinetic torque coupling devices described herein. While the method for assembling the hydrokinetic torque coupling devices 1-4 may be practiced by sequentially performing the steps as set forth below, it should be understood that the methods may involve performing the steps in different sequences.

The torque converter 14 including the turbine wheel 15, the impeller wheel 16 and the stator 17, the torsional vibration damper 20, the dynamic absorber 30 and the centrifugal pendulum oscillator $40_1$ may each be preassembled. The torsional vibration damper 20 and the dynamic absorber 30 are mounted to the turbine hub 24 and fixed to the turbine wheel 15. Specifically, the turbine shell 15*s* of the turbine wheel 15, the connecting plate 56 of the dynamic absorber 30 and the flange 33 of the driven member 32 of the torsional vibration damper 20 are non-movably (i.e., fixedly) secured to the flange 24*f* of the turbine hub 24, as best shown in FIGS. 2A and 2B, by appropriate means, such as by rivets or welding. Then, the turbine wheel 15, the impeller wheel 16, and the stator 17 are assembled together so as to form the torque converter 14. Next, the locking piston 28 is slidably mounted to the turbine hub 24. Then, the radially inner end 63*i* of the support member 62 is non-moveably attached to the turbine hub 24 by appropriate means, such as by the threaded fasteners $65_1$ or welding. After that, the first casing shell $12_1$ is sealingly fixed to the second casing shell $12_2$ of the casing 12 by the weld 12*w* at their outer peripheries so that the torque converter 14 with the torsional vibration damper 20, the dynamic absorber 30 and the centrifugal pendulum oscillator $40_1$ is sealed within the casing 12.

Various modifications, changes, and alterations may be practiced with the above-described embodiment, including but not limited to the additional embodiments shown in FIGS. 5-30. In the interest of brevity, reference characters in FIGS. 5-30 that are discussed above in connection with Figs. FIGS. 1-4 are not further elaborated upon below, except to the extent necessary or useful to explain the additional embodiments of FIGS. 5-30. Modified components and parts are indicated by the addition of a hundred digits to the reference numerals of the components or parts.

In a hydrokinetic torque coupling device $10_2$ of a second exemplary embodiment illustrated in FIGS. 5-8, the centrifugal pendulum oscillator $40_1$ is replaced by a centrifugal pendulum oscillator $40_2$. The hydrokinetic torque coupling device $10_2$ of FIGS. 5-8 corresponds substantially to the hydrokinetic torque coupling device 10 of FIGS. 1-4, and only the centrifugal pendulum oscillator $40_2$, which differs, will therefore be explained in detail below.

Figure 5:
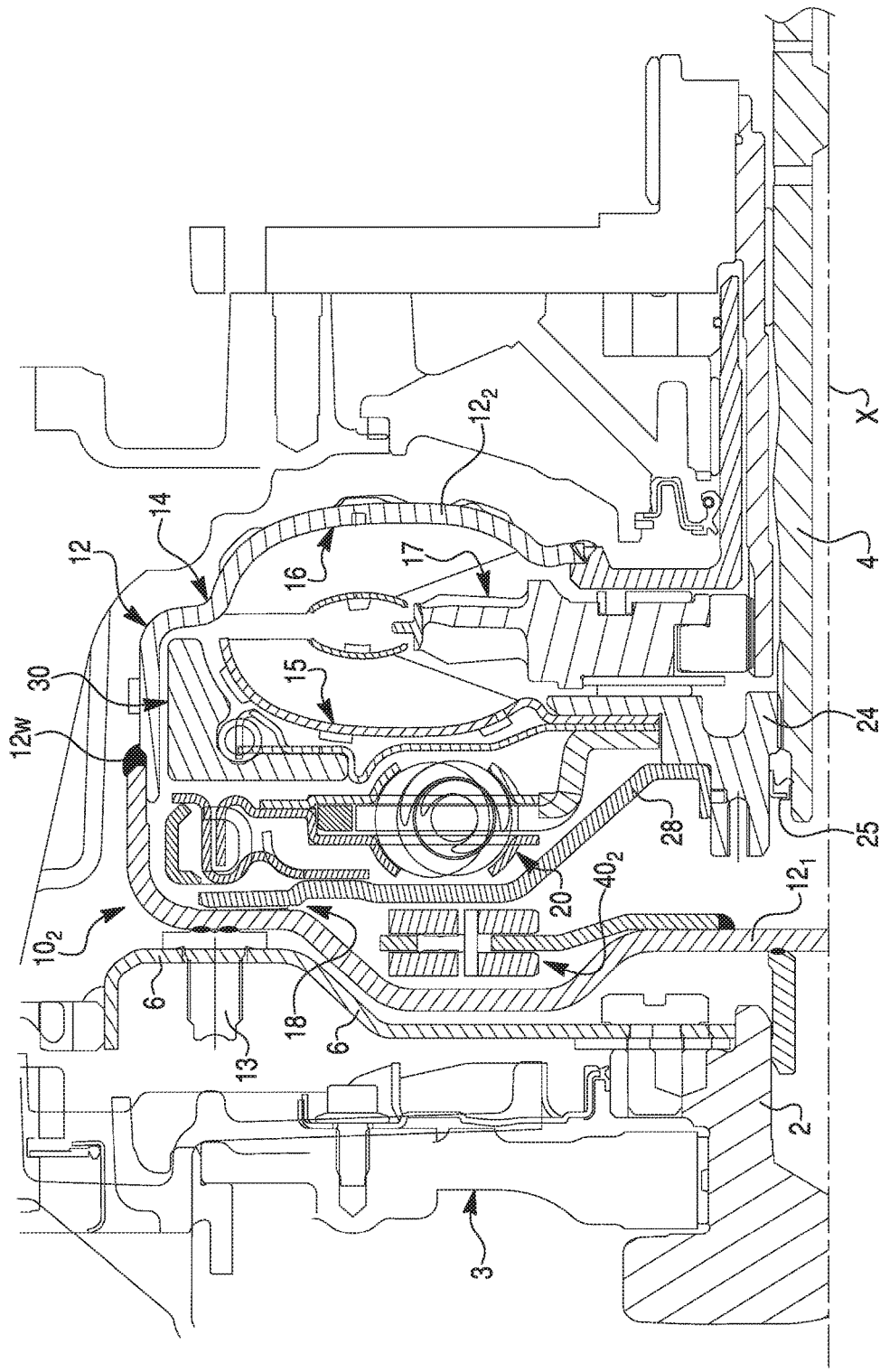
FIG. 5 is a fragmented half-view in axial section of a hydrokinetic torque coupling device in accordance with a second exemplary embodiment of the present invention.
Figure 6A:
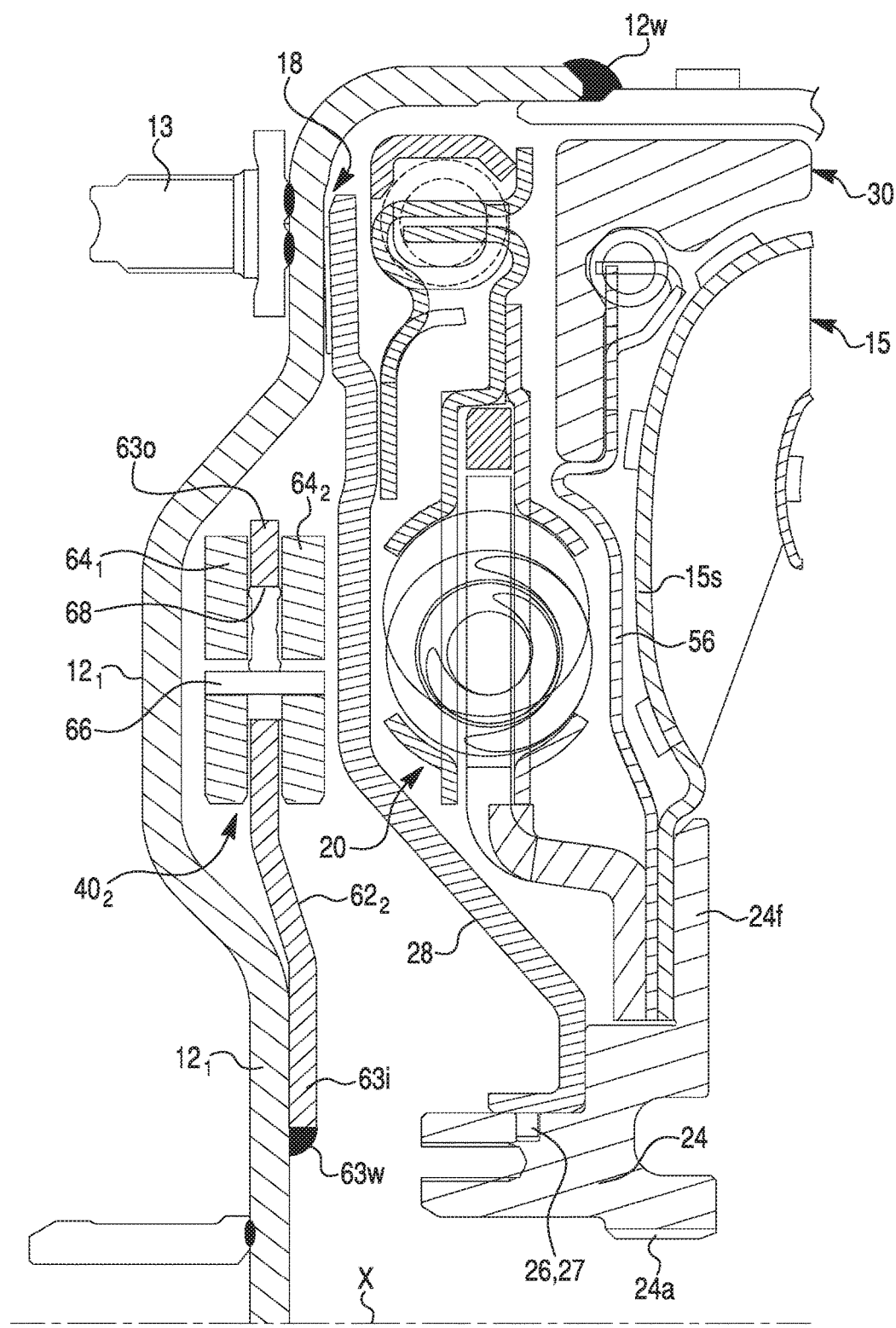
FIG. 6A is a fragmentary cross-sectional half-view of a torsional vibration damper, a dynamic absorber and a centrifugal pendulum oscillator of the hydrokinetic torque coupling device in accordance with the second exemplary embodiment of the present invention.
Figure 6B:
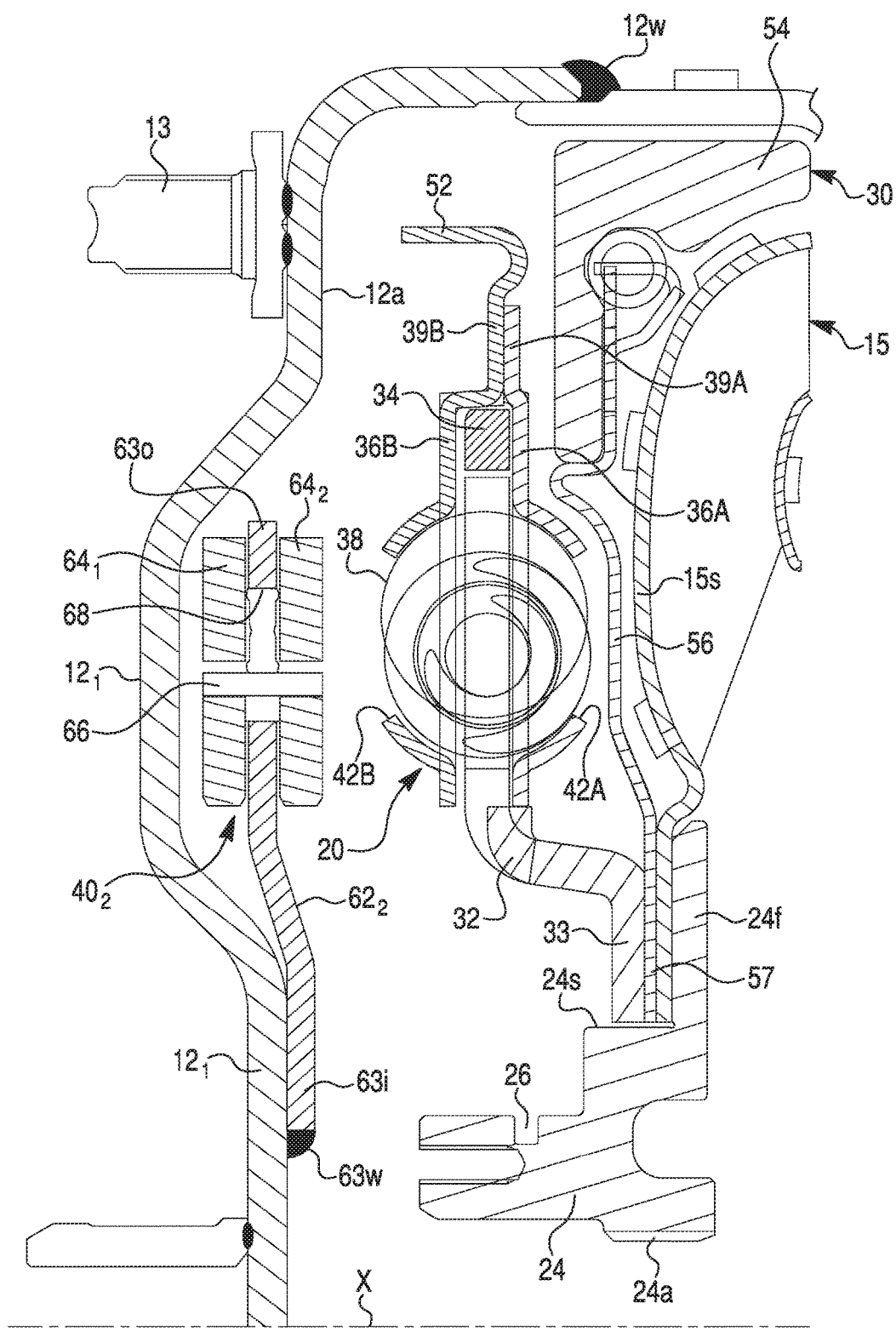
FIG. 6B is a partial fragmentary cross-sectional half-view of the torsional vibration damper, the dynamic absorber and the centrifugal pendulum oscillator of the hydrokinetic torque coupling device in accordance with the second exemplary embodiment of the present invention shown without a locking piston of a lock-up clutch.
Figure 6C:
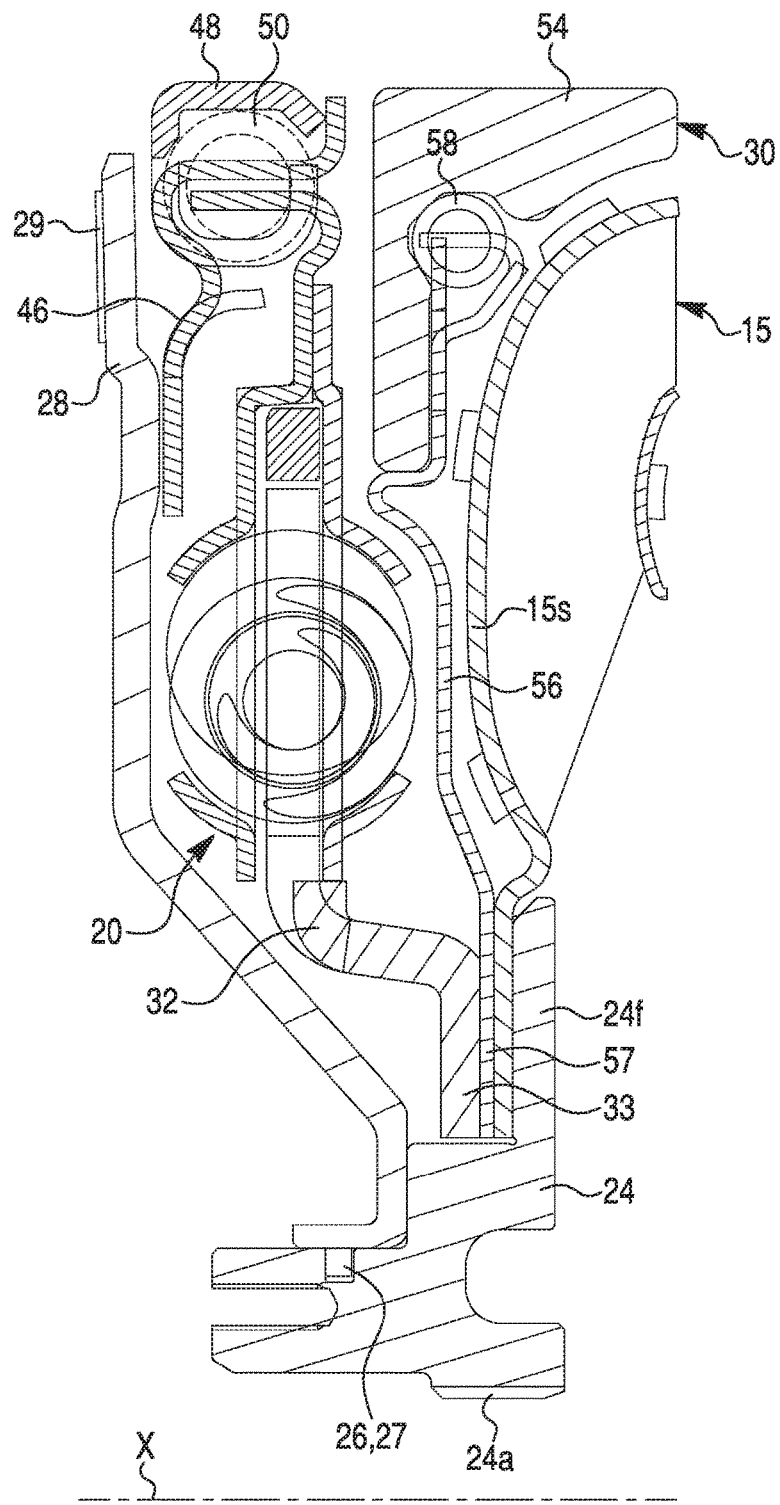
FIG. 6C is a fragmentary cross-sectional half-view of the torsional vibration damper and the dynamic absorber of the hydrokinetic torque coupling device in accordance with the second exemplary embodiment of the present invention.
Figure 8:
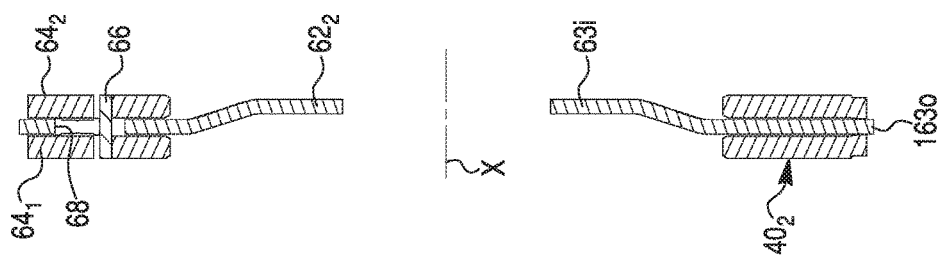
FIG. 8 is a cross-sectional half-view of the centrifugal pendulum oscillator in accordance with the second exemplary embodiment of the present invention taken along the line 8-8 in FIG. 7.

The centrifugal pendulum oscillator $40_2$, as best shown in FIGS. 5, 6A and 6B, is disposed within the casing 12 between the turbine hub 24 and the first casing shell $12_1$ of the casing 12. Also, the centrifugal pendulum oscillator $40_2$, as best shown in FIGS. 5, 6A and 6B, is disposed axially between the first casing shell $12_1$ and the locking piston 28.

During vehicle operation, when the lock-up clutch 18 is in the disengaged (open) position, the engine torque is transmitted by the turbine wheel 15 of the torque converter 14 from the impeller wheel 16 to the turbine hub 24 through the dynamic absorber 30 and the centrifugal pendulum oscillator $40_2$ only, bypassing the torsional vibration damper 20. However, when the lock-up clutch 18 is in the engaged (locked) position, the engine torque is transmitted by the casing 12 to the turbine hub 24 through the torsional vibration damper 20, as well as through the dynamic absorber 30 and the centrifugal pendulum oscillator $40_2$.

As best shown in FIGS. 5, 6A and 6B, each of the torsional vibration damper 20 and the dynamic absorber 30 is operatively coupled to the turbine wheel 15 and the turbine hub 24 of the torque converter 14, while the pendulum oscillator $40_2$ is operatively coupled to the first casing shell $12_1$ of the casing 12.

The pendulum oscillator $40_2$ functions as a dynamic damper for filtering vibrations caused by engine irregularities, and takes effect before engine torque is transmitted to the automotive transmission or gearbox, thus further dampening the torsional vibration (variation in speed of rotation) transmitted to the casing 12 of the torque coupling device $10_2$.

Figure 7:
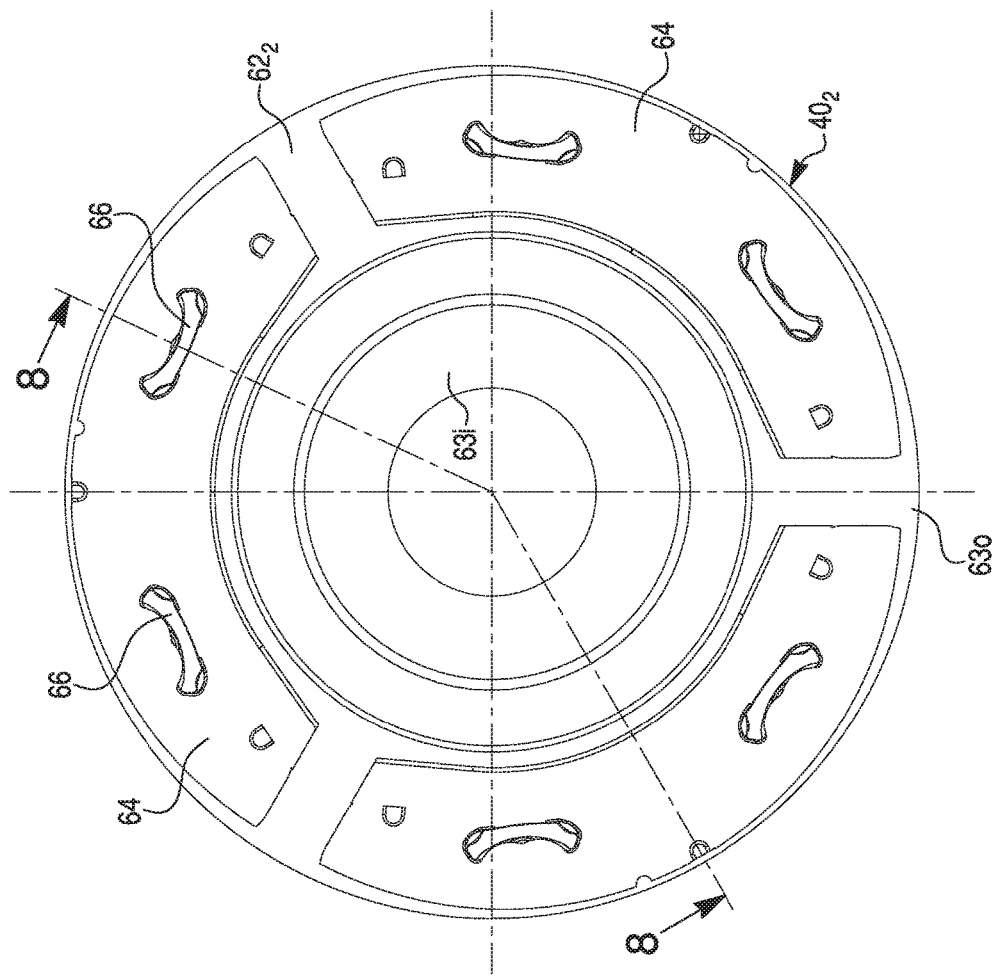
FIG. 7 is a front plan view of the centrifugal pendulum oscillator of the torsional vibration damper assembly in accordance with the second exemplary embodiment of the present invention.

The pendulum oscillator $40_2$ includes a substantially annular support member 162 and at least one pair of flyweights; respectively a first flyweight $64_1$ and a second flyweight $64_2$, that are arranged (mounted) axially on axially opposite sides of the support member 162. The first and second flyweights $64_1$ and $64_2$ are connected axially to one another by at least one connecting member 66 passing axially through an associated opening 68 in a radially outer end $63o$ of the support member $62_2$. As best shown in FIG. 7, each pair of the first and second flyweights $64_1$ and $64_2$ is connected axially to one another by two connecting members 66 passing axially through the associated openings 68 in the support member $62_2$.

Advantageously, each of the connecting members 66 defines a spacer that determines an axial spacing between the flyweights $64_1$ and $64_2$, and a clearance with respect to the support member $62_2$.

The first and second flyweights $64_1$ and $64_2$ are configured to oscillate with respect to the support member 162 in a rotation plane orthogonal to the rotation axis X. Accordingly, in reaction to rotational irregularities of the internal combustion engine 3, each of the first and second flyweights $64_1$ and $64_2$ shifts so that a center of mass thereof oscillates in pendulum fashion. The oscillation frequency of each of the first and second flyweights $64_1$ and $64_2$ is proportional to the rotation speed of the crankshaft 2 of the internal combustion engine 3. This pendulum motion of the first and second flyweights $64_1$ and $64_2$ allows vibrations and rotational irregularities of the engine to be damped and absorbed.

A radially inner end $163i$ of the support member 162 is non-movably (i.e., fixedly) attached to the first casing shell $12_1$ of the casing 12 by appropriate means, such as by rivets or welding. In the exemplary embodiment of FIGS. 5-8, the radially inner end $163i$ of the support member 162 is welded to the first casing shell $12_1$ of the casing 12 by a weld $163w$, best shown in FIG. 6A.

An exemplary method for assembling the hydrokinetic torque coupling device $10_2$ according to the embodiment of FIGS. 5-8 is as follows. First, the turbine wheel 15, the impeller wheel 16, the stator 17, the torsional vibration damper 20, the dynamic absorber 30 and the centrifugal pendulum oscillator $40_2$ may each be preassembled. The torsional vibration damper 20 and the dynamic absorber 30 are mounted to the turbine hub 24 and fixed to the turbine wheel 15. Specifically, the turbine shell $15s$ of the turbine wheel 15, the connecting plate 56 of the dynamic absorber 30 and the flange 33 of the driven member 32 of the torsional vibration damper 20 are non-movably (i.e., fixedly) secured to the flange $24f$ of the turbine hub 24, as best shown in FIGS. 6A-6C, by appropriate means, such as by rivets or welding. Next, the turbine wheel 15, the impeller wheel 16, and the stator 17 are assembled together so as to form the torque converter 14. Next, the locking piston 28 is slidably mounted to the turbine hub 24. Then, the radially inner end $163i$ of the support member 162 is non-moveably attached to the first casing shell $12_1$ of the casing 12 by appropriate means, such as by welding (see the weld $63w$ as best shown in FIG. 6A). After that, the first casing shell $12_1$ is fixed to the second casing shell $12_2$ of the casing 12 by the sealing weld $12w$ at their outer peripheries so that the torque converter 14 with the torsional vibration damper 20 and the dynamic absorber 30, and the centrifugal pendulum oscillator $40_2$ are sealed within the casing 12.

In a hydrokinetic torque coupling device $10_3$ of a third exemplary embodiment illustrated in FIGS. 9-12, the centrifugal pendulum oscillator $40_2$ is replaced by a centrifugal pendulum oscillator $40_3$. The hydrokinetic torque coupling device $10_3$ of FIGS. 9-12 corresponds substantially to the hydrokinetic torque coupling device $10_2$ of FIGS. 5-8, and only the centrifugal pendulum oscillator $40_3$, which differs, will therefore be explained in detail below.

The centrifugal pendulum oscillator $40_3$, as shown in FIGS. 9-12, is disposed outside a casing 12 between a first casing shell $12_1$ of the casing 12 and a flexplate 6 of the internal combustion engine 3. During vehicle operation, when the lock-up clutch 18 is in the disengaged (open) position, the engine torque is transmitted only by the turbine wheel 15 of the torque converter 14 from the impeller wheel 16 to the turbine hub 24 through the dynamic absorber 30 and the centrifugal pendulum oscillator $40_3$, bypassing the torsional vibration damper 20. However, when the lock-up clutch 18 is in the engaged (locked) position, the engine torque is transmitted by the casing 12 to the turbine hub 24 through the torsional vibration damper 20, as well as through the dynamic absorber 30 and the centrifugal pendulum oscillator $40_3$.

Figure 9:
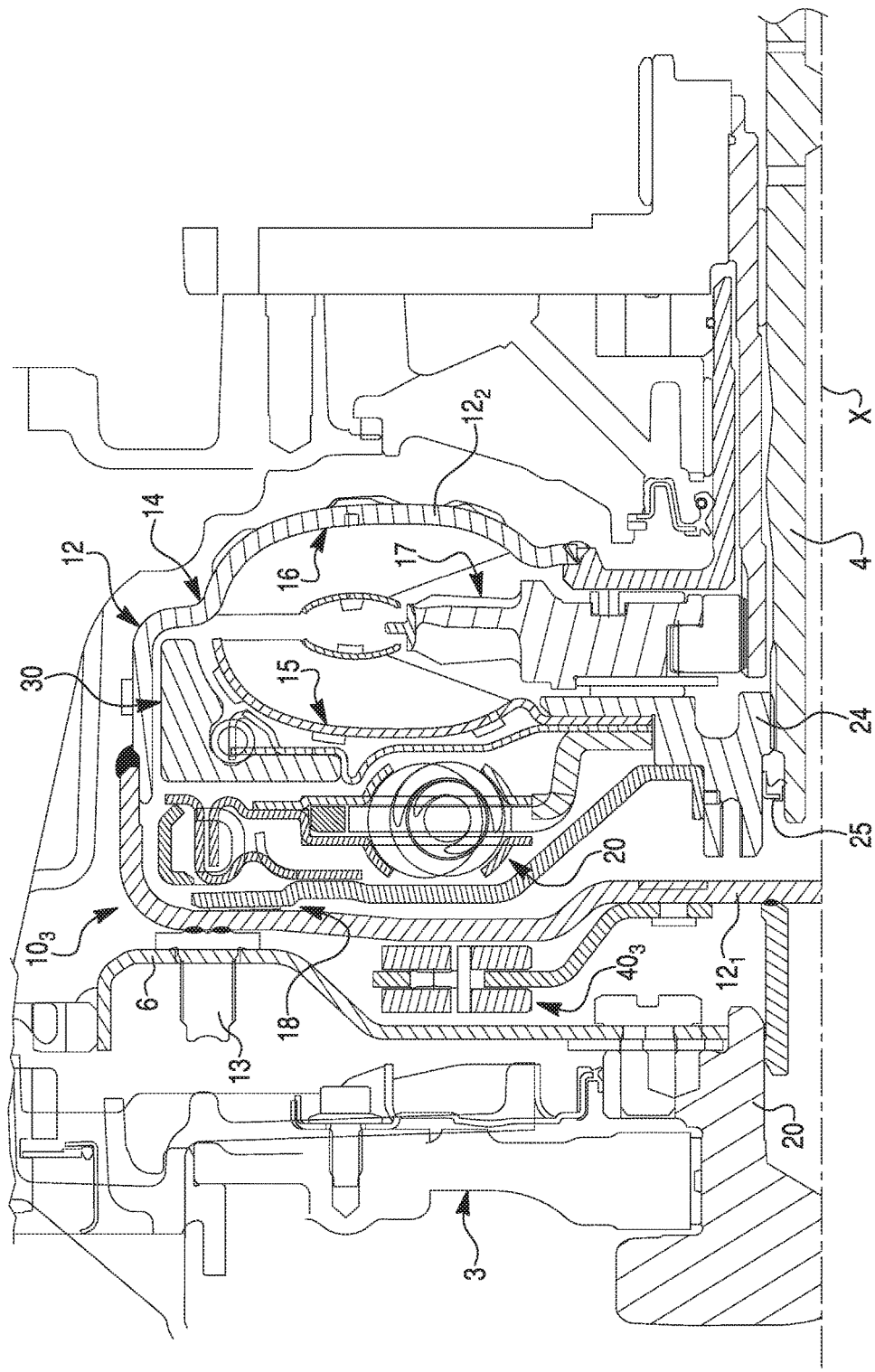
FIG. 9 is a fragmented half-view in axial section of a hydrokinetic torque coupling device in accordance with a third exemplary embodiment of the present invention.
Figure 10:
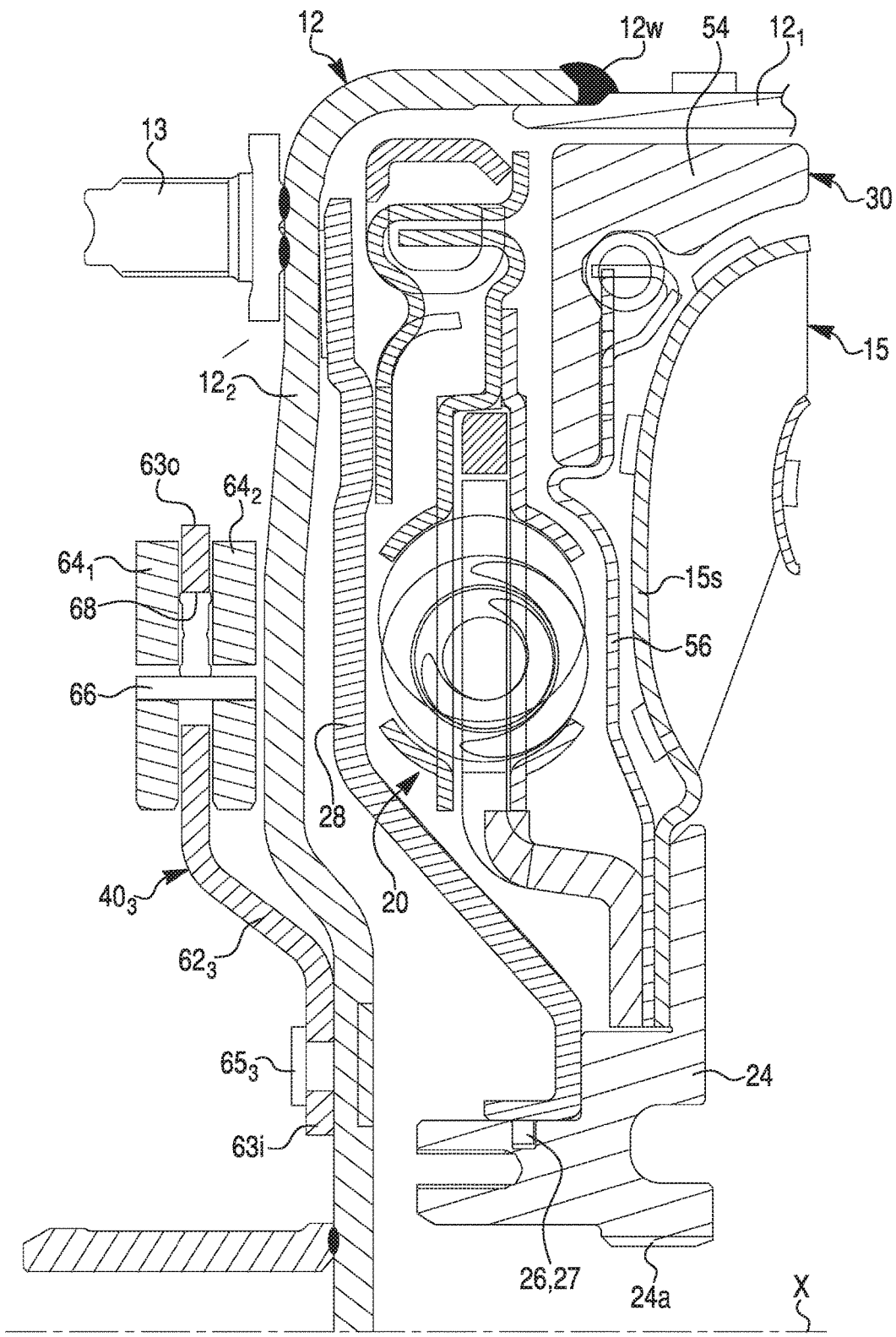
FIG. 10 is a fragmentary cross-sectional half-view of a torsional vibration damper, a dynamic absorber and a centrifugal pendulum oscillator of the hydrokinetic torque coupling device in accordance with the third exemplary embodiment of the present invention.

As best shown in FIGS. 9 and 10, each of the torsional vibration damper 20 and the dynamic absorber 30 is operatively coupled to the turbine wheel 15 and the turbine hub 24 of the torque converter 14, while the pendulum oscillator $40_3$ is operatively coupled to the first casing shell $12_1$ of the casing 12 outside the casing 12.

The pendulum oscillator $40_3$ functions as a dynamic damper for filtering the vibrations caused by the irregularities, and take effect before engine torque is transmitted to the automotive transmission or gearbox, thus further dampening the torsional vibration (variation in speed of rotation) transmitted to the casing 12 of the torque coupling device $10_3$.

The pendulum oscillator $40_3$ includes a substantially annular support member $62_3$ and at least one pair of flyweights; respectively a first flyweight $64_1$ and a second flyweight $64_2$, that are arranged (mounted) axially on axially opposite sides of the support member $62_3$. The first and second flyweights $64_1$ and $64_2$ are connected axially to one another by at least one connecting member 66 passing axially through an associated opening 68 in a radially outer end $63o$ of the support member $62_3$. As best shown in FIGS. 10 and 12, each pair of the first and second flyweights $64_1$ and $64_2$ is connected axially to one another by two connecting members 66 passing axially through the associated openings 68 in the support member $62_3$.

Advantageously, each of the connecting members 66 defines a spacer that determines an axial spacing between the flyweights 64 and a clearance with respect to the support member $62_3$.

The first and second flyweights 64 are configured to oscillate with respect to the support member $62_3$ in a rotation plane orthogonal to the rotation axis X. Accordingly, in reaction to rotational irregularities of the internal combustion engine 3, each of the first and second flyweights 64 shifts so that a center of mass thereof oscillates in pendulum fashion. The oscillation frequency of each of the first and second flyweights 64 is proportional to the rotation speed of the crankshaft 2 of the internal combustion engine 3. This pendulum motion of the first and second flyweights 64 allows vibrations and rotational irregularities of the engine to be damped and absorbed.

A radially inner end 63$i$ of the support member $62_3$ is non-movably (i.e., fixedly) attached to the first casing shell $12_1$ of the casing 12 by appropriate means, such as by fasteners, rivets or welding. In the exemplary embodiment of FIGS. 9-12, the radially inner end 63$i$ of the support member $62_3$ is fixed to the first casing shell $12_1$ of the casing 12 by rivets $65_3$, best shown in FIG. 10, extending through apertures 67 in the radially inner end 63$i$ of the support member $62_3$, best shown in FIG. 11.

An exemplary method for assembling the hydrokinetic torque coupling device $10_3$ according to the embodiment of FIGS. 9-12 is as follows. First, the turbine wheel 15, the impeller wheel 16, the stator 17, the torsional vibration damper 20, the dynamic absorber 30 and the centrifugal pendulum oscillator $40_3$ may each be preassembled. The torsional vibration damper 20 and the dynamic absorber 30 are mounted to the turbine hub 24 and fixed to the turbine wheel 15. Specifically, the turbine shell 15$s$ of the turbine wheel 15, the connecting plate 56 of the dynamic absorber 30 and the flange 33 of the driven member 32 of the torsional vibration damper 20 are non-movably (i.e., fixedly) secured to the flange 24$f$ of the turbine hub 24, as best shown in FIGS. 9 and 10, by appropriate means, such as by rivets or welding. Next, the turbine wheel 15, the impeller wheel 16, and the stator 17 are assembled together so as to form the torque converter 14. Then, the locking piston 28 is slidably mounted to the turbine hub 24. Next, the radially inner end 63$i$ of the support member $62_3$ is non-moveably attached to the first casing shell $12_1$ of the casing 12 outside the casing 12 by appropriate means, such as by the rivers $65_3$ extending through apertures 67 in the radially inner end 63$i$ of the support member $62_3$, as best shown in FIG. 10. After that, the first casing shell $12_1$ is fixed to the second casing shell $12_2$ of the casing 12 by the sealing weld 12$w$ at their outer peripheries so that the torque converter 14 with the torsional vibration damper 20 and the dynamic absorber 30 is sealed within the casing 12, while the centrifugal pendulum oscillator $40_3$ is disposed outside the casing 12.

Figure 13:
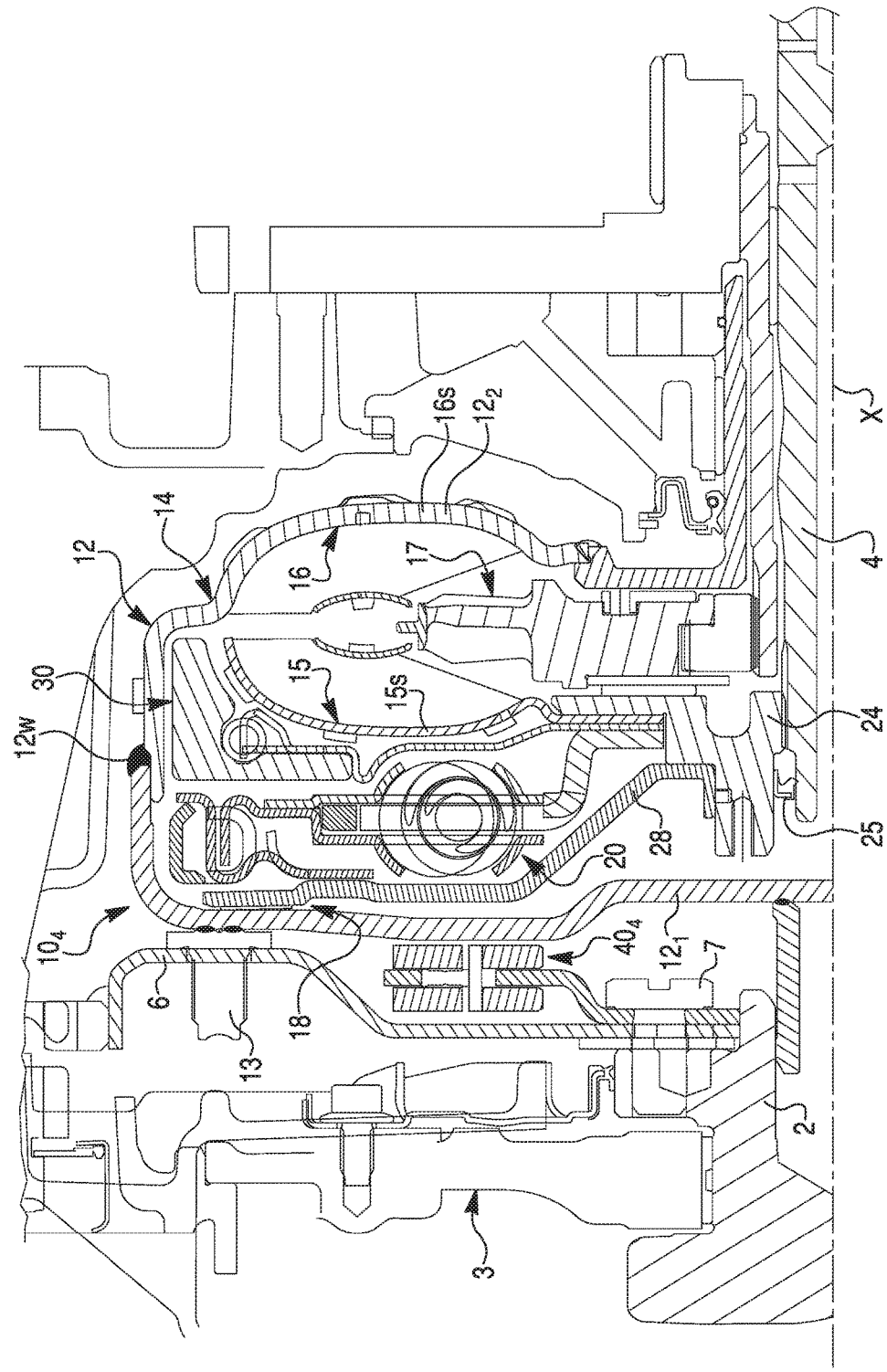
FIG. 13 is a fragmented half-view in axial section of a hydrokinetic torque coupling device in accordance with a fourth exemplary embodiment of the present invention.

In a hydrokinetic torque coupling device $10_4$ of a fourth exemplary embodiment illustrated in FIGS. 13-15, the centrifugal pendulum oscillator $40_1$ is replaced by a centrifugal pendulum oscillator $40_4$. The hydrokinetic torque coupling device $10_4$ of FIGS. 13-15 corresponds substantially to the hydrokinetic torque coupling device 10 of FIGS. 1-4, and only the centrifugal pendulum oscillator $40_4$, which differs, will therefore be explained in detail below.

The centrifugal pendulum oscillator $40_4$, as shown in FIGS. 13-15, is disposed outside a casing 12 between a first casing shell $12_1$ of the casing 12 and a flexplate 6 of the internal combustion engine 3. During vehicle operation, when the lock-up clutch 18 is in the disengaged (open) position, the engine torque is transmitted by the turbine wheel 15 of the torque converter 14 from the impeller wheel 16 to the turbine hub 24 through the dynamic absorber 30 and the centrifugal pendulum oscillator $40_4$ only, bypassing the torsional vibration damper 20. However, when the lock-up clutch 18 is in the engaged (locked) position, the engine torque is transmitted by the casing 12 to the turbine hub 24 through the torsional vibration damper 20, as well as through the dynamic absorber 30 and the centrifugal pendulum oscillator $40_4$.

As best shown in FIG. 13, each of the torsional vibration damper 20 and the dynamic absorber 30 is operatively coupled to the turbine wheel 15 and the turbine hub 24 of the torque converter 14, while the pendulum oscillator $40_4$ is operatively coupled to crankshaft 2 and the flexplate 6 of an internal combustion engine 3 outside the casing 12.

As illustrated in FIG. 13, the flexplate 6 is non-rotatably (i.e., fixedly) secured to both the crankshaft 2 of the internal combustion engine 3 and the casing 12 of the torque coupling device $10_4$. In other words, the crankshaft 2 is non-rotatably coupled to the casing 12. Specifically, a radially inner end of the flexplate 6 is non-rotatably connected to the crankshaft 2 by one or more threaded fasteners 7, while a radially outer end of the flexplate 6 is non-rotatably connected to the casing 12 through the stud bolts 13, which are fixedly secured, such as by welding, to the first casing shell $12_1$.

The pendulum oscillator $40_4$ functions as a dynamic damper for filtering the vibrations caused by the irregularities, and takes effect before engine torque is transmitted to the automotive transmission or gearbox, thus further dampening the torsional vibration (variation in speed of rotation) transmitted to the casing 12 of the torque coupling device $10_4$.

The pendulum oscillator $40_4$ includes a substantially annular support member $62_4$ and at least one pair of flyweights; respectively a first flyweight $64_1$ and a second flyweight $64_2$, that are arranged (mounted) axially on axially opposite sides of the support member $62_4$. The first and second flyweights 64 are connected axially to one another by at least one connecting member 66 passing axially through an associated opening 68 in a radially outer end 63$o$ of the support member $62_4$. As best shown in FIGS. 13 and 15, each pair of the first and second flyweights 64 is connected axially to one another by two connecting members 66 passing axially through the associated openings 68 in the support member $62_4$.

The first and second flyweights 64 are configured to oscillate with respect to the support member $62_4$ in a rotation plane orthogonal to the rotation axis X. Accordingly, in reaction to rotational irregularities of the internal combustion engine 3, each of the first and second flyweights 64 shifts so that a center of mass thereof oscillates in pendulum fashion. The oscillation frequency of each of the first and second flyweights 64 is proportional to the rotation speed of the crankshaft 2 of the internal combustion engine 3. This pendulum motion of the first and second flyweights 64 allows vibrations and rotational irregularities of the engine to be damped and absorbed.

A radially inner end 63$i$ of the support member $62_4$ is non-movably (i.e., fixedly) attached to both the crankshaft 2 and the radially inner end of the flexplate 6 by appropriate means, such as by fasteners, rivets or welding. In the exemplary embodiment of FIGS. 13-15, the radially inner end 63$i$ of the support member $62_4$ is non-rotatably fixed to both the crankshaft 2 and the radially inner end of the flexplate 6 by the threaded fasteners 7, best shown in FIG. 13, extending through apertures 67 in the radially inner end 63$i$ of the support member $62_4$, best shown in FIG. 14. Accordingly, the support member $62_4$ of the centrifugal pendulum oscillator $40_4$ is non-movably (i.e., fixedly) coupled to the casing 12.

An exemplary method for assembling the hydrokinetic torque coupling device $10_4$ according to the embodiment of FIGS. 13-15 is as follows. First, the turbine wheel 15, the impeller wheel 16, the stator 17, the torsional vibration damper 20, the dynamic absorber 30 and the centrifugal pendulum oscillator $40_4$ may each be preassembled. The torsional vibration damper 20 and the dynamic absorber 30 are mounted to the turbine hub 24 and fixed to the turbine wheel 15. Specifically, the turbine shell 15s of the turbine wheel 15, the connecting plate 56 of the dynamic absorber 30 and the flange 33 of the driven member 32 of the torsional vibration damper 20 are non-movably (i.e., fixedly) secured to the flange 24f of the turbine hub 24, as best shown in FIG. 13, by appropriate means, such as by rivets or welding. Next, the turbine wheel 15, the impeller wheel 16, and the stator 17 are assembled together so as to form the torque converter 14. Then, the locking piston 28 is slidably mounted to the turbine hub 24. Next, the first casing shell $12_1$ is fixed to the second casing shell $12_2$ of the casing 12 by the sealing weld 12w at their outer peripheries so that the torque converter 14 with the torsional vibration damper 20 and the dynamic absorber 30 is sealed within the casing 12, while the centrifugal pendulum oscillator $40_4$ is disposed outside the casing 12. After that, the stud bolts 13 are fixedly secured, such as by welding, to the first casing shell $12_1$ of the casing 12. Next, the support member $62_4$ of the centrifugal pendulum oscillator $40_4$ is non-movably (i.e., fixedly) attached to both the crankshaft 2 and the radially inner end of the flexplate 6 by the threaded fasteners 7 extending through the apertures 67 in the radially inner end 63i of the support member $62_4$. Then, the radially outer end of the flexplate 6 is non-rotatably connected to the first casing shell $12_1$ of the casing 12 through the stud bolts 13.

Figure 16:
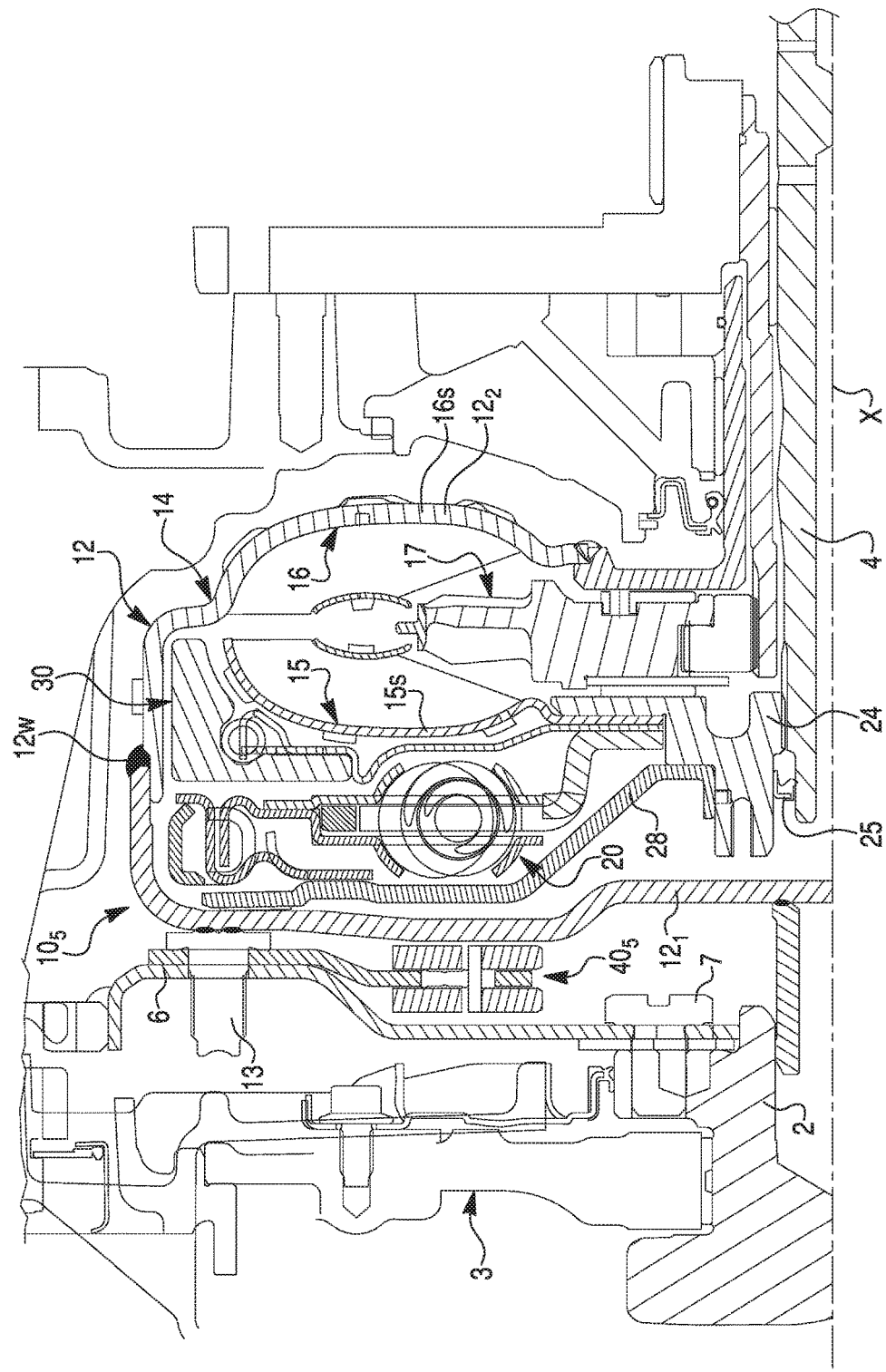
FIG. 16 is a fragmented half-view in axial section of a hydrokinetic torque coupling device in accordance with a fifth exemplary embodiment of the present invention.
Figure 18:
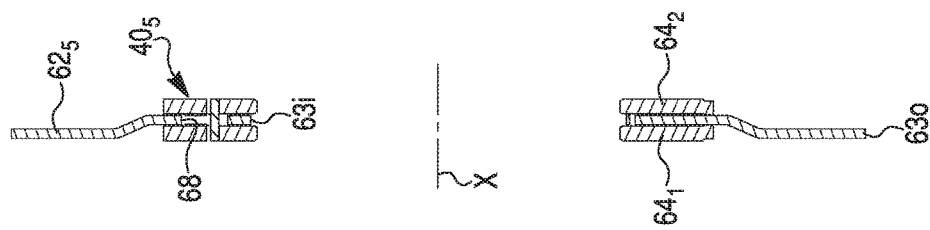
FIG. 18 is a cross-sectional half-view of the centrifugal pendulum oscillator in accordance with the fifth exemplary embodiment of the present invention taken along the line 18-18 in FIG. 17.
Figure 17:
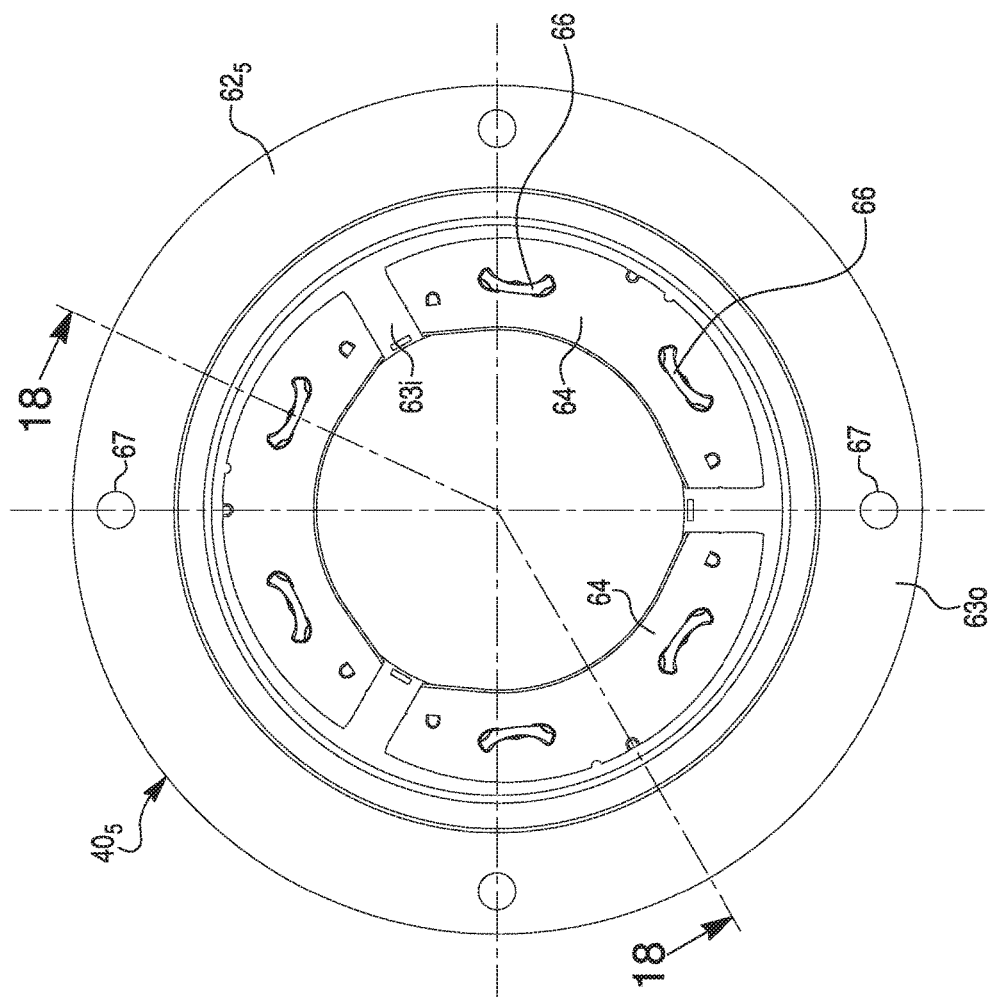
FIG. 17 is a front plan view of the centrifugal pendulum oscillator of the torsional vibration damper assembly in accordance with the fifth exemplary embodiment of the present invention.

In a hydrokinetic torque coupling device $10_5$ of a fifth exemplary embodiment illustrated in FIGS. 16-18, the centrifugal pendulum oscillator $40_1$ is replaced by a centrifugal pendulum oscillator $40_5$. The hydrokinetic torque coupling device $10_5$ of FIGS. 16-18 corresponds substantially to the hydrokinetic torque coupling device 10 of FIGS. 1-4, and only the centrifugal pendulum oscillator $40_5$, which differs, will therefore be explained in detail below.

The centrifugal pendulum oscillator $40_5$, as shown in FIGS. 16-18, is disposed outside casing 12 between a first casing shell $12_1$ of the casing 12 and a flexplate 6 of the internal combustion engine 3. During vehicle operation, when the lock-up clutch 18 is in the disengaged (open) position, the engine torque is transmitted only by the turbine wheel 15 of the torque converter 14 from the impeller wheel 16 to the turbine hub 24 through the dynamic absorber 30 and the centrifugal pendulum oscillator $40_5$, bypassing the torsional vibration damper 20. However, when the lock-up clutch 18 is in the engaged (locked) position, the engine torque is transmitted by the casing 12 to the turbine hub 24 through the torsional vibration damper 20, as well as through the dynamic absorber 30 and the centrifugal pendulum oscillator $40_5$.

As best shown in FIG. 16, each of the torsional vibration damper 20 and the dynamic absorber 30 is operatively coupled to the turbine wheel 15 and the turbine hub 24 of the torque converter 14, while the pendulum oscillator $40_5$ is operatively coupled to a crankshaft 2 and the flexplate 6 of an internal combustion engine 3 outside the casing 12.

As illustrated in FIG. 16, the flexplate 6 is non-rotatably (i.e., fixedly) secured to both the crankshaft 2 of the internal combustion engine 3 and the casing 12 of the torque coupling device $10_5$. In other words, the crankshaft 2 is non-rotatably coupled to the casing 12. Specifically, a radially inner end of the flexplate 6 is non-rotatably connected to the crankshaft 2 by one or more threaded fasteners 7, while a radially outer end of the flexplate 6 is non-rotatably connected to the casing 12 through stud bolts 13, which are fixedly secured, such as by welding, to the first casing shell $12_1$.

The pendulum oscillator $40_5$ functions as a dynamic damper for filtering the vibrations caused by the irregularities, and takes effect before engine torque is transmitted to the automotive transmission or gearbox, thus further dampening the torsional vibration (variation in speed of rotation) transmitted to the casing 12 of the torque coupling device $10_5$.

The pendulum oscillator $40_5$ includes a substantially annular support member $62_5$ and at least one pair of flyweights; respectively a first flyweight $64_1$ and a second flyweight $64_2$, that are arranged (mounted) axially on axially opposite sides of the support member $62_5$. The first and second flyweights $64_1$ and $64_2$ are connected axially to one another by at least one connecting member 66 passing axially through an associated opening 68 in a radially inner end 63i of the support member $62_5$. As best shown in FIGS. 16 and 18, each pair of the first and second flyweights $64_1$ and $64_2$ is connected axially to one another by two connecting members 66 passing axially through the associated openings 68 in the support member $62_5$.

The first and second flyweights $64_1$ and $64_2$ are configured to oscillate with respect to the support member $62_5$ in a rotation plane orthogonal to the rotation axis X. Accordingly, in reaction to rotational irregularities of the internal combustion engine 3, each of the first and second flyweights $64_1$ and $64_2$ shifts so that a center of mass thereof oscillates in pendulum fashion. The oscillation frequency of each of the first and second flyweights $64_1$ and $64_2$ is proportional to the rotation speed of the crankshaft 2 of the internal combustion engine 3. This pendulum motion of the first and second flyweights 64 allows vibrations and rotational irregularities of the engine to be damped and absorbed.

A radially outer end 63o of the support member $62_5$ is non-movably (i.e., fixedly) attached to both the casing 12 and the radially inner end of the flexplate 6 by appropriate means, such as by fasteners, rivets or welding. In the exemplary embodiment of FIGS. 16-18, the radially outer end 63o of the support member $62_5$ is fixed to both the casing 12 and the radially inner end of the flexplate 6 by the stud bolts 13, which are fixedly secured, such as by welding, to the first casing shell $12_1$ of the casing 12, best shown in FIG. 16, so that the stud bolts 13 extend through apertures 67 in the radially outer end 63o of the support member $62_5$, best shown in FIG. 16. Accordingly, the support member $62_5$ of the centrifugal pendulum oscillator $40_5$ is non-movably (i.e., fixedly) coupled to the casing 12.

An exemplary method for assembling the hydrokinetic torque coupling device $10_5$ according to the embodiment of FIGS. 16-18 is as follows. First, the turbine wheel 15, the impeller wheel 16, the stator 17, the torsional vibration damper 20, the dynamic absorber 30 and the centrifugal pendulum oscillator $40_5$ may each be preassembled. The torsional vibration damper 20 and the dynamic absorber 30 are mounted to the turbine hub 24 and fixed to the turbine wheel 15. Specifically, the turbine shell 15s of the turbine wheel 15, the connecting plate 56 of the dynamic absorber 30 and the flange 33 of the driven member 32 of the torsional vibration damper 20 are non-movably (i.e., fixedly) secured to the flange 24f of the turbine hub 24, as best shown in FIG. 13, by appropriate means, such as by rivets or welding. Next, the turbine wheel 15, the impeller wheel 16, and the stator 17 are assembled together so as to form the torque converter 14. Then, the locking piston 28 is slidably mounted to the turbine hub 24. Next, the first casing shell 12₁ is fixed to the second casing shell 12₂ of the casing 12 by the sealing weld 12w at their outer peripheries so that the torque converter 14 with the torsional vibration damper 20 and the dynamic absorber 30 is sealed within the casing 12, while the centrifugal pendulum oscillator 40₅ is disposed outside the casing 12. After that, the stud bolts 13 are fixedly secured, such as by welding, to the first casing shell 12₁ of the casing 12. Next, the support member 62₅ of the centrifugal pendulum oscillator 40₅ is non-movably (i.e., fixedly) attached to both the first casing shell 12₁ of the casing 12 and the radially outer end of the flexplate 6 by the stud bolts 13 extending through the apertures 67 in the radially outer end 63o of the support member 62₅. Then, the radially inner end of the flexplate 6 is non-rotatably connected to the crankshaft 2 by the one or more threaded fasteners 7.

Figure 19:
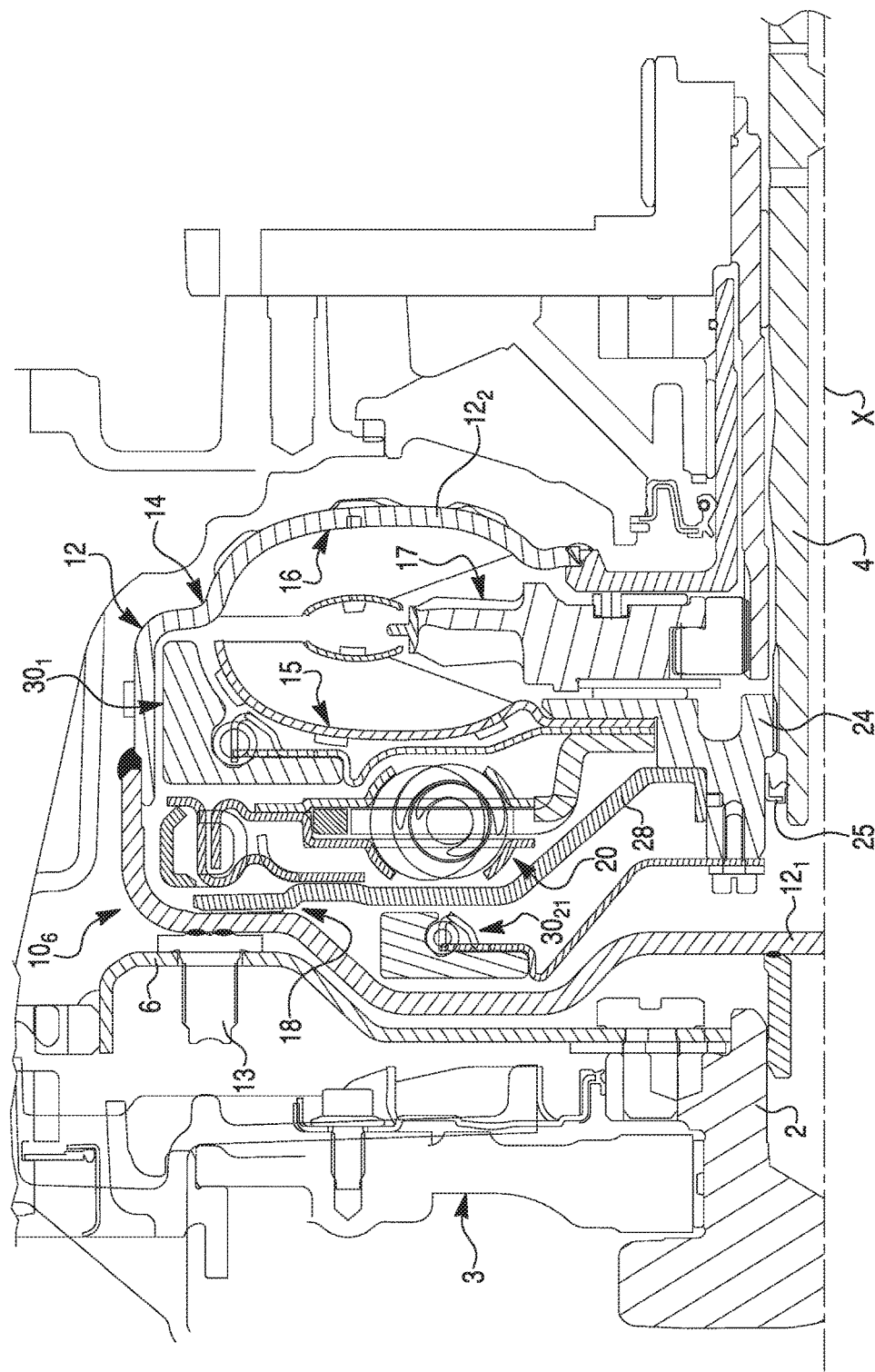
FIG. 19 is a fragmented half-view in axial section of a hydrokinetic torque coupling device in accordance with a sixth exemplary embodiment of the present invention.
Figure 20:
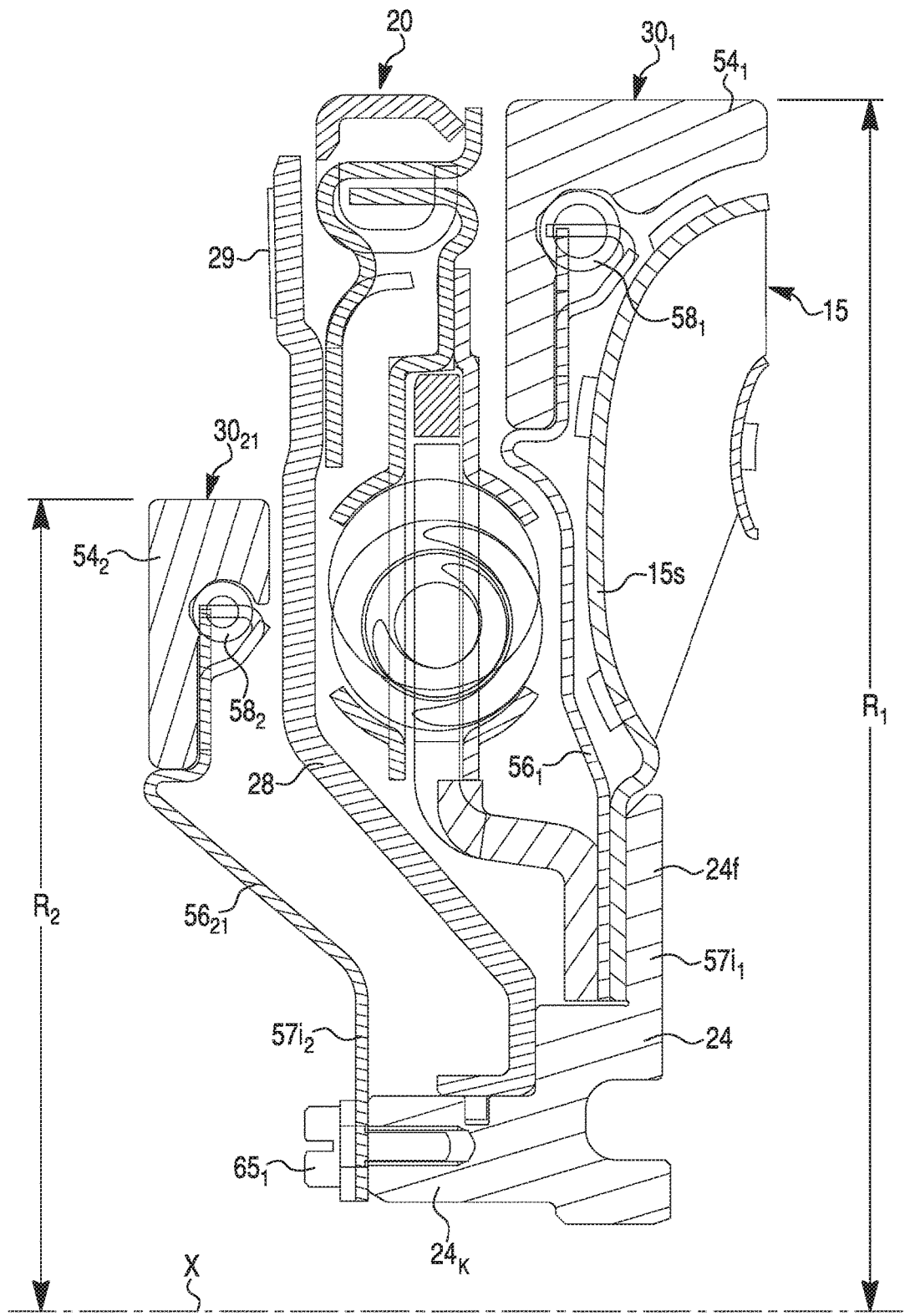
FIG. 20 is a fragmentary cross-sectional half-view of a torsional vibration damper and first and second vibration absorbers of the hydrokinetic torque coupling device in accordance with the sixth exemplary embodiment of the present invention.

In a hydrokinetic torque coupling device 10₆ of a sixth exemplary embodiment illustrated in FIGS. 19-20, the centrifugal pendulum oscillator 40 is replaced by a dynamic absorber 30₂₁. The hydrokinetic torque coupling device 10₆ of FIGS. 19-20 corresponds substantially to the hydrokinetic torque coupling device 10₁ of FIGS. 1-4, and only the dynamic absorber 30₂₁, which differs, will therefore be explained in detail below.

The torque coupling device 10₆ of the sixth exemplary embodiment comprises a hydrodynamic torque converter 14, a lock-up clutch 18, a torsional vibration damper 20, a first vibration absorber in the form of a first dynamic absorber 30₁ and a second vibration absorber in the form of a second dynamic absorber 30₂₁. According to the present invention, the first dynamic absorber 30₁ and the second dynamic absorber 30₂₁ are tuned to address different orders of vibrations.

The second dynamic absorber 30₂₁, as best shown in FIGS. 19-20, is disposed between the turbine hub 24 and the first casing shell 12₁ of the casing 12. Also, the second dynamic absorber 30₂₁, as best shown in FIGS. 19 and 20, is disposed axially between the first casing shell 12₁ and the locking piston 28. During vehicle operation, when the lock-up clutch 18 is in the disengaged (open) position, the engine torque is transmitted by the turbine wheel 15 of the torque converter 14 from the impeller wheel 16 to the turbine hub 24 through the first dynamic absorber 30₁ and the second dynamic absorber 30₂₁ only, bypassing the torsional vibration damper 20. However, when the lock-up clutch 18 is in the engaged (locked) position, the engine torque is transmitted by the casing 12 to the turbine hub 24 through the torsional vibration damper 20, as well as through the first dynamic absorber 30₁ and the second dynamic absorber 30₂₁.

As disclosed above, a first inertial member 54₁ of the first dynamic absorber 30₁ is a substantially annular heavy wheel having a relatively large mass $M_1$ for opposing and resisting by its inertia fluctuations in speed of the machinery, such as the hydrokinetic torque coupling device, with which it rotates. Moreover, the first inertial member 54₁ has an outer radius $R_1$ as best shown in FIG. 20. A radially inner end 57₁ of a connecting plate 56₁ is non-movably (i.e., fixedly) attached to the flange 24f of the turbine hub 24 by appropriate means, such as by rivets or welding. Thus, the turbine hub 24 is operatively, elastically and rotatably connected to the inertial member 54₁ of the first dynamic absorber 30₁ through the absorber elastic members 58₁. In other words, the inertial member 54₁ is rotatable relative to the turbine shell 15s of the turbine wheel 15, the torsional vibration damper 20, and the turbine hub 24 coaxially with the rotation axis X.

The second dynamic absorber 30₂₁ includes a substantially annular second inertial member (or absorber mass) 54₂, a substantially annular connecting plate 56₂₁ rotatably connected to the second inertial member 54₂ coaxially with the rotation axis X, and a plurality of circumferentially acting absorber elastic members 58₂ interposed between the second inertial member 54₂ and the connecting plate 56₂₁, as best shown in FIG. 20. The second inertial member 54₂ is drivingly and elastically coupled to the connecting plate 56₂₁ through the absorber elastic members 58₂.

The second inertial member 54₂ is a substantially annular heavy wheel having a relatively large mass $M_2$ for opposing and resisting by its inertia fluctuations in speed of the machinery, such as the hydrokinetic torque coupling device, with which it rotates. The second inertial member 54₂ is preferably an integral part, e.g., made of a single-piece or unitary component, but may be separate components fixedly connected together. Preferably, the second inertial member 54₂ is integrally made by stamping into an L-shape or by roll forming from a strip. Moreover, the second inertial member 564 has an outer radius $R_2$, as best shown in FIG. 20. Furthermore, the mass $M_1$ of the first inertial member 54₁ is substantially larger than the mass $M_2$ of the second inertial member 54₂, while the outer radius $R_1$ of the first inertial member 54₁ is substantially greater than the outer radius $R_2$ of the second inertial member 54₂, as best shown in FIG. 20. In other words, a radius of a center of gravity of the first inertial member 54₁ is substantially greater than a radius of a center of gravity of the second inertial member 54₂. Accordingly, the first dynamic absorber 30₁ and the second dynamic absorber 30₂₁ are tuned to address different orders of vibrations.

A radially inner end 57i₂ of the connecting plate 56₂₁ of the second dynamic absorber 30₂₁ is non-moveably attached to the turbine hub 24 by appropriate means, such as by threaded fasteners 65₁ (as best shown in FIG. 20) or, alternatively, by riveting, welding, press-fitting, gear spline connection with snap ring or interference, etc. Further according to the exemplary embodiment of the present invention, each of the absorber elastic members 58₂ of the second dynamic absorber 30₂₁ is in the form of helical (or coil) spring having a principal axis oriented substantially circumferentially about the rotation axis X. Thus, the turbine hub 24 is operatively, elastically and rotatably connected to the second inertial member 54₂ of the second dynamic absorber 30₂₁ through the absorber elastic members 58₂. In other words, the second dynamic absorber 30₂₁ is rotatable relative to the turbine hub 24 (thus the turbine shell 15s of the turbine wheel 15) and the torsional vibration damper 20 coaxially with respect to the rotation axis X.

An exemplary method for assembling the hydrokinetic torque coupling device 10₆ according to the embodiment of FIGS. 19-20 will now be explained. The torque converter 14 including the turbine wheel 15, the impeller wheel 16 and the stator 17, the torsional vibration damper 20, the first dynamic absorber 30₁ and the second dynamic absorber 30₂₁ may each be preassembled. The torsional vibration damper 20 and the first dynamic absorber 30₁ are mounted to the turbine hub 24 and fixed to the turbine wheel 15. Specifically, the turbine shell 15s of the turbine wheel 15, the connecting plate 56₁ of the first dynamic absorber 30₁ and the flange 33 of the driven member 32 of the torsional vibration damper 20 are non-movably (i.e., fixedly) secured to the flange 24f of the turbine hub 24, as best shown in FIG. 20, by appropriate means, such as by rivets or welding. Then, the turbine wheel 15, the impeller wheel 16, and the stator 17 are assembled together so as to form the torque converter 14. Next, the locking piston 28 is slidably mounted to the turbine hub 24. Then, the radially inner end $57i_2$ of the connecting plate $56_{21}$ is non-moveably attached to the turbine hub 24 by appropriate means, such as by the threaded fasteners 65 or welding. After that, the first casing shell $12_1$ is sealingly fixed to the second casing shell $12_2$ of the casing 12 by the weld $12w$ at their outer peripheries so that the torque converter 14, the torsional vibration damper 20, the first dynamic absorber $30_1$ and the second dynamic absorber $30_{21}$ are sealed within the casing 12.

Figure 21:
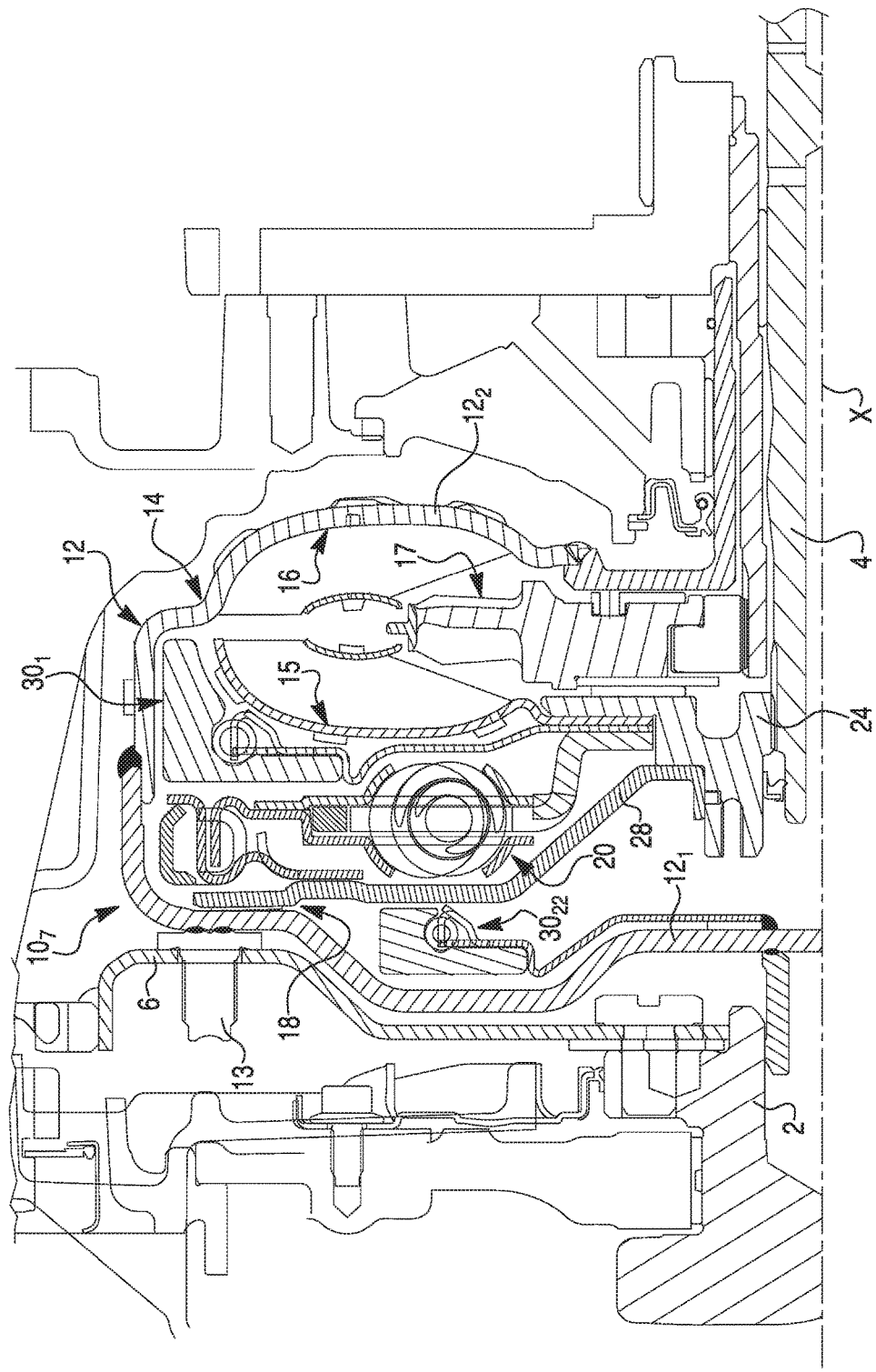
FIG. 21 is a fragmented half-view in axial section of a hydrokinetic torque coupling device in accordance with a seventh exemplary embodiment of the present invention.
Figure 22:
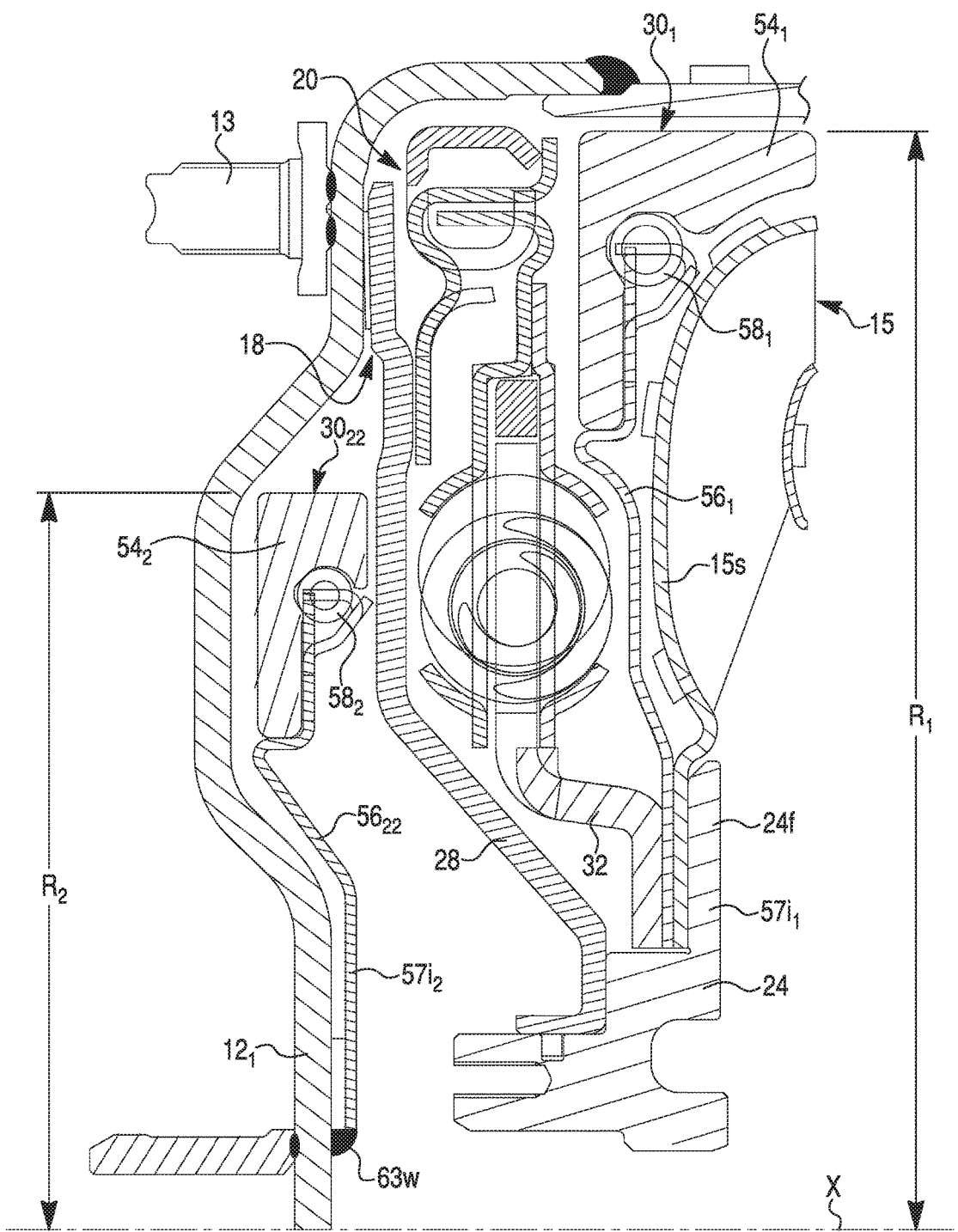
FIG. 22 is a fragmentary cross-sectional half-view of a torsional vibration damper and first and second vibration absorbers of the hydrokinetic torque coupling device in accordance with the seventh exemplary embodiment of the present invention.

In a hydrokinetic torque coupling device $10_7$ of a seventh exemplary embodiment illustrated in FIGS. 21-22, the centrifugal pendulum oscillator $40_2$ is replaced by a dynamic absorber $30_{22}$. The hydrokinetic torque coupling device $10_7$ of FIGS. 21-22 corresponds substantially to the hydrokinetic torque coupling device $10_2$ of FIGS. 5-8, and only the dynamic absorber $30_{22}$, which differs, will therefore be explained in detail below.

The torque coupling device $10_7$ of the seventh exemplary embodiment comprises a hydrodynamic torque converter 14, a lock-up clutch 18, a torsional vibration damper 20, a first vibration absorber in the form of a first dynamic absorber $30_1$ and a second vibration absorber in the form of a second dynamic absorber $30_{22}$. According to the present invention, the first dynamic absorber $30_1$ and the second dynamic absorber $30_{22}$ are tuned to address different orders of vibrations.

The second dynamic absorber $30_{22}$, as best shown in FIGS. 21-22, is disposed between the turbine hub 24 and the first casing shell $12_1$ of the casing 12. Also, the second dynamic absorber $30_{22}$, as best shown in FIGS. 21 and 22, is disposed axially between the first casing shell $12_1$ and the locking piston 28 within the casing 12. During vehicle operation, when the lock-up clutch 18 is in the disengaged (open) position, the engine torque is transmitted only by the turbine wheel 15 of the torque converter 14 from the impeller wheel 16 to the turbine hub 24 through the first dynamic absorber $30_1$ and the second dynamic absorber $30_{22}$, bypassing the torsional vibration damper 20. However, when the lock-up clutch 18 is in the engaged (locked) position, the engine torque is transmitted by the casing 12 to the turbine hub 24 through the torsional vibration damper 20, as well as through the first dynamic absorber $30_1$ and the second dynamic absorber $30_{22}$.

The second dynamic absorber $30_{22}$ includes a substantially annular second inertial member (or absorber mass) $54_2$, a substantially annular connecting plate $56_{22}$ rotatably connected to the second inertial member $54_2$ coaxially with the rotation axis X, and a plurality of circumferentially acting absorber elastic members $58_2$ interposed between the second inertial member $54_2$ and the connecting plate $56_{22}$, as best shown in FIG. 22. The second inertial member $54_2$ is drivingly and elastically coupled to the connecting plate $56_{22}$ through the absorber elastic members $58_2$.

The second inertial member $54_2$ is a substantially annular heavy wheel having a relatively large mass $M_2$ for opposing and resisting by its inertia fluctuations in speed of the machinery, such as the hydrokinetic torque coupling device, with which it rotates. Moreover, the second inertial member $54_2$ has an outer radius $R_2$, as best shown in FIG. 22. Furthermore, the mass $M_1$ of the first inertial member $54_1$ is substantially larger than the mass $M_2$ of the second inertial member $54_2$, while the outer radius $R_1$ of the first inertial member $54_1$ is substantially greater than the outer radius $R_2$ of the second inertial member $54_2$, as best shown in FIG. 22. In other words, a radius of a center of gravity of the first inertial member $54_1$ is substantially greater than a radius of a center of gravity of the second inertial member $54_2$. Accordingly, the first dynamic absorber $30_1$ and the second dynamic absorber $30_{22}$ are tuned to address different orders of vibrations.

A radially inner end $57i_2$ of the connecting plate $56_{22}$ of the second dynamic absorber $30_{22}$ is non-movably (i.e., fixedly) attached to the first casing shell $12_1$ of the casing 12 by appropriate means, such as by rivets or welding. In the exemplary embodiment of FIGS. 21-22, the radially inner end $57i_2$ of the connecting plate $56_{22}$ is welded to the first casing shell $12_1$ of the casing 12 by a weld $63w$, best shown in FIG. 22.

An exemplary method for assembling the hydrokinetic torque coupling device $10_7$ according to the embodiment of FIGS. 21-22 is as follows. First, the turbine wheel 15, the impeller wheel 16, the stator 17, the torsional vibration damper 20, the first dynamic absorber $30_1$ and the second dynamic absorber $30_{22}$ may each be preassembled. The torsional vibration damper 20 and the first dynamic absorber $30_1$ are mounted to the turbine hub 24 and fixed to the turbine wheel 15. Specifically, the turbine shell $15s$ of the turbine wheel 15, the connecting plate $56_1$ of the dynamic absorber $30_1$ and the flange 33 of the driven member 32 of the torsional vibration damper 20 are non-movably (i.e., fixedly) secured to the flange $24f$ of the turbine hub 24, as best shown in FIG. 22, by appropriate means, such as by rivets or welding. Next, the turbine wheel 15, the impeller wheel 16, and the stator 17 are assembled together so as to form the torque converter 14. Next, the locking piston 28 is slidably mounted to the turbine hub 24. Then, the radially inner end $57i_2$ of the connecting plate $56_{22}$ is non-moveably attached to the first casing shell $12_1$ of the casing 12 by appropriate means, such as by welding (see the weld $63w$ as best shown in FIG. 22). After that, the first casing shell $12_1$ is fixed to the second casing shell $12_1$ of the casing 12 by the sealing weld $12w$ at their outer peripheries so that the torque converter 14 with the torsional vibration damper 20 and the first dynamic absorber $30_1$, and the second dynamic absorber $30_{22}$ are sealed within the casing 12.

Figure 23:
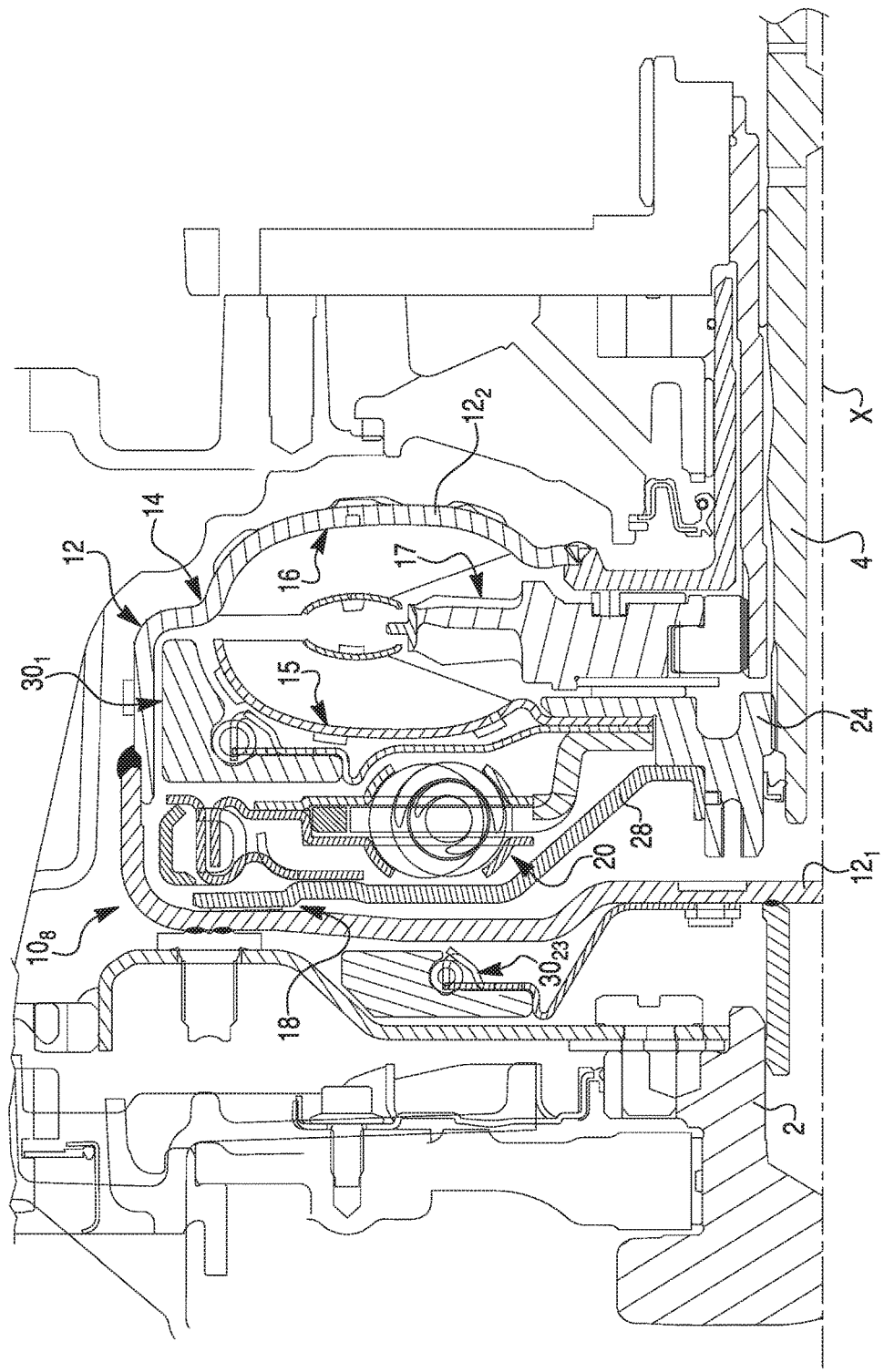
FIG. 23 is a fragmented half-view in axial section of a hydrokinetic torque coupling device in accordance with an eighth exemplary embodiment of the present invention.
Figure 24:
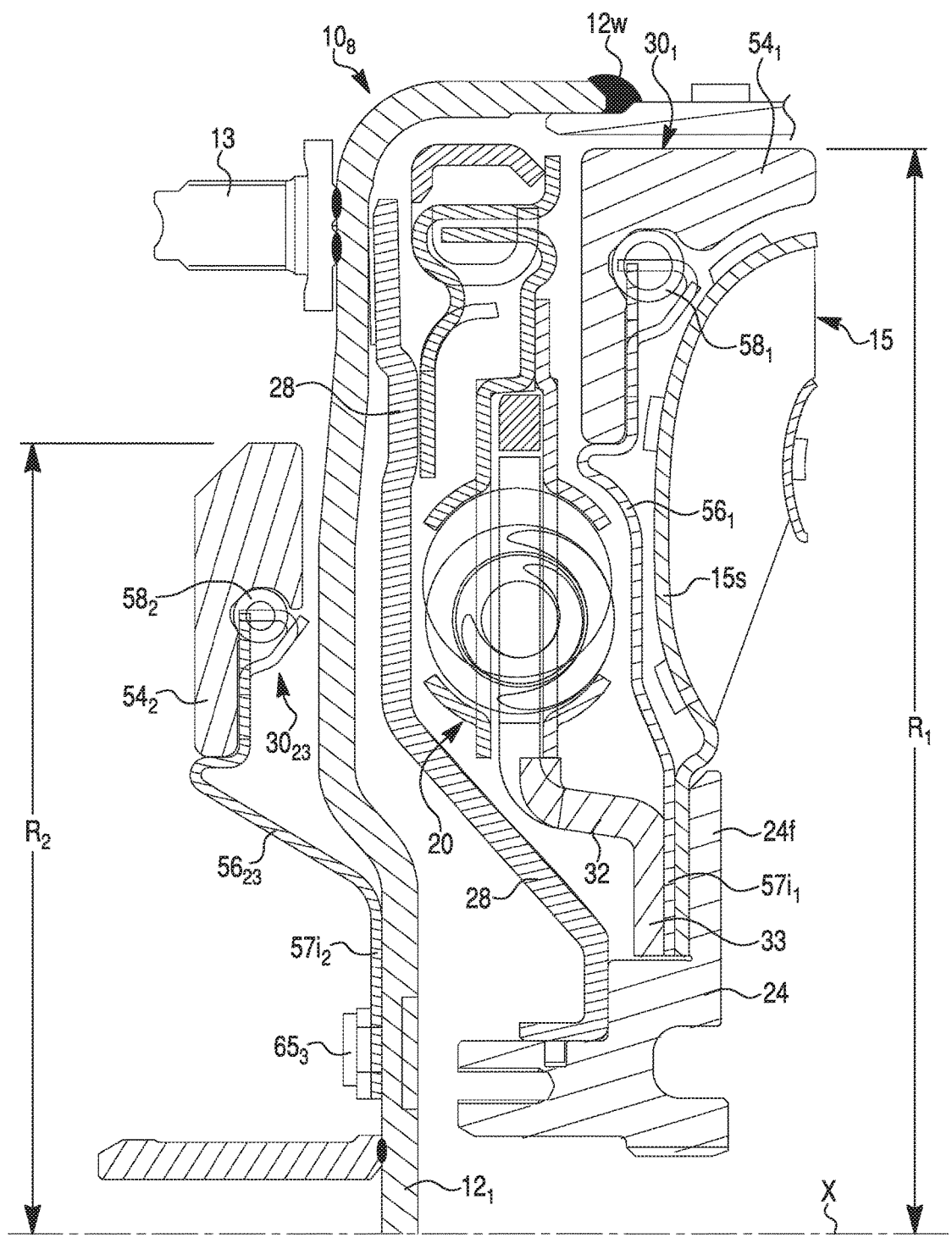
FIG. 24 is a fragmentary cross-sectional half-view of a torsional vibration damper and first and second vibration absorbers of the hydrokinetic torque coupling device in accordance with the eighth exemplary embodiment of the present invention.

In a hydrokinetic torque coupling device $10_8$ of an eighth exemplary embodiment illustrated in FIGS. 23-24, the centrifugal pendulum oscillator $40_3$ is replaced by a dynamic absorber $30_{23}$. The hydrokinetic torque coupling device $10_8$ of FIGS. 23-24 corresponds substantially to the hydrokinetic torque coupling device $10_3$ of FIGS. 5-8, and only the dynamic absorber $30_{23}$, which differs, will therefore be explained in detail below.

The torque coupling device $10_8$ of the eighth exemplary embodiment comprises a hydrodynamic torque converter 14, a lock-up clutch 18, a torsional vibration damper 20, a first vibration absorber in the form of a first dynamic absorber $30_1$ and a second vibration absorber in the form of a second dynamic absorber $30_{23}$. According to the present invention, the first dynamic absorber $30_1$ and the second dynamic absorber $30_{23}$ are tuned to address different orders of vibrations.

The second dynamic absorber $30_{23}$, as best shown in FIGS. 23-24, is disposed outside of a casing 12 between a first casing shell $12_1$ of the casing 12 and flexplate 6 of the internal combustion engine 3. The second dynamic absorber $30_{23}$ includes a substantially annular second inertial member (or absorber mass) $54_2$, a substantially annular connecting plate $56_{23}$ rotatably connected to the second inertial member $54_2$ coaxially with the rotation axis X, and a plurality of circumferentially acting absorber elastic members $58_2$ interposed between the second inertial member $54_2$ and the connecting plate $56_{23}$, as best shown in FIG. 24. The second inertial member $54_2$ is drivingly and elastically coupled to the connecting plate $56_{23}$ through the absorber elastic members $58_2$.

Furthermore, the mass $M_1$ of the first inertial member $54_1$ is substantially larger than the mass $M_2$ of the second inertial member $54_2$, while the outer radius $R_1$ of the first inertial member $54_1$ is substantially greater than the outer radius $R_2$ of the second inertial member $54_2$, as best shown in FIG. 24. In other words, a radius of a center of gravity of the first inertial member $54_1$ is substantially greater than a radius of a center of gravity of the second inertial member $54_2$. Accordingly, the first dynamic absorber $30_1$ and the second dynamic absorber $30_{23}$ are tuned to address different orders of vibrations.

A radially inner end $57i_2$ of the connecting plate $56_{23}$ of the second dynamic absorber $30_{23}$ is non-movably (i.e., fixedly) attached to the first casing shell $12_1$ of the casing 12 by appropriate means, such as by fasteners, rivets or welding. In the exemplary embodiment of FIGS. 23-24, the radially inner end $57i_2$ of the connecting plate $56_{23}$ is fixed to the first casing shell $12_1$ of the casing 12 by rivets $65_3$, best shown in FIG. 24, extending through apertures in the radially inner end $57i_2$ of the connecting plate $56_{23}$, best shown in FIG. 24.

An exemplary method for assembling the hydrokinetic torque coupling device $10_8$ according to the embodiment of FIGS. 23-24 is as follows. First, the turbine wheel 15, the impeller wheel 16, the stator 17, the torsional vibration damper 20, the first dynamic absorber $30_1$ and the second dynamic absorber $30_{23}$ may each be preassembled. The torsional vibration damper 20 and the first dynamic absorber $30_1$ are mounted to the turbine hub 24 and fixed to the turbine wheel 15. Specifically, the turbine shell 15s of the turbine wheel 15, the connecting plate $56_1$ of the first dynamic absorber $30_1$ and the flange 33 of the driven member 32 of the torsional vibration damper 20 are non-movably (i.e., fixedly) secured to the flange 24f of the turbine hub 24, as best shown in FIGS. 23 and 24, by appropriate means, such as by rivets or welding. Next, the turbine wheel 15, the impeller wheel 16, and the stator 17 are assembled together so as to form the torque converter 14. Then, the locking piston 28 is slidably mounted to the turbine hub 24. Next, the radially inner end $57i_2$ of the connecting plate $56_{23}$ is non-moveably attached to the first casing shell $12_1$ of the casing 12 outside the casing 12 by appropriate means, such as by the rivers $65_3$ extending through apertures in the radially inner end $57i_2$ of the connecting plate $56_{23}$, as best shown in FIG. 24. After that, the first casing shell $12_1$ is fixed to the second casing shell $12_2$ of the casing 12 by sealing weld 12w at their outer peripheries so that the torque converter 14 with the torsional vibration damper 20 and the first dynamic absorber $30_1$ is sealed within the casing 12, while the second dynamic absorber $30_{23}$ is disposed outside the casing 12.

Figure 25:
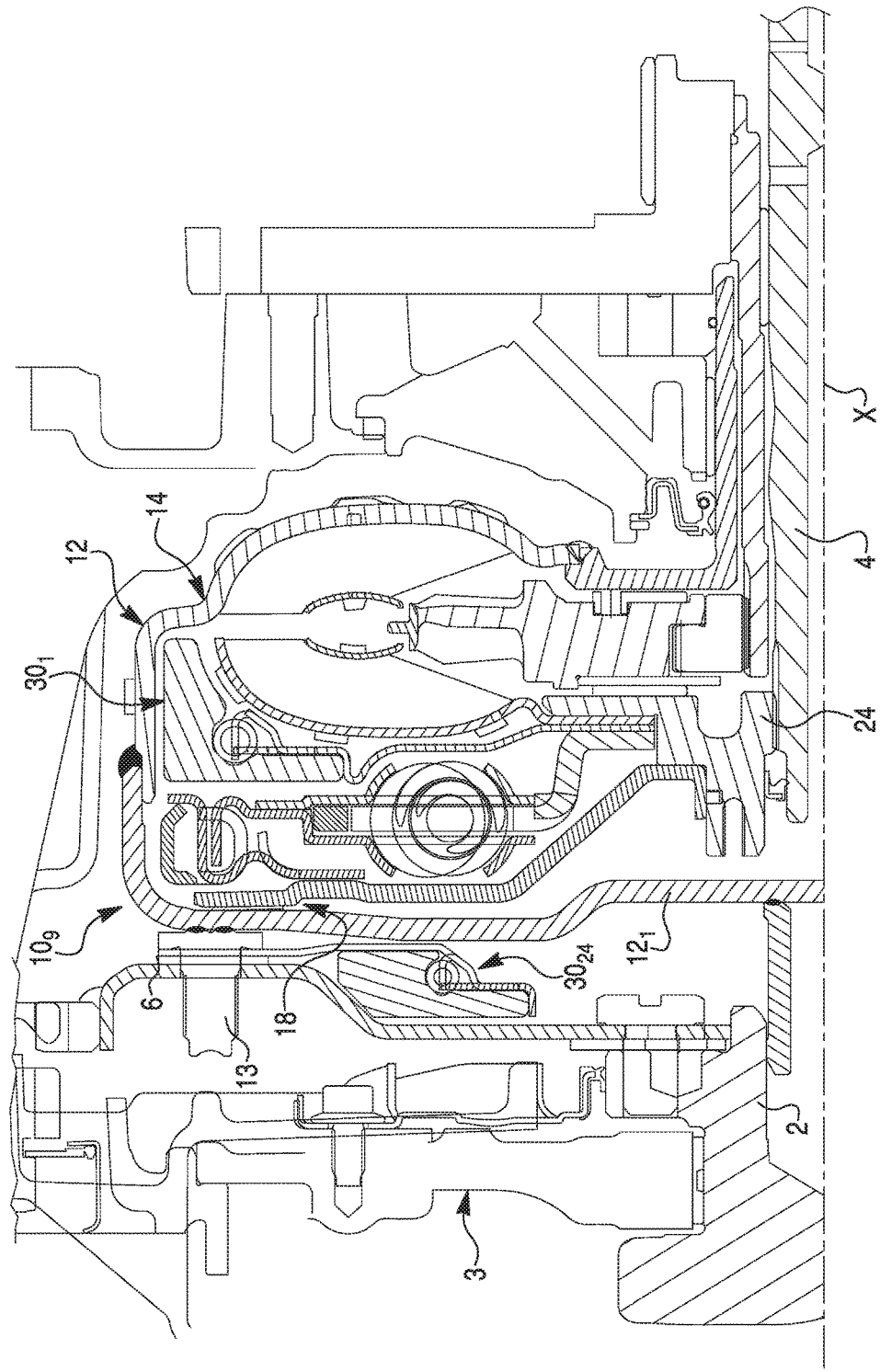
FIG. 25 is a fragmented half-view in axial section of a hydrokinetic torque coupling device in accordance with a ninth exemplary embodiment of the present invention.
Figure 26:
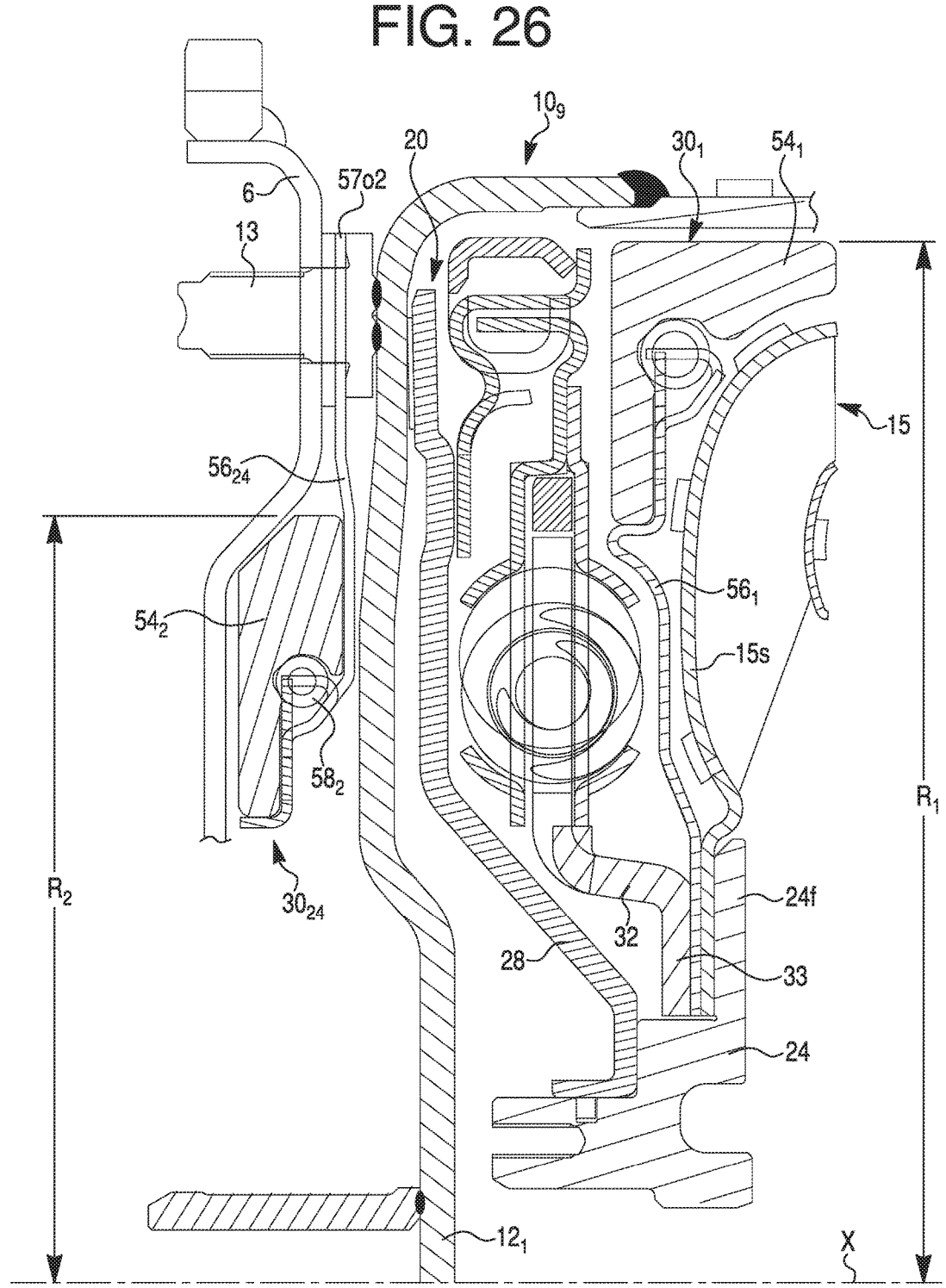
FIG. 26 is a fragmentary cross-sectional half-view of a torsional vibration damper and first and second vibration absorbers of the hydrokinetic torque coupling device in accordance with the ninth exemplary embodiment of the present invention.

In a hydrokinetic torque coupling device $10_9$ of an ninth exemplary embodiment illustrated in FIGS. 25-26, the centrifugal pendulum oscillator $40_5$ is replaced by a dynamic absorber $30_{24}$. The hydrokinetic torque coupling device $10_9$ of FIGS. 25-26 corresponds substantially to the hydrokinetic torque coupling device $10_5$ of FIGS. 16-18, and only the dynamic absorber $30_{24}$, which differs, will therefore be explained in detail below.

The torque coupling device $10_9$ of the ninth exemplary embodiment comprises a hydrodynamic torque converter 14, a lock-up clutch 18, a torsional vibration damper 20, a first vibration absorber in the form of a first dynamic absorber $30_1$ and a second vibration absorber in the form of a second dynamic absorber $30_{24}$. According to the present invention, the first dynamic absorber $30_1$ and the second dynamic absorber $30_{24}$ are tuned to address different orders of vibrations.

The second dynamic absorber $10_9$, as shown in FIGS. 25-26, is disposed outside of casing 12 between a first casing shell $12_1$ of the casing 12 and a flexplate 6 interconnecting the casing 12 of the torque coupling device $10_9$ and crankshaft 2 of the internal combustion engine 3. The second dynamic absorber $30_{24}$ includes a substantially annular second inertial member (or absorber mass) $54_2$, a substantially annular connecting plate $56_{24}$ rotatably connected to the second inertial member $54_2$ coaxially with the rotation axis X, and a plurality of circumferentially acting absorber elastic members $58_2$ interposed between the second inertial member $54_2$ and the connecting plate $56_{24}$, as best shown in FIG. 26. The second inertial member $54_2$ is drivingly and elastically coupled to the connecting plate $56_{24}$ through the absorber elastic members $58_2$.

Furthermore, a mass $M_1$ of the first inertial member $54_1$ is substantially larger than a mass $M_2$ of the second inertial member $54_2$, while an outer radius $R_1$ of the first inertial member $54_1$ is substantially greater than an outer radius $R_2$ of the second inertial member $54_2$, as best shown in FIG. 26. In other words, a radius of a center of gravity of the first inertial member $54_1$ is substantially greater than a radius of a center of gravity of the second inertial member $54_2$. Accordingly, the first dynamic absorber $30_1$ and the second dynamic absorber $30_{24}$ are tuned to address different orders of vibrations.

A radially outer end $57o_2$ of the connecting plate $56_{24}$ of the second dynamic absorber $30_{24}$ is non-movably (i.e., fixedly) attached to both the first casing shell $12_1$ of the casing 12 and the radially outer end of the flexplate 6 by appropriate means, such as by fasteners, rivets or welding. In the exemplary embodiment of FIGS. 25-26, the radially outer end $57o_2$ of the connecting plate $56_{24}$ is fixed to both the casing 12 and the radially outer end of the flexplate 6 by the stud bolts 13, which are fixedly secured, such as by welding, to the first casing shell $12_1$ of the casing 12, best shown in FIG. 26, so that the stud bolts 13 extend through apertures in the radially outer end $57o_2$ of the connecting plate $56_{24}$. Accordingly, the connecting plate $56_{24}$ of the second dynamic absorber $30_{24}$ is non-movably (i.e., fixedly) coupled to the casing 12.

An exemplary method for assembling the hydrokinetic torque coupling device $10_9$ according to the embodiment of FIGS. 25-26 is as follows. First, the turbine wheel 15, the impeller wheel 16, the stator 17, the torsional vibration damper 20, the first dynamic absorber $30_1$ and the second dynamic absorber $30_{24}$ may each be preassembled. The torsional vibration damper 20 and the first dynamic absorber $30_1$ are mounted to the turbine hub 24 and fixed to the turbine wheel 15. Specifically, the turbine shell 15s of the turbine wheel 15, the connecting plate $56_1$ of the first dynamic absorber 30 and the flange 33 of the driven member 32 of the torsional vibration damper 20 are non-movably (i.e., fixedly) secured to the flange 24f of the turbine hub 24, as best shown in FIG. 13, by appropriate means, such as by rivets or welding. Next, the turbine wheel 15, the impeller wheel 16, and the stator 17 are assembled together so as to form the torque converter 14. Then, the locking piston 28 is slidably mounted to the turbine hub 24. Next, the first casing shell $12_1$ is fixed to the second casing shell $12_2$ of the casing 12 by sealing weld 12w at their outer peripheries so that the torque converter 14 with the torsional vibration damper 20 and the first dynamic absorber $30_1$ is sealed within the casing 12, while the second dynamic absorber $30_{24}$ is disposed outside the casing 12. After that, the stud bolts 13 are fixedly secured, such as by welding, to the first casing shell $12_1$ of the casing 12. Next, the connecting plate $56_{24}$ of the second dynamic absorber $30_{24}$ is non-movably (i.e., fixedly) attached to both the first casing shell $12_1$ of the casing 12 and the radially outer end of the flexplate 6 by the stud bolts 13 extending through the apertures in the radially outer end $57o_2$ of the connecting plate $56_{24}$. Then, the radially inner end of the flexplate 6 is non-rotatably connected to the crankshaft 2 by the one or more threaded fasteners 7.

Figure 27:
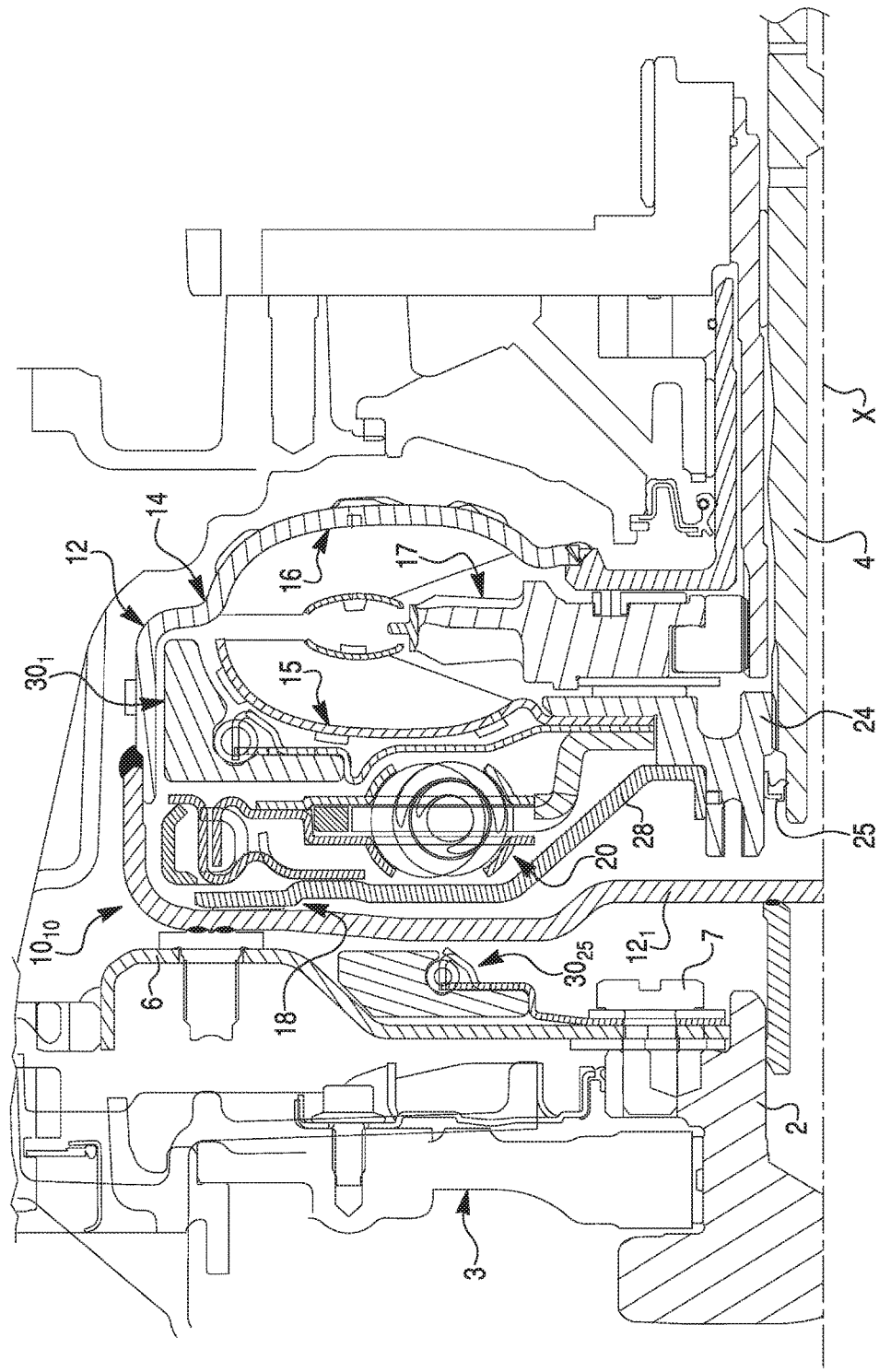
FIG. 27 is a fragmented half-view in axial section of a hydrokinetic torque coupling device in accordance with a tenth exemplary embodiment of the present invention.
Figure 28:
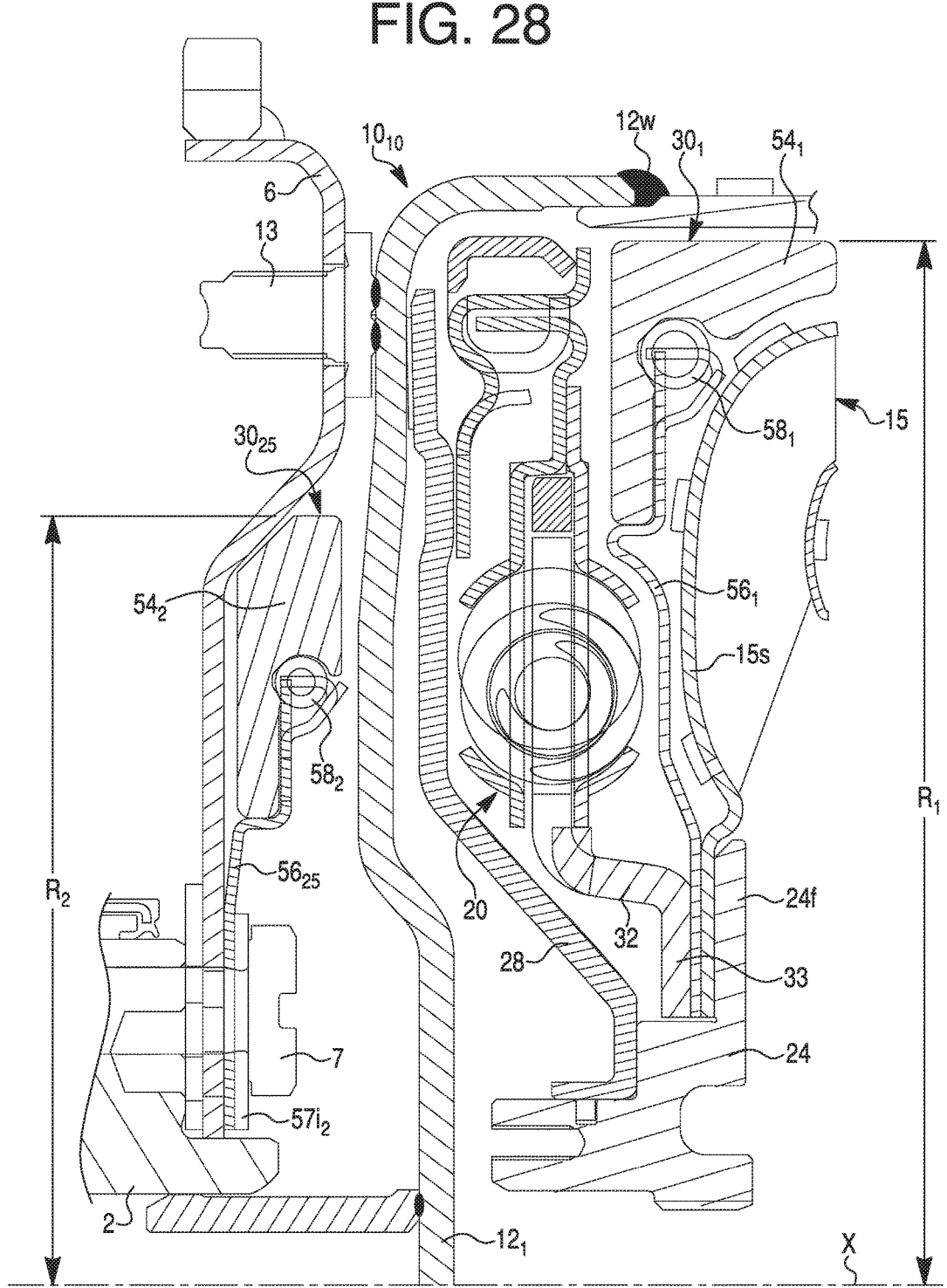
FIG. 28 is a fragmentary cross-sectional half-view of a torsional vibration damper and first and second vibration absorbers of the hydrokinetic torque coupling device in accordance with the tenth exemplary embodiment of the present invention.

In a hydrokinetic torque coupling device $10_{10}$ of a tenth exemplary embodiment illustrated in FIGS. 27-28, the centrifugal pendulum oscillator 340 is replaced by a dynamic absorber $30_{25}$. The hydrokinetic torque coupling device $10_{10}$ of FIGS. 27-28 corresponds substantially to the hydrokinetic torque coupling device $10_4$ of FIGS. 13-15, and only the dynamic absorber $30_{25}$, which differs, will therefore be explained in detail below.

The torque coupling device $10_{10}$ of the tenth exemplary embodiment comprises a hydrodynamic torque converter 14, a lock-up clutch 18, a torsional vibration damper 20, a first vibration absorber in the form of a first dynamic absorber $30_1$ and a second vibration absorber in the form of a second dynamic absorber $30_{25}$. According to the present invention, the first dynamic absorber $30_1$ and the second dynamic absorber $30_{25}$ are tuned to address different orders of vibrations.

The second dynamic absorber $30_{25}$, as shown in FIGS. 27-28, is disposed outside of casing 12 between a first casing shell $12_1$ of the casing 12 and flexplate 6, interconnecting the casing 12 of the torque coupling device $10_{10}$ and crankshaft 2 of the internal combustion engine 3. The second dynamic absorber $30_{25}$ includes a substantially annular second inertial member (or absorber mass) $54_2$, a substantially annular second connecting plate $56_{25}$ rotatably connected to the second inertial member $54_2$ coaxially with the rotation axis X, and a plurality of circumferentially acting absorber elastic members $58_2$ interposed between the second inertial member $54_2$ and the connecting plate $56_{25}$, as best shown in FIG. 28. The second inertial member $54_2$ is drivingly and elastically coupled to the second connecting plate $56_{25}$ through the second absorber elastic members $58_2$.

Furthermore, mass $M_1$ of the first inertial member $54_1$ is substantially larger than mass $M_2$ of the second inertial member $30_{25}$, while an outer radius $R_1$ of the first inertial member $54_1$ is substantially greater than an outer radius $R_2$ of the second inertial member $30_{25}$, as best shown in FIG. 28. In other words, the radius of the center of gravity of the first inertial member $54_1$ is substantially greater than the radius of a center of gravity of the second inertial member $54_2$. Accordingly, the first dynamic absorber $30_1$ and the second dynamic absorber $30_{25}$ are tuned to address different orders of vibrations.

A radially inner end $57i_2$ of the second connecting plate $56_{25}$ is non-movably (i.e., fixedly) attached to both the crankshaft 2 and the radially inner end of the flexplate 6 by appropriate means, such as by fasteners, rivets or welding. In the exemplary embodiment of FIGS. 27-28, the radially inner end $57i_2$ of the second connecting plate $56_{25}$ is non-rotatably fixed to both the crankshaft 2 and the radially inner end of the flexplate 6 by threaded fasteners 7, best shown in FIG. 28, extending through apertures in the radially inner end $57i_2$ of the connecting plate $56_{25}$. Accordingly, the second connecting plate $56_{25}$ of the second dynamic absorber $30_{25}$ is non-movably (i.e., fixedly) coupled to the casing 12.

An exemplary method for assembling the hydrokinetic torque coupling device $10_{10}$ according to the embodiment of FIGS. 27-28 is as follows. First, the turbine wheel 15, the impeller wheel 16, the stator 17, the torsional vibration damper 20, the first dynamic absorber $30_1$ and the second dynamic absorber $30_{25}$ may each be preassembled. The torsional vibration damper 20 and the first dynamic absorber $30_1$ are mounted to the turbine hub 24 and fixed to the turbine wheel 15. Specifically, the turbine shell $15s$ of the turbine wheel 15, the first connecting plate $56_1$ of the first dynamic absorber $30_1$ and the flange 33 of the driven member 32 of the torsional vibration damper 20 are non-movably (i.e., fixedly) secured to the flange $24f$ of the turbine hub 24, as best shown in FIG. 28, by appropriate means, such as by rivets or welding. Next, the turbine wheel 15, the impeller wheel 16, and the stator 17 are assembled together so as to form the torque converter 14. Then, the locking piston 28 is slidably mounted to the turbine hub 24. Next, the first casing shell $12_1$ is fixed to the second casing shell $12_2$ of the casing 12 by sealing weld $12w$ at their outer peripheries so that the torque converter 14 with the torsional vibration damper 20 and the first dynamic absorber $30_1$ is sealed within the casing 12, while the second dynamic absorber $30_{25}$ is disposed outside the casing 12. After that, the stud bolts 13 are fixedly secured, such as by welding, to the first casing shell $12_1$ of the casing 12. Next, the second connecting plate $56_{25}$ of the second dynamic absorber $30_{25}$ is non-movably (i.e., fixedly) attached to both the crankshaft 2 and the radially inner end of the flexplate 6 by the threaded fasteners 7 extending through the apertures in the radially inner end $57i_2$ of the second connecting plate $56_{25}$. Then, a radially outer end of the flexplate 6 is non-rotatably connected to the first casing shell $12_1$ of the casing 12 through the stud bolts 13.

Figure 29:
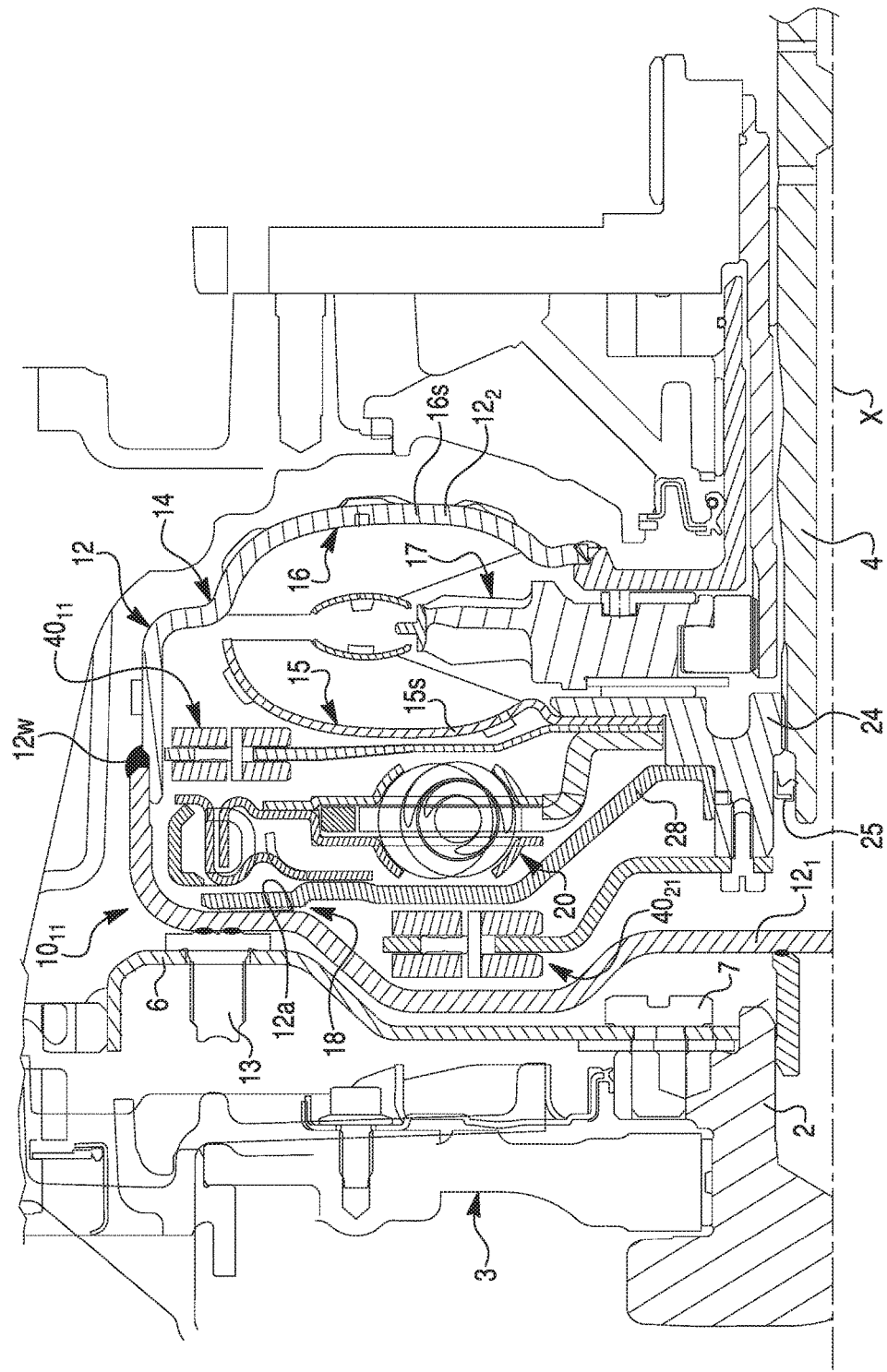
FIG. 29 is a fragmented half-view in axial section of a hydrokinetic torque coupling device in accordance with an eleventh exemplary embodiment of the present invention.
Figure 30:
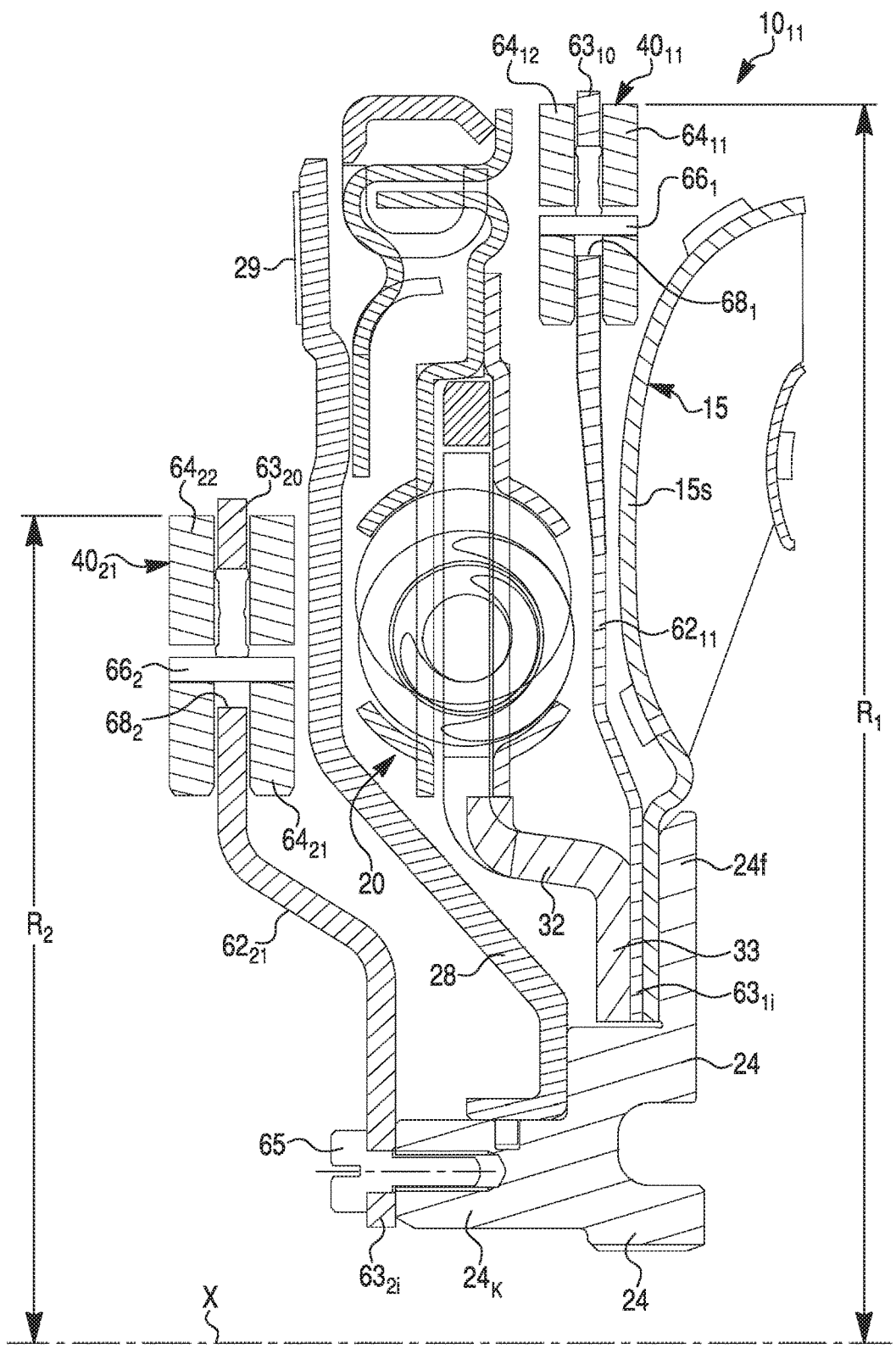
FIG. 30 is a fragmentary cross-sectional half-view of a torsional vibration damper and first and second vibration absorbers of the hydrokinetic torque coupling device in accordance with the eleventh exemplary embodiment of the present invention.

In a hydrokinetic torque coupling device $10_{11}$ of an eleventh exemplary embodiment illustrated in FIGS. 29-30, the dynamic absorber 30 is replaced by a centrifugal pendulum oscillator $40_{11}$. The hydrokinetic torque coupling device $10_{11}$ of FIGS. 29-30 corresponds substantially to the hydrokinetic torque coupling device $10_1$ of FIGS. 1-4, and only the centrifugal pendulum oscillator $40_{11}$, which differs, will therefore be explained in detail below.

The torque coupling device $10_{11}$ of the eleventh exemplary embodiment comprises a hydrodynamic torque converter 14, a lock-up clutch 18, a torsional vibration damper 20, a first vibration absorber in the form of a first centrifugal pendulum oscillator $40_{11}$ and a second vibration absorber in the form of a second centrifugal pendulum oscillator $40_{21}$. According to the present invention, the first centrifugal pendulum oscillator $40_{11}$ and the second centrifugal pendulum oscillator $40_{21}$ are tuned to address different orders of vibrations.

The second centrifugal pendulum oscillator $40_{21}$ is substantially identical to the centrifugal pendulum oscillator $40_1$ according to the first exemplary embodiment illustrated in FIGS. 1-4. The first centrifugal pendulum oscillator $40_{11}$ is substantially structurally identical to the second centrifugal pendulum oscillator $40_{21}$ but is geometrically (dimensionally) different.

The first centrifugal pendulum oscillator $40_{11}$, as best shown in FIG. 29, is disposed between the turbine hub 24 that is fixedly (i.e., non-movably) connected with the turbine shell $15s$ of the turbine wheel 15, and the torsional vibration damper 20. Moreover, the first centrifugal pendulum oscillator $40_{11}$, as best shown in FIGS. 29 and 30, is disposed axially between the turbine shell $15s$ and the torsional vibration damper 20. Also, the torsional vibration damper

20, as best shown in FIGS. 29 and 30, is disposed axially between the first centrifugal pendulum oscillator 40₁₁ and the locking piston 28.

The second centrifugal pendulum oscillator 40₂₁, as best shown in FIGS. 29 and 30, is disposed between the turbine hub 24 and the first casing shell 12₁ of the casing 12. Also, the second centrifugal pendulum oscillator 40₂₁ is disposed axially between the first casing shell 12₁ and the locking piston 28.

During vehicle operation, when the lock-up clutch 18 is in the disengaged (open) position, engine torque is transmitted only by the turbine wheel 15 of the torque converter 14 from the impeller wheel 16 to the turbine hub 24 through the first centrifugal pendulum oscillator 40₁₁ and the second centrifugal pendulum oscillator 40₂₁ bypassing the torsional vibration damper 20. However, when the lock-up clutch 18 is in the engaged (locked) position, the engine torque is transmitted by the casing 12 to the turbine hub 24 through the torsional vibration damper 20, as well as through the first centrifugal pendulum oscillator 40₁₁ and the second centrifugal pendulum oscillator 40₂₁.

The first centrifugal pendulum oscillator 40₁₁ is operatively connected to the turbine shell 15s of the turbine wheel 15 and the turbine hub 24. The first centrifugal pendulum oscillator 40₁₁ functions as a dynamic damper for filtering vibrations caused by irregularities, and takes effect before engine torque is transmitted to the automotive transmission or gearbox, thus further dampening the torsional vibration (variation in speed of rotation) transmitted to the turbine hub 24 of the torque converter 14.

The first centrifugal pendulum oscillator 40₁₁ includes a substantially annular support member 62₁₁ and at least one pair of flyweights, respectively a first flyweight 64₁₁ and a second flyweight 64₁₂, that are arranged (mounted) axially on axially opposite sides of the support member 62₁₁. In the illustrated embodiments, the first and second flyweights 64₁₁ and 64₁₂ are substantially structurally and functionally identical. In view of the similarities of the illustrated first and second flyweights 64₁₁ and 64₁₂, and in the interest of simplicity, the following discussion will occasionally use a reference numeral 64₁.

The first and second flyweights 64₁ are connected axially to one another by at least one connecting member 66₁ passing axially through an associated opening 68₁ in a radially outer end 63₁o of the support member 62₁₁. The first centrifugal pendulum oscillator 40₁₁ may include one, two, three, four, five, six, or more pairs of the first and second flyweights 64₁. Preferably, the first centrifugal pendulum oscillator 40₁₁ includes three pairs of the first and second flyweights 64₁, and each pair of the first and second flyweights 64₁ is connected axially to one another by two connecting members 66₁₁ passing axially through associated openings 68₁ in the support member 62₁₁. Advantageously, each of the connecting members 66₁ defines a spacer that determines an axial spacing between the flyweights 64₁, and a clearance with respect to the support member 62₁₁.

The first and second flyweights 64₁ are configured to oscillate with respect to the support member 62₁₁ in a rotation plane orthogonal to the rotation axis X. Accordingly, in reaction to rotational irregularities of the internal combustion engine 3, each of the first and second flyweights 64₁ shifts so that a center of mass thereof oscillates in pendulum fashion. The oscillation frequency of each of the first and second flyweights 64₁ is proportional to the rotation speed of the crankshaft 2 of the internal combustion engine 3. This pendulum motion of the first and second flyweights 64₁ allows vibrations and rotational irregularities of the engine to be damped and absorbed.

A radially inner end 63₁i of the support member 62₁₁ is non-movably (i.e., fixedly) attached to the flange 24f of the turbine hub 24 by appropriate means, such as by rivets or welding. Thus, the turbine hub 24 is operatively and rotatably connected to the first and second flyweights 64₁ of the first centrifugal pendulum oscillator 40₁₁ through the support member 62₁₁. In other words, the first and second flyweights 64₁ are moveable relative to the turbine shell 15s of the turbine wheel 15, the torsional vibration damper 20, and the turbine hub 24 coaxially with the rotation axis X.

The second centrifugal pendulum oscillator 40₂₁ includes a substantially annular support member 62₂₁ and at least one pair of flyweights, respectively a first flyweight 64₂₁ and a second flyweight 64₂₂, that are arranged (mounted) axially on axially opposite sides of the support member 62₂₁. In the illustrated embodiments, the first and second flyweights 64₂₁ and 64₂₂ are substantially structurally and functionally identical. In view of the similarities of the illustrated first and second flyweights 64₂₁ and 64₂₂, and in the interest of simplicity, the following discussion will occasionally use a reference numeral 64₂.

The first and second flyweights 64₂ are connected axially to one another by at least one connecting member 66₂ passing axially through an associated opening 68₂ in a radially outer end 63₂o of the support member 62₂₁. The second centrifugal pendulum oscillator 40₂₁ may include one, two, three, four, five, six, or more pairs of the first and second flyweights 64₂. Preferably, the second centrifugal pendulum oscillator 40₂₁ includes three pairs of the first and second flyweights 64₂, and each pair of the first and second flyweights 64₂ is connected axially to one another by two connecting members 66₂ passing axially through the associated openings 68₂ in the support member 62₂₁. Advantageously, each of the connecting members 66₂ defines a spacer that determines an axial spacing between the flyweights 64₂, and a clearance with respect to the support member 62₂₁.

The first and second flyweights 64₂ are configured to oscillate with respect to the support member 62₂₁ in a rotation plane orthogonal to the rotation axis X. Accordingly, in reaction to rotational irregularities of the internal combustion engine 3, each of the first and second flyweights 64₂ shifts so that a center of mass thereof oscillates in pendulum fashion. The oscillation frequency of each of the first and second flyweights 64₂ is proportional to the rotation speed of the crankshaft 2 of the internal combustion engine 3. This pendulum motion of the first and second flyweights 64₂ allows vibrations and rotational irregularities of the engine to be damped and absorbed.

A radially inner end 63₂i of the support member 62₂₁ is non-moveably attached to the turbine hub 24 by appropriate means, such as by threaded fasteners 65₁ or, alternatively, by riveting, welding, press-fitting, gear spline connection with snap ring, or interference, etc. In the exemplary embodiment of FIGS. 29-30, threaded fasteners 65₁ axially extend through holes in the radially inner end 63₂i of the support member 62₂₁ into the turbine hub 24, best shown in FIG. 30.

Each of the flyweights 64₁ of the first centrifugal pendulum oscillator 40₁₁ has a mass $M_1$. Moreover, each of the flyweights 64₁ has an outer radius $R_1$, as best shown in FIG. 30. Similarly, each of the flyweights 64₂ of the second centrifugal pendulum oscillator 40₂₁ has a mass $M_2$. Each of the flyweights 64₂ has an outer radius $R_2$, as best shown in FIG. 30. Furthermore, the mass $M_1$ of the flyweights 64₁ of the first centrifugal pendulum oscillator 40₁₁ is substantially different than the mass $M_2$ of the flyweights $64_2$ of the second centrifugal pendulum oscillator $40_{21}$, while the outer radius $R_1$ of the flyweights $64_1$ is substantially greater than the outer radius $R_2$ of the flyweights $64_2$, as best shown in FIG. 30. In other words, a radius of a center of gravity of the flyweights $64_1$ of the first centrifugal pendulum oscillator $40_{11}$ is substantially greater than a radius of a center of gravity of the flyweights $64_2$ of the second centrifugal pendulum oscillator $40_{21}$. Accordingly, the first centrifugal pendulum oscillator $40_{11}$ and the second centrifugal pendulum oscillator $40_{21}$ are tuned to address different orders of vibrations.

An exemplary method for assembling the hydrokinetic torque coupling device $10_{11}$ according to the embodiment of FIGS. 29-30 is as follows. First, the turbine wheel 15, the impeller wheel 16, the stator 17, the torsional vibration damper 20, the first centrifugal pendulum oscillator $40_{11}$ and the second centrifugal pendulum oscillator $40_{21}$ may each be preassembled. The torsional vibration damper 20 and the first centrifugal pendulum oscillator $40_{11}$ are mounted to the turbine hub 24 and fixed to the turbine wheel 15. Specifically, the turbine shell 15s of the turbine wheel 15, the support member $62_{11}$ of the first centrifugal pendulum oscillator $40_{11}$ and the flange 33 of the driven member 32 of the torsional vibration damper 20 are non-movably (i.e., fixedly) secured to the flange 24f of the turbine hub 24, as best shown in FIGS. 29 and 30, by appropriate means, such as by rivets or welding. Then, the turbine wheel 15, the impeller wheel 16, and the stator 17 are assembled together so as to form the torque converter 14. Next, the locking piston 28 is slidably mounted to the turbine hub 24. Then, the radially inner end $63_2i$ of the support member $62_{21}$ is non-moveably attached to the turbine hub 24 by appropriate means, such as by the threaded fasteners 65 or welding. After that, the first casing shell $12_1$ is sealingly fixed to the second casing shell $12_2$ of the casing 12 by the weld $12w$ at their outer peripheries so that the torque converter 14 with the torsional vibration damper 20, the first centrifugal pendulum oscillator $40_{11}$ and the second centrifugal pendulum oscillator $40_{21}$ is sealed within the casing 12.

Figure 31:
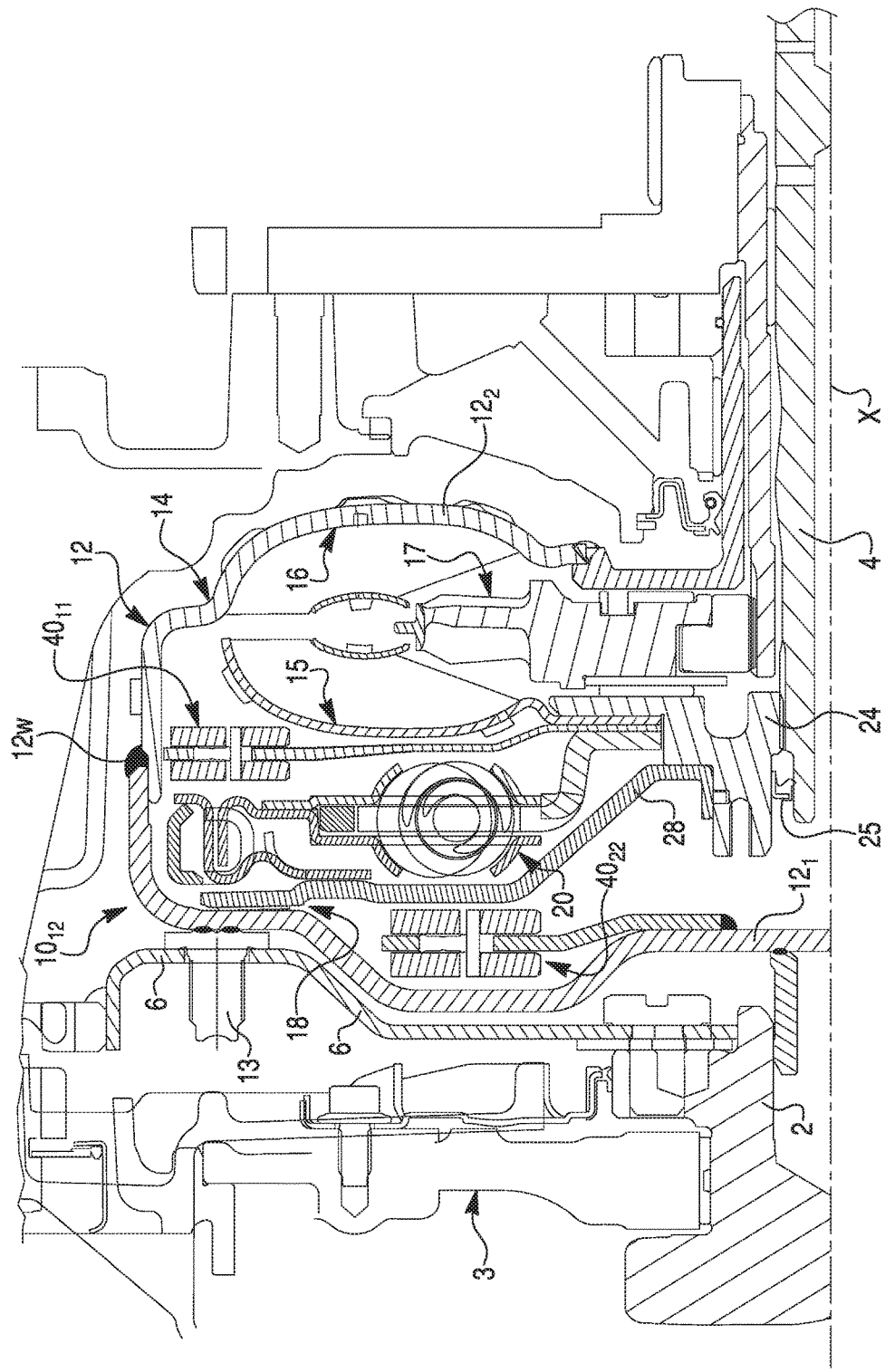
FIG. 31 is a fragmented half-view in axial section of a hydrokinetic torque coupling device in accordance with a twelfth exemplary embodiment of the present invention.
Figure 32:
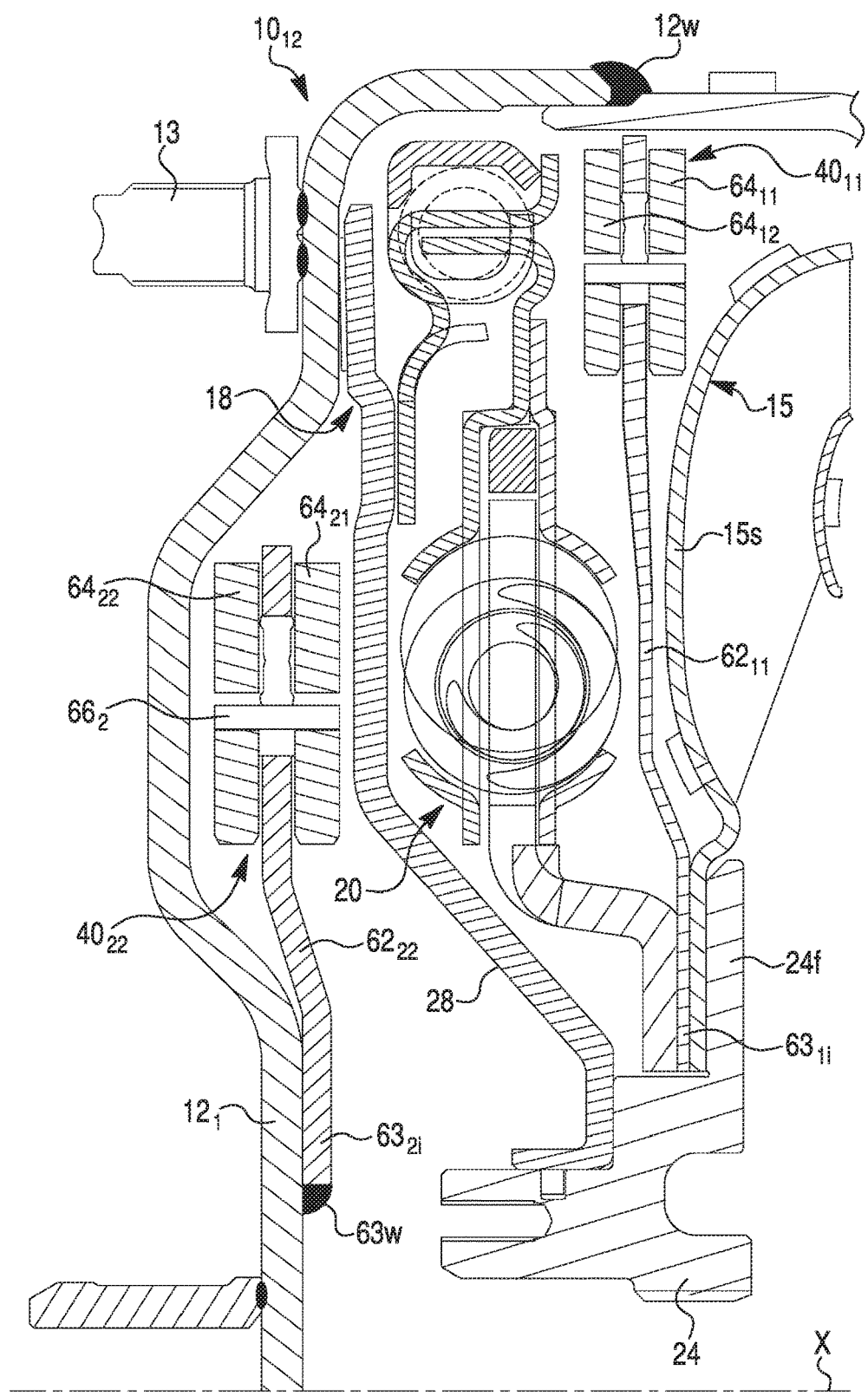
FIG. 32 is a fragmentary cross-sectional half-view of a torsional vibration damper and first and second vibration absorbers of the hydrokinetic torque coupling device in accordance with the twelfth exemplary embodiment of the present invention.

A hydrokinetic torque coupling device $10_{12}$ of a twelfth exemplary embodiment is illustrated in FIGS. 31-32. The hydrokinetic torque coupling device $10_{12}$ of FIGS. 31-32 corresponds substantially to the hydrokinetic torque coupling device $10_2$ of FIGS. 5-8, where the dynamic absorber 30 is replaced by a centrifugal pendulum oscillator $40_{11}$. Thus, the torque coupling device $10_{12}$ of the twelfth exemplary embodiment comprises a hydrodynamic torque converter 14, a lock-up clutch 18, a torsional vibration damper 20, a first vibration absorber in the form of a first centrifugal pendulum oscillator $40_{11}$, described in detail in the eleventh exemplary embodiment illustrated in FIGS. 29-30, and a second vibration absorber in the form of a second centrifugal pendulum oscillator $40_{22}$. According to the present invention, the first centrifugal pendulum oscillator $40_{11}$ and the second centrifugal pendulum oscillator $40_{22}$ are tuned to address different orders of vibrations.

The second centrifugal pendulum oscillator $40_{22}$ is substantially identical to the centrifugal pendulum oscillator $40_2$ according to the second exemplary embodiment illustrated in FIGS. 5-8. The first centrifugal pendulum oscillator $40_{11}$ is substantially structurally identical to the second centrifugal pendulum oscillator $40_{22}$ but is geometrically (dimensionally) different.

The mass $M_1$ of the flyweights $64_1$ of the first centrifugal pendulum oscillator $40_{11}$ is different than the mass $M_2$ of the flyweights $64_2$ of the second centrifugal pendulum oscillator $40_{22}$, while the outer radius $R_1$ of the flyweights $64_1$ is greater than the outer radius $R_2$ of the flyweights $64_2$, as best shown in FIG. 32. In other words, a radius of a center of gravity of the flyweights $64_1$ of the first centrifugal pendulum oscillator $40_{11}$ is greater than a radius of a center of gravity of the flyweights $64_2$ of the second centrifugal pendulum oscillator $40_{22}$. Accordingly, the first centrifugal pendulum oscillator $40_{11}$ and the second centrifugal pendulum oscillator $40_{22}$ are tuned to address different orders of vibrations.

A radially inner end $63_2i$ of the support member $62_{22}$ is non-movably (i.e., fixedly) attached to the first casing shell $12_1$ of the casing 12 by appropriate means, such as by rivets or welding. In the exemplary embodiment of FIGS. 31-32, the radially inner end $63_2i$ of the support member $62_{22}$ of the second centrifugal pendulum oscillator $40_{22}$ is welded to the first casing shell $12_1$ of the casing 12 by a weld $63w$, best shown in FIG. 32, inside of the casing 12.

An exemplary method for assembling the hydrokinetic torque coupling device $10_{12}$ according to the embodiment of FIGS. 31-32 is as follows. First, the turbine wheel 15, the impeller wheel 16, the stator 17, the torsional vibration damper 20, the first centrifugal pendulum oscillator $40_{11}$ and the second centrifugal pendulum oscillator $40_{22}$ may each be preassembled. The torsional vibration damper 20 and the dynamic absorber 30 are mounted to the turbine hub 24 and fixed to the turbine wheel 15. Specifically, the turbine shell 15s of the turbine wheel 15, the first support member $62_{11}$ of the first centrifugal pendulum oscillator $40_{11}$ and the flange 33 of the driven member 32 of the torsional vibration damper 20 are non-movably (i.e., fixedly) secured to the flange 24f of the turbine hub 24, as best shown in FIG. 32, by appropriate means, such as by rivets or welding. Next, the turbine wheel 15, the impeller wheel 16, and the stator 17 are assembled together so as to form the torque converter 14. Next, the locking piston 28 is slidably mounted to the turbine hub 24. Then, the radially inner end $63_2i$ of the support member $62_{22}$ is non-moveably attached to the first casing shell $12_1$ of the casing 12 by appropriate means, such as by welding (see the weld $63w$ as best shown in FIG. 32). After that, the first casing shell $12_1$ is fixed to the second casing shell $12_2$ of the casing 12 by the sealing weld $12w$ at their outer peripheries so that the torque converter 14 with the torsional vibration damper 20 and the first centrifugal pendulum oscillator $40_{11}$, and the second centrifugal pendulum oscillator $40_{22}$ are sealed within the casing 12.

Figure 33:
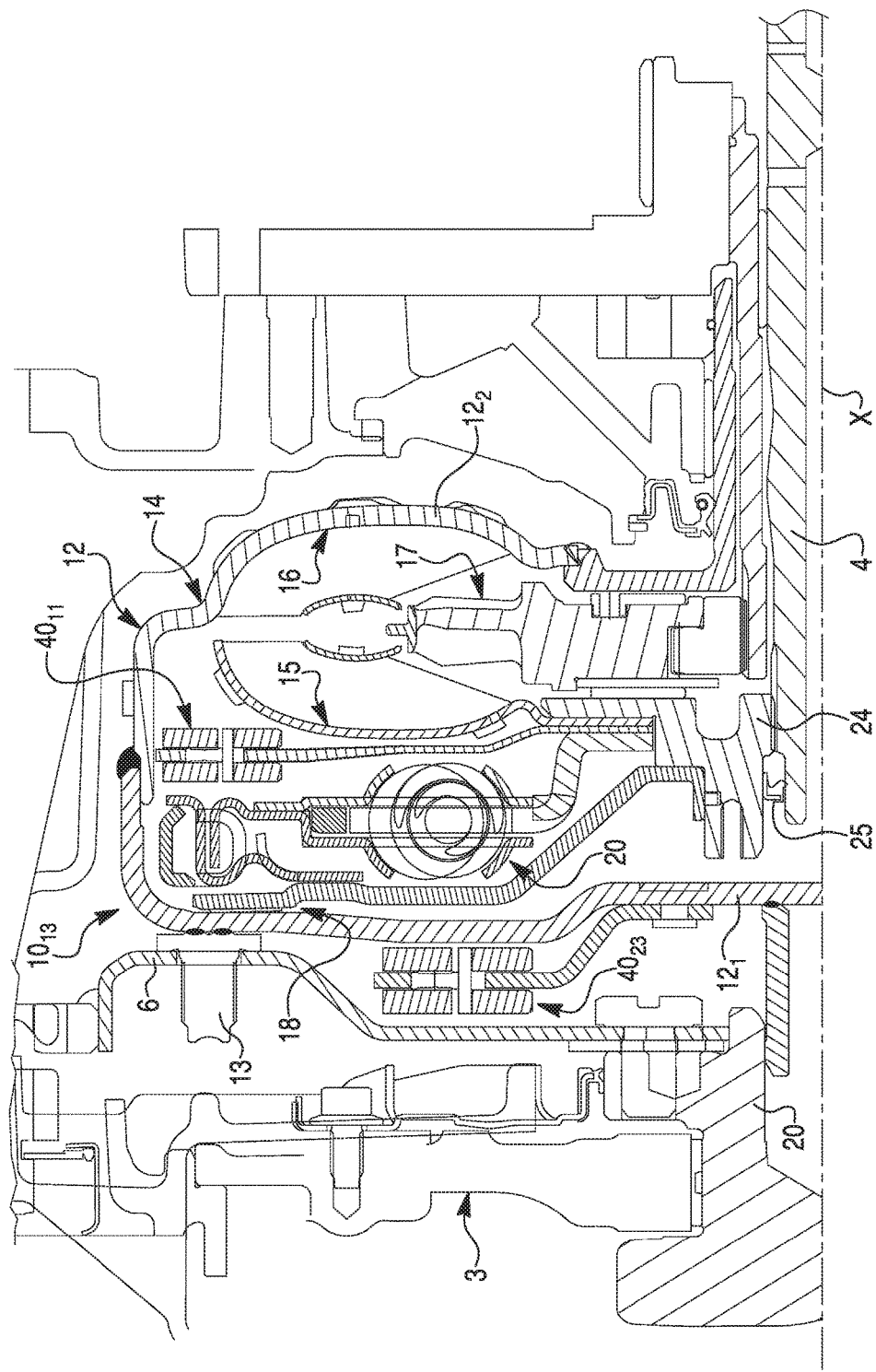
FIG. 33 is a fragmented half-view in axial section of a hydrokinetic torque coupling device in accordance with a thirteenth exemplary embodiment of the present invention.
Figure 34:
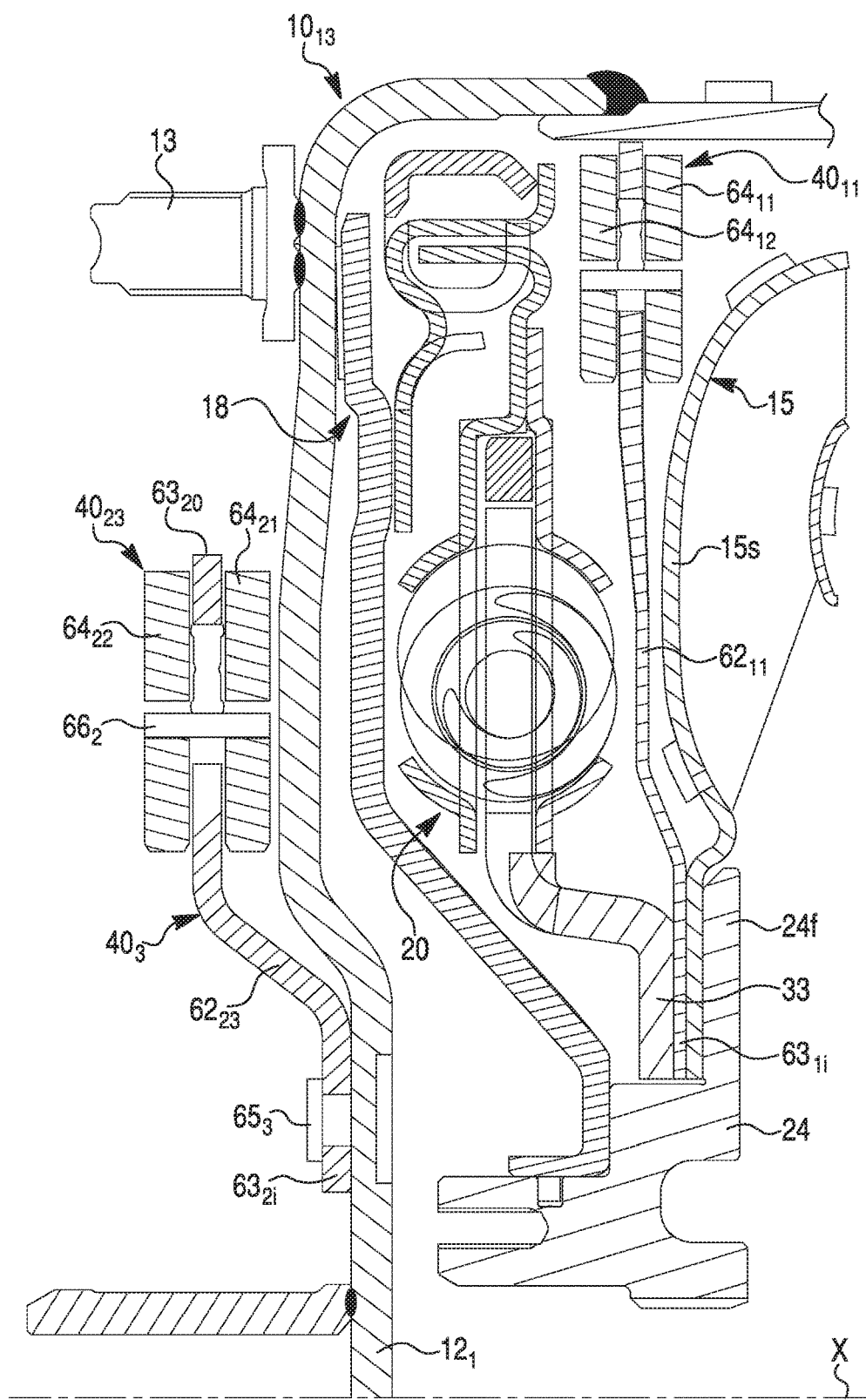
FIG. 34 is a fragmentary cross-sectional half-view of a torsional vibration damper and first and second vibration absorbers of the hydrokinetic torque coupling device in accordance with the thirteenth exemplary embodiment of the present invention.

A hydrokinetic torque coupling device $10_{13}$ of a thirteenth exemplary embodiment is illustrated in FIGS. 33-34. The hydrokinetic torque coupling device $10_{13}$ of FIGS. 33-34 corresponds substantially to the hydrokinetic torque coupling device $10_3$ of FIGS. 9-12, where the dynamic absorber 30 is replaced by a centrifugal pendulum oscillator $40_{11}$. Thus, the torque coupling device $10_{13}$ of the thirteenth exemplary embodiment comprises a hydrodynamic torque converter 14, a lock-up clutch 18, a torsional vibration damper 20, a first vibration absorber in the form of a first centrifugal pendulum oscillator $40_{11}$, described in detail in the eleventh exemplary embodiment illustrated in FIGS. 29-30, and a second vibration absorber in the form of a second centrifugal pendulum oscillator $40_{23}$. According to the present invention, the first centrifugal pendulum oscillator $40_{11}$ and the second centrifugal pendulum oscillator $40_{23}$ are tuned to address different orders of vibrations.

The second centrifugal pendulum oscillator $40_{23}$ is substantially identical to the centrifugal pendulum oscillator $40_3$ according to the third exemplary embodiment illustrated in FIGS. 9-12. The first centrifugal pendulum oscillator $40_{11}$ is substantially structurally identical to the second centrifugal pendulum oscillator $40_{23}$ but is geometrically (dimensionally) different.

Furthermore, the mass $M_1$ of the flyweights $64_1$ of the first centrifugal pendulum oscillator $40_{11}$ is different than the mass $M_2$ of the flyweights $64_2$ of the second centrifugal pendulum oscillator $40_{23}$, while the outer radius $R_1$ of the flyweights $64_1$ is greater than the outer radius $R_2$ of the flyweights $64_2$, as best shown in FIG. 34. In other words, a radius of a center of gravity of the flyweights $64_1$ of the first centrifugal pendulum oscillator $40_{11}$ is greater than a radius of a center of gravity of the flyweights $64_2$ of the second centrifugal pendulum oscillator $40_{23}$. Accordingly, the first centrifugal pendulum oscillator $40_{11}$ and the second centrifugal pendulum oscillator $40_{23}$ are tuned to address different orders of vibrations.

A radially inner end $63_2i$ of the second support member $62_{23}$ is non-movably (i.e., fixedly) attached to the first casing shell $12_1$ of the casing 12 by appropriate means, such as by fasteners, rivets or welding. In the exemplary embodiment of FIGS. 31-32, the radially inner end $63_2i$ of the support member $62_{23}$ of the second centrifugal pendulum oscillator $40_{23}$ is fixed to the first casing shell $12_1$ of the casing 12 by a rivet $65_3$, best shown in FIG. 34, outside of the casing 12.

An exemplary method for assembling the hydrokinetic torque coupling device $10_{13}$ according to the embodiment of FIGS. 33-34 is as follows. First, the turbine wheel 15, the impeller wheel 16, the stator 17, the torsional vibration damper 20, the first centrifugal pendulum oscillator $40_{11}$ and the second centrifugal pendulum oscillator $40_{23}$ may each be preassembled. The torsional vibration damper 20 and the first centrifugal pendulum oscillator $40_{11}$ are mounted to the turbine hub 24 and fixed to the turbine wheel 15. Specifically, the turbine shell 15s of the turbine wheel 15, the first connecting plate $62_{11}$ of the first centrifugal pendulum oscillator $40_{11}$ and the flange 33 of the driven member 32 of the torsional vibration damper 20 are non-movably (i.e., fixedly) secured to the flange 24f of the turbine hub 24, as best shown in FIG. 34, by appropriate means, such as by rivets or welding. Next, the turbine wheel 15, the impeller wheel 16, and the stator 17 are assembled together so as to form the torque converter 14. Then, the locking piston 28 is slidably mounted to the turbine hub 24. Next, the radially inner end $63_2i$ of the second support member $62_{23}$ is non-moveably attached to the first casing shell $12_1$ of the casing 12 outside the casing 12 by appropriate means, such as by the rivers $65_3$ extending through apertures 67 in the radially inner end $63i$ of the support member $62_3$, as best shown in FIG. 34. After that, the first casing shell $12_1$ is fixed to the second casing shell $12_2$ of the casing 12 by the sealing weld $12w$ at their outer peripheries so that the torque converter 14 with the torsional vibration damper 20 and the dynamic absorber 30 is sealed within the casing 12, while the second centrifugal pendulum oscillator $40_{23}$ is disposed outside the casing 12.

Figure 35:
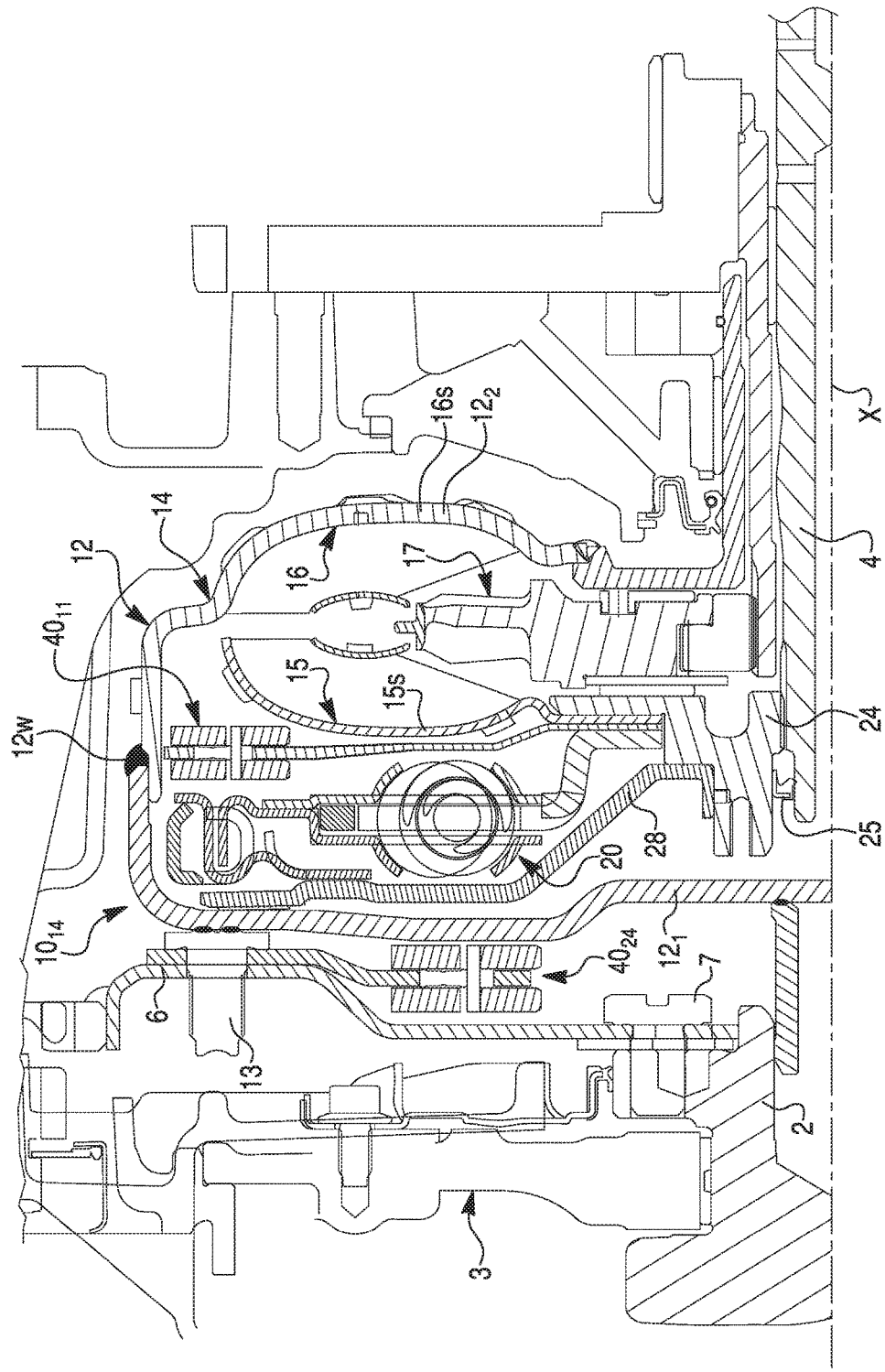
FIG. 35 is a fragmented half-view in axial section of a hydrokinetic torque coupling device in accordance with a fourteenth exemplary embodiment of the present invention.
Figure 36:
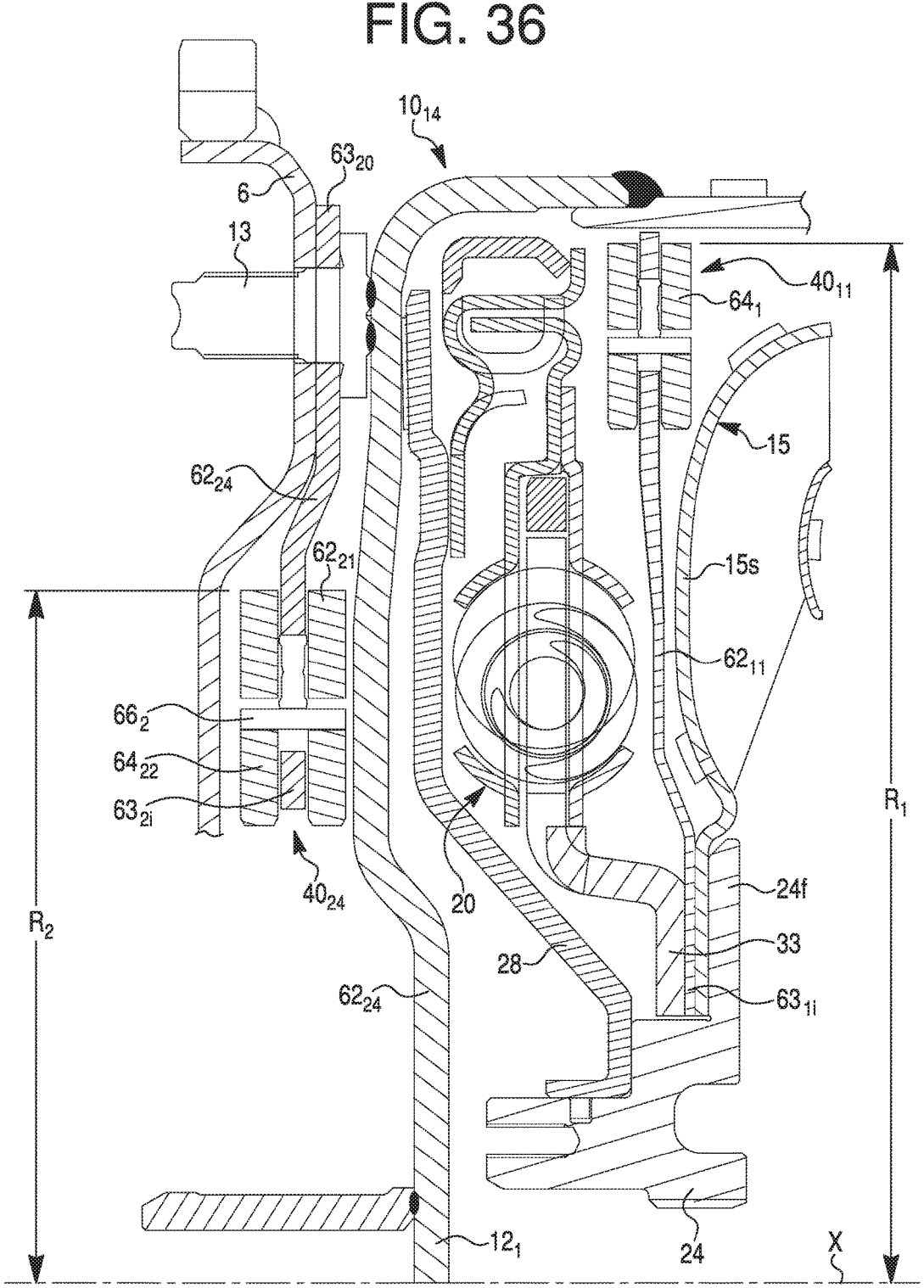
FIG. 36 is a fragmentary cross-sectional half-view of a torsional vibration damper and first and second vibration absorbers of the hydrokinetic torque coupling device in accordance with the fourteenth exemplary embodiment of the present invention.

A hydrokinetic torque coupling device $10_{14}$ of a fourteenth exemplary embodiment is illustrated in FIGS. 35-36. The hydrokinetic torque coupling device $10_{14}$ of FIGS. 35-36 corresponds substantially to the hydrokinetic torque coupling device $10_5$ of FIGS. 16-18, where the dynamic absorber 30 is replaced by a centrifugal pendulum oscillator $40_{14}$. Thus, the torque coupling device $10_{14}$ of the fourteenth exemplary embodiment comprises a hydrodynamic torque converter 14, a lock-up clutch 18, a torsional vibration damper 20, a first vibration absorber in the form of a first centrifugal pendulum oscillator $40_{11}$, described in detail in the eleventh exemplary embodiment illustrated in FIGS. 29-30, and a second vibration absorber in the form of a second centrifugal pendulum oscillator $40_{24}$. According to the present invention, the first centrifugal pendulum oscillator $40_{11}$ and the second centrifugal pendulum oscillator $40_{24}$ are tuned to address different orders of vibrations.

The second centrifugal pendulum oscillator $40_{24}$ is substantially identical to the centrifugal pendulum oscillator $40_5$ according to the fifth exemplary embodiment illustrated in FIGS. 16-18. The first centrifugal pendulum oscillator $40_{11}$ is substantially structurally identical to the second centrifugal pendulum oscillator $40_{24}$ but is geometrically (dimensionally) different.

Furthermore, the mass $M_1$ of the flyweights $64_1$ of the first centrifugal pendulum oscillator $40_{11}$ is different than the mass $M_2$ of the flyweights $64_2$ of the second centrifugal pendulum oscillator $40_{24}$, while the outer radius $R_1$ of the flyweights $64_1$ is greater than an inner radius $R_2$ of the flyweights $64_2$, as best shown in FIG. 36. In other words, a radius of a center of gravity of the flyweights $64_1$ of the first centrifugal pendulum oscillator $40_{11}$ is greater than a radius of a center of gravity of the flyweights $64_2$ of the second centrifugal pendulum oscillator $40_{24}$. Accordingly, the first centrifugal pendulum oscillator $40_{11}$ and the second centrifugal pendulum oscillator $40_{24}$ are tuned to address different orders of vibrations.

A radially outer end $63_2o$ of the support member $62_{24}$ of the second centrifugal pendulum oscillator $40_{24}$ is non-movably (i.e., fixedly) attached to both the casing 12 and the radially inner end of the flexplate 6 by appropriate means, such as by fasteners, rivets or welding. In the exemplary embodiment of FIGS. 16-18, the radially outer end $63_2o$ of the support member $62_{24}$ is fixed to both the casing 12 and the radially inner end of the flexplate 6 by stud bolts 13, which are fixedly secured, such as by welding, to the first casing shell $12_1$ of the casing 12, best shown in FIG. 36, so that the stud bolts 13 extend through apertures in the radially outer end $63_2o$ of the second support member $62_{24}$. Accordingly, the support member $62_{24}$ of the second centrifugal pendulum oscillator $40_{24}$ is non-movably (i.e., fixedly) coupled to the casing 12.

An exemplary method for assembling the hydrokinetic torque coupling device $10_{14}$ according to the embodiment of FIGS. 35-36 is as follows. First, the turbine wheel 15, the impeller wheel 16, the stator 17, the torsional vibration damper 20, the first centrifugal pendulum oscillator $40_{11}$ and the second centrifugal pendulum oscillator $40_{24}$ may each be preassembled. The torsional vibration damper 20 and the first centrifugal pendulum oscillator $40_{11}$ are mounted to the turbine hub 24 and fixed to the turbine wheel 15. Specifically, the turbine shell 15s of the turbine wheel 15, the first support member $62_{11}$ of the first centrifugal pendulum oscillator $40_{11}$ and the flange 33 of the driven member 32 of the torsional vibration damper 20 are non-movably (i.e., fixedly) secured to the flange 24f of the turbine hub 24, as best shown in FIG. 36, by appropriate means, such as by rivets or welding. Next, the turbine wheel 15, the impeller wheel 16, and the stator 17 are assembled together so as to form the torque converter 14. Then, the locking piston 28 is slidably mounted to the turbine hub 24. Next, the first casing shell $12_1$ is fixed to the second casing shell $12_2$ of the casing 12 by the sealing weld $12w$ at their outer peripheries so that the torque converter 14 with the torsional vibration damper 20 and the first centrifugal pendulum oscillator $40_{11}$ is sealed within the casing 12, while the second centrifugal pendulum oscillator $40_{24}$ is disposed outside the casing 12. After that, the stud bolts 13 are fixedly secured, such as by welding, to the first casing shell $12_1$ of the casing 12. Next, the second support member $62_{24}$ of the second centrifugal pendulum oscillator $40_{24}$ is non-movably (i.e., fixedly) attached to both the first casing shell $12_1$ of the casing 12 and the radially outer end of the flexplate 6 by the stud bolts 13 extending through the apertures in the radially outer end $63_2o$ of the second support member $62_{24}$. Then, the radially inner end of the flexplate 6 is non-rotatably connected to the crankshaft 2 by the one or more threaded fasteners 7.

Figure 37:
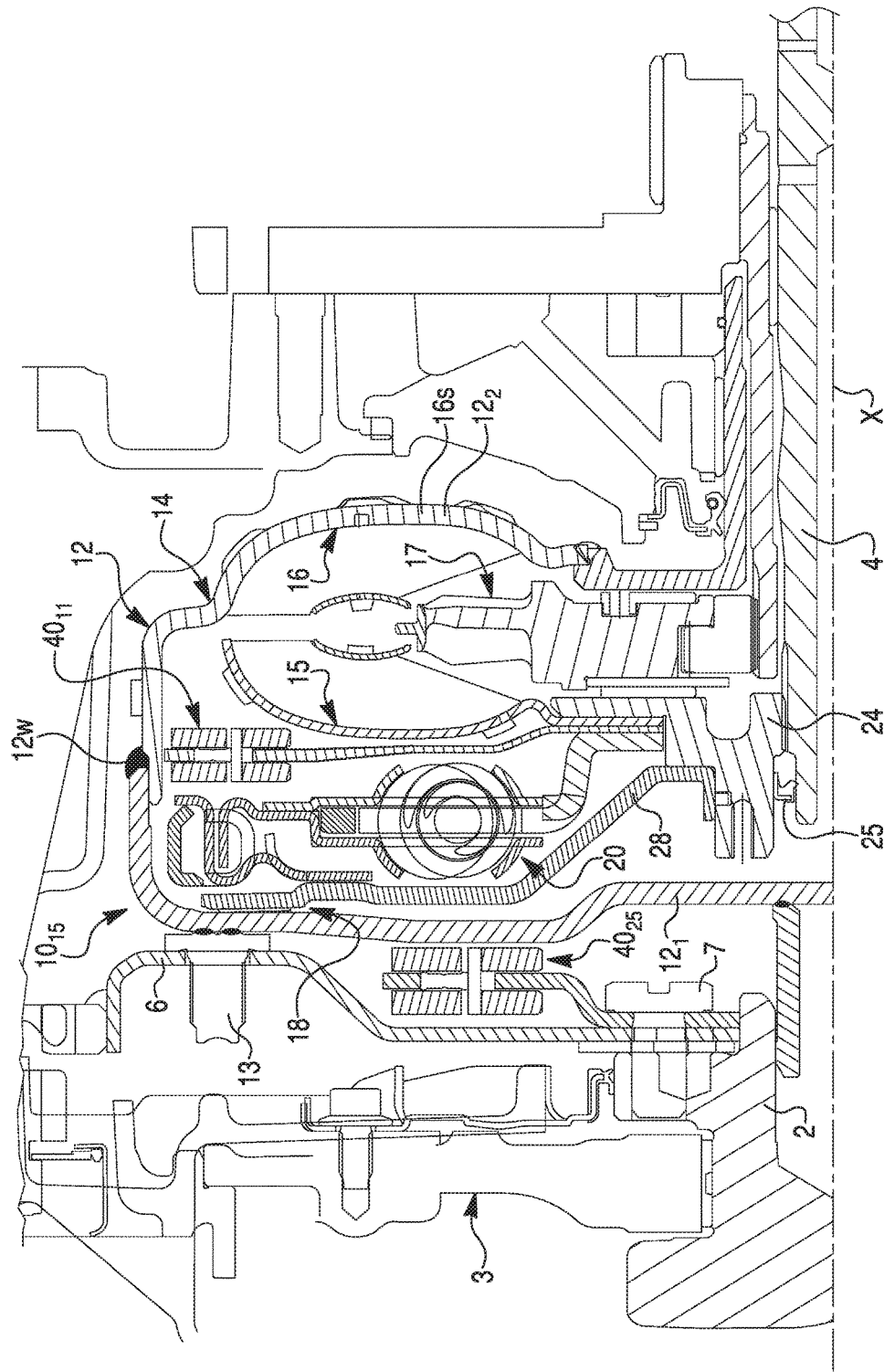
FIG. 37 is a fragmented half-view in axial section of a hydrokinetic torque coupling device in accordance with a fifteenth exemplary embodiment of the present invention.
Figure 38:
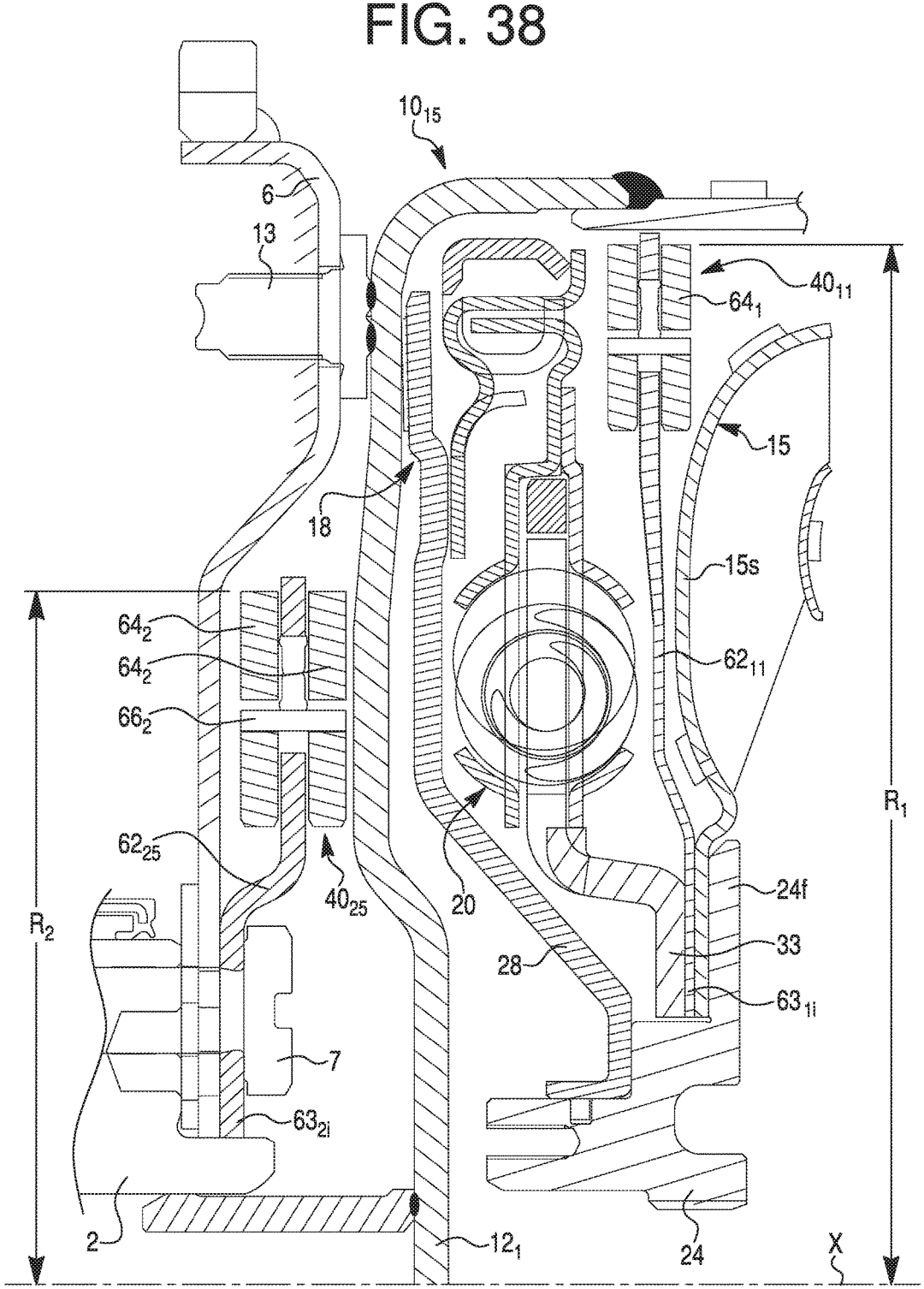
FIG. 38 is a fragmentary cross-sectional half-view of a torsional vibration damper and first and second vibration absorbers of the hydrokinetic torque coupling device in accordance with the fifteenth exemplary embodiment of the present invention.

In a hydrokinetic torque coupling device $10_{15}$ of a fifteenth exemplary embodiment is illustrated in FIGS. 37-38. The hydrokinetic torque coupling device $10_{15}$ of FIGS. 37-38 corresponds substantially to the hydrokinetic torque coupling device $10_4$ of FIGS. 13-15, where the dynamic absorber 30 is replaced by a centrifugal pendulum oscillator $40_{15}$. Thus, the torque coupling device $10_{15}$ of the fifteenth exemplary embodiment comprises a hydrodynamic torque converter 14, a lock-up clutch 18, a torsional vibration damper 20, a first vibration absorber in the form of a first centrifugal pendulum oscillator $40_{11}$, described in detail in the eleventh exemplary embodiment illustrated in FIGS. 29-30, and a second vibration absorber in the form of a second centrifugal pendulum oscillator $40_{25}$. According to the present invention, the first centrifugal pendulum oscillator $40_{11}$ and the second centrifugal pendulum oscillator $40_{25}$ are tuned to address different orders of vibrations.

The second centrifugal pendulum oscillator $40_{25}$ is substantially identical to the centrifugal pendulum oscillator $40_4$ according to the fourth exemplary embodiment illustrated in FIGS. 13-15. The first centrifugal pendulum oscillator $40_{11}$ is substantially structurally identical to the second centrifugal pendulum oscillator $40_{25}$ but is geometrically (dimensionally) significantly different.

Furthermore, the mass $M_1$ of the flyweights $64_1$ of the first centrifugal pendulum oscillator $40_{11}$ is different than the mass $M_2$ of the flyweights $64_2$ of the second centrifugal pendulum oscillator $40_{25}$, while the outer radius $R_1$ of the flyweights $64_1$ is greater than an outer radius $R_2$ of the flyweights $64_2$, as best shown in FIG. 38. In other words, a radius of a center of gravity of the flyweights $64_1$ of the first centrifugal pendulum oscillator $40_{11}$ is greater than a radius of a center of gravity of the flyweights $64_2$ of the second centrifugal pendulum oscillator $40_{25}$. Accordingly, the first centrifugal pendulum oscillator $40_{11}$ and the second centrifugal pendulum oscillator $40_{25}$ are tuned to address different orders of vibrations.

A radially inner end $63_2i$ of the second support member $62_{25}$ is non-movably (i.e., fixedly) attached to both the crankshaft 2 and the radially inner end of the flexplate 6 by appropriate means, such as by fasteners, rivets or welding. In the exemplary embodiment of FIGS. 37-38, the radially inner end $63_2i$ of the second support member $62_{25}$ is non-rotatably fixed to both the crankshaft 2 and the radially inner end of the flexplate 6 by the threaded fasteners 7, best shown in FIG. 38, extending through apertures in the radially inner end $63_2i$ of the second support member $62_{25}$. Accordingly, the second support member $62_{25}$ of the second centrifugal pendulum oscillator $40_{25}$ is non-movably (i.e., fixedly) coupled to the casing 12.

An exemplary method for assembling the hydrokinetic torque coupling device $10_{15}$ according to the embodiment of FIGS. 37-38 is as follows. First, the turbine wheel 15, the impeller wheel 16, the stator 17, the torsional vibration damper 20, the first centrifugal pendulum oscillator $40_{11}$ and the second centrifugal pendulum oscillator $40_{25}$ may each be preassembled. The torsional vibration damper 20 and the first centrifugal pendulum oscillator $40_{11}$ are mounted to the turbine hub 24 and fixed to the turbine wheel 15. Specifically, the turbine shell $15s$ of the turbine wheel 15, the first support member $62_{11}$ of the first centrifugal pendulum oscillator $40_{11}$ and the flange 33 of the driven member 32 of the torsional vibration damper 20 are non-movably (i.e., fixedly) secured to the flange $24f$ of the turbine hub 24, as best shown in FIG. 38, by appropriate means, such as by rivets or welding. Next, the turbine wheel 15, the impeller wheel 16, and the stator 17 are assembled together so as to form the torque converter 14. Then, the locking piston 28 is slidably mounted to the turbine hub 24. Next, the first casing shell $12_1$ is fixed to the second casing shell $12_2$ of the casing 12 by the sealing weld $12w$ at their outer peripheries so that the torque converter 14 with the torsional vibration damper 20 and the first centrifugal pendulum oscillator $40_{11}$ is sealed within the casing 12, while the second centrifugal pendulum oscillator $40_{25}$ is disposed outside the casing 12. After that, the stud bolts 13 are fixedly secured, such as by welding, to the first casing shell $12_1$ of the casing 12. Next, the second support member $62_{25}$ of the second centrifugal pendulum oscillator $40_{25}$ is non-movably (i.e., fixedly) attached to both the crankshaft 2 and the radially inner end of the flexplate 6 by the threaded fasteners 7 extending through the apertures in the radially inner end $63_2i$ of the second support member $62_{25}$. Then, the radially outer end of the flexplate 6 is non-rotatably connected to the first casing shell $12_1$ of the casing 12 through the stud bolts 13.

Figure 39:
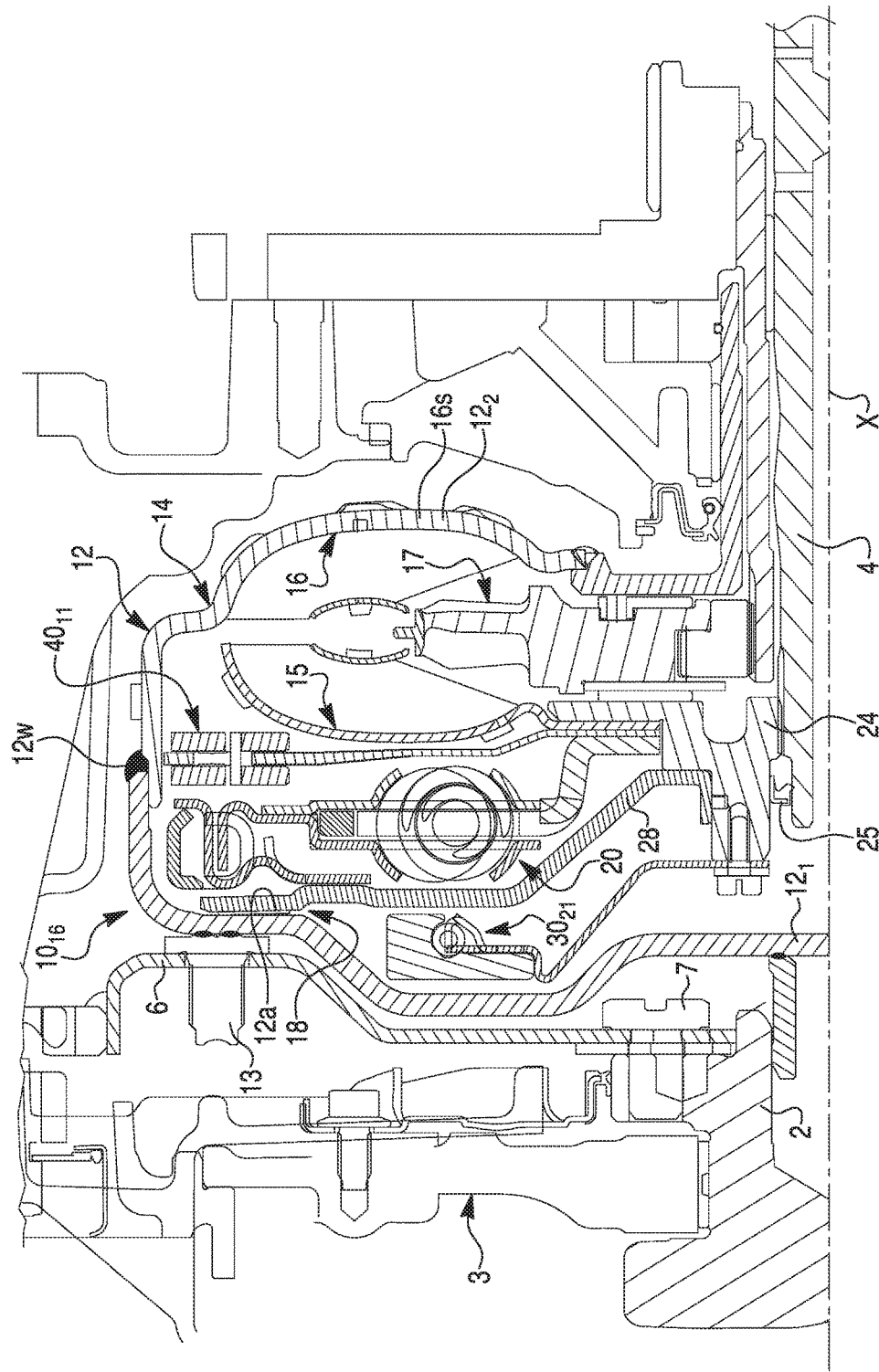
FIG. 39 is a fragmented half-view in axial section of a hydrokinetic torque coupling device in accordance with a sixteenth exemplary embodiment of the present invention.
Figure 40:
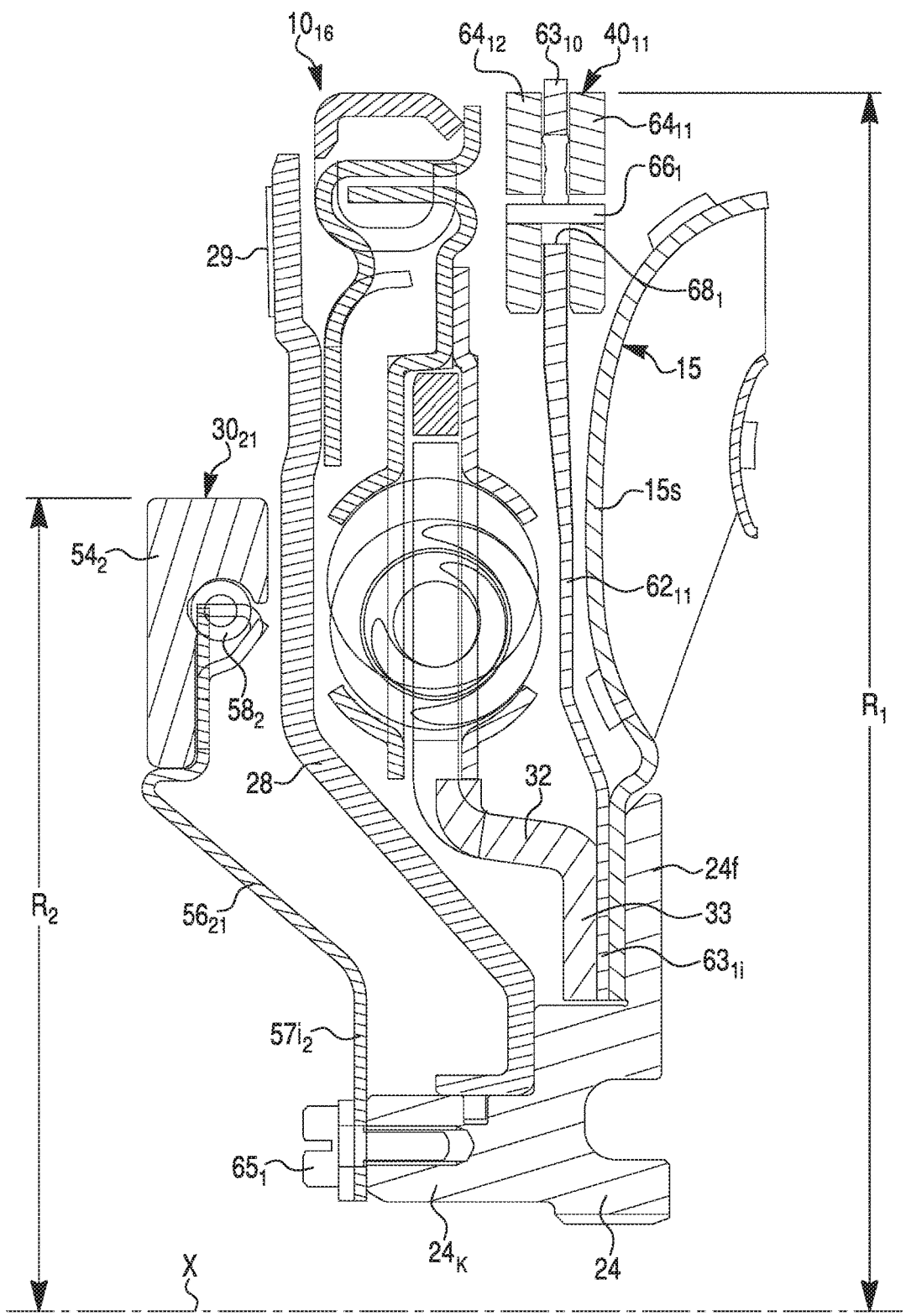
FIG. 40 is a fragmentary cross-sectional half-view of a torsional vibration damper and first and second vibration absorbers of the hydrokinetic torque coupling device in accordance with the sixteenth exemplary embodiment of the present invention.

A hydrokinetic torque coupling device $10_{16}$ of a sixteenth exemplary embodiment is illustrated in FIGS. 39-40. The hydrokinetic torque coupling device $10_{16}$ of FIGS. 39-40 corresponds substantially to the hydrokinetic torque coupling device $10_6$ of FIGS. 19-20, where the dynamic absorber $30_1$ is replaced by a centrifugal pendulum oscillator $40_{11}$. Thus, the torque coupling device $10_{16}$ of the sixteenth exemplary embodiment comprises a hydrodynamic torque converter 14, a lock-up clutch 18, a torsional vibration damper 20, a first vibration absorber in the form of a centrifugal pendulum oscillator $40_{11}$, described in detail in the eleventh exemplary embodiment illustrated in FIGS. 29-30, and a second vibration absorber in the form of a dynamic absorber $30_{21}$, described in detail in the sixth exemplary embodiment illustrated in FIGS. 9-20. According to the present invention, the centrifugal pendulum oscillator $40_{11}$ and the dynamic absorber $30_{21}$ are tuned to address different orders of vibrations. In other words, the centrifugal pendulum oscillator $40_{11}$ is substantially identical to the centrifugal pendulum oscillator according to the eleventh exemplary embodiment illustrated in FIGS. 29-30, while the dynamic absorber $30_{21}$ is substantially identical to the second dynamic absorber according to the sixth exemplary embodiment illustrated in FIGS. 19-20.

Furthermore, the mass $M_1$ of the flyweights $64_1$ of the centrifugal pendulum oscillator $40_{11}$ is different than the mass $M_2$ of the inertial member $54_2$ of the dynamic absorber $30_{21}$, while the outer radius $R_1$ of the flyweights $64_1$ is greater than an outer radius $R_2$ of the inertial member $54_2$, as best shown in FIG. 40. In other words, a radius of a center of gravity of the flyweights $64_1$ of the centrifugal pendulum oscillator $40_{11}$ is substantially greater than a radius of a center of gravity of the inertial member $54_2$ of the dynamic absorber $30_{21}$. Accordingly, the centrifugal pendulum oscillator $40_{11}$ and the dynamic absorber $30_{21}$ are tuned to address different orders of vibrations.

An exemplary method for assembling the hydrokinetic torque coupling device $10_{16}$ according to the embodiment of FIGS. 39-40 will now be explained. The torque converter 14 including the turbine wheel 15, the impeller wheel 16 and the stator 17, the torsional vibration damper 20, the dynamic absorber $30_{21}$ and the centrifugal pendulum oscillator $40_{11}$ may each be preassembled. The torsional vibration damper 20 and the centrifugal pendulum oscillator $40_{11}$ are mounted to the turbine hub 24 and fixed to the turbine wheel 15. Specifically, the turbine shell 15s of the turbine wheel 15, the support member $62_{11}$ of the centrifugal pendulum oscillator $40_{11}$ and the flange 33 of the driven member 32 of the torsional vibration damper 20 are non-movably (i.e., fixedly) secured to the flange 24f of the turbine hub 24, as best shown in FIGS. 29 and 30, by appropriate means, such as by rivets or welding. Then, the turbine wheel 15, the impeller wheel 16, and the stator 17 are assembled together so as to form the torque converter 14. Next, the locking piston 28 is slidably mounted to the turbine hub 24. Then, the radially inner end $57i_2$ of the connecting plate $56_{21}$ of the dynamic absorber $30_{21}$ is non-moveably attached to the turbine hub 24 by appropriate means, such as by the threaded fasteners $65_1$ or welding. After that, the first casing shell $12_1$ is sealingly fixed to the second casing shell $12_2$ of the casing 12 by the weld 12w at their outer peripheries so that the torque converter 14, the torsional vibration damper 20, the centrifugal pendulum oscillator $40_{11}$ and the dynamic absorber $30_{21}$ are sealed within the casing 12.

Figure 41:
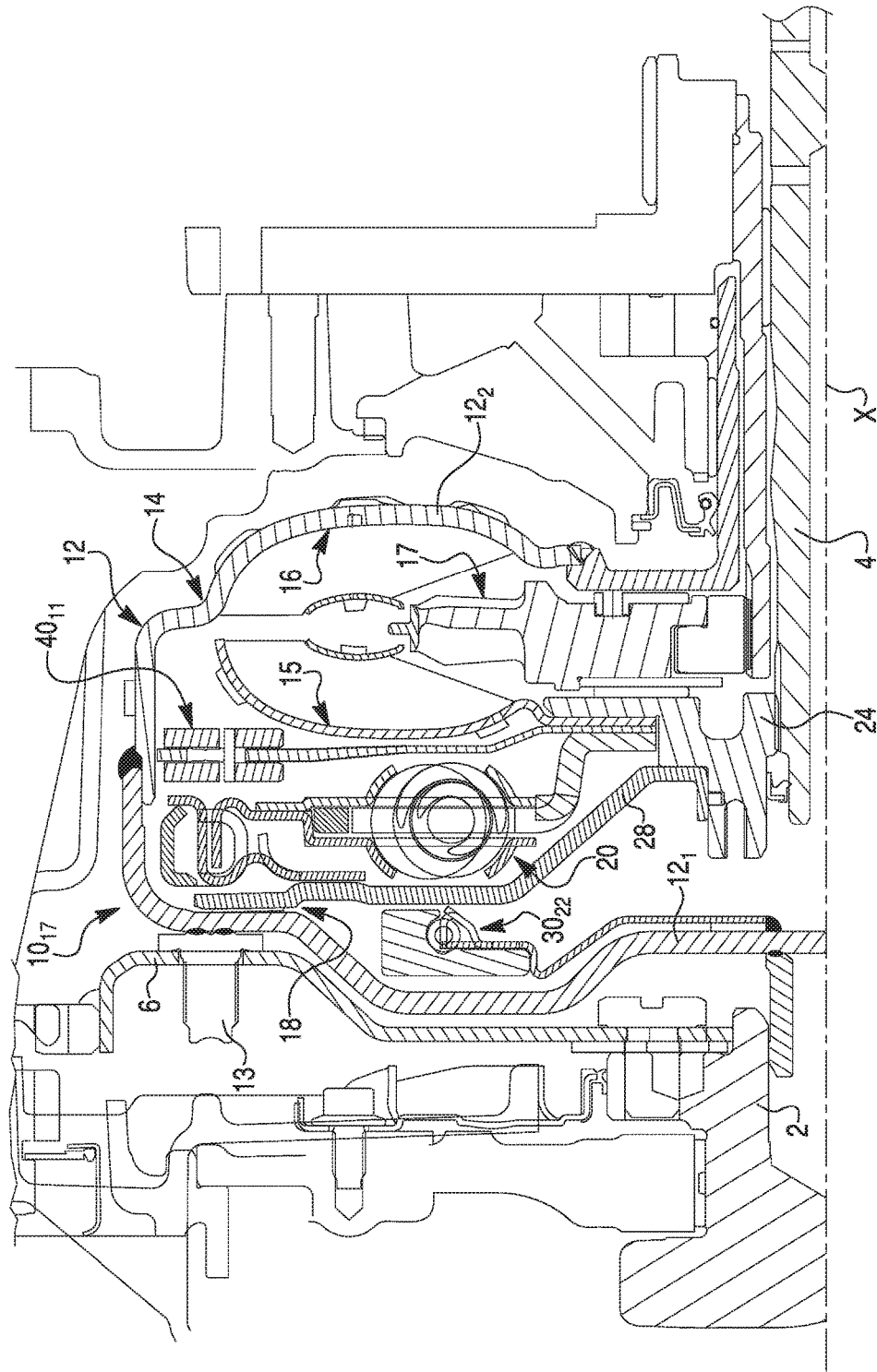
FIG. 41 is a fragmented half-view in axial section of a hydrokinetic torque coupling device in accordance with a seventeenth exemplary embodiment of the present invention.
Figure 42:
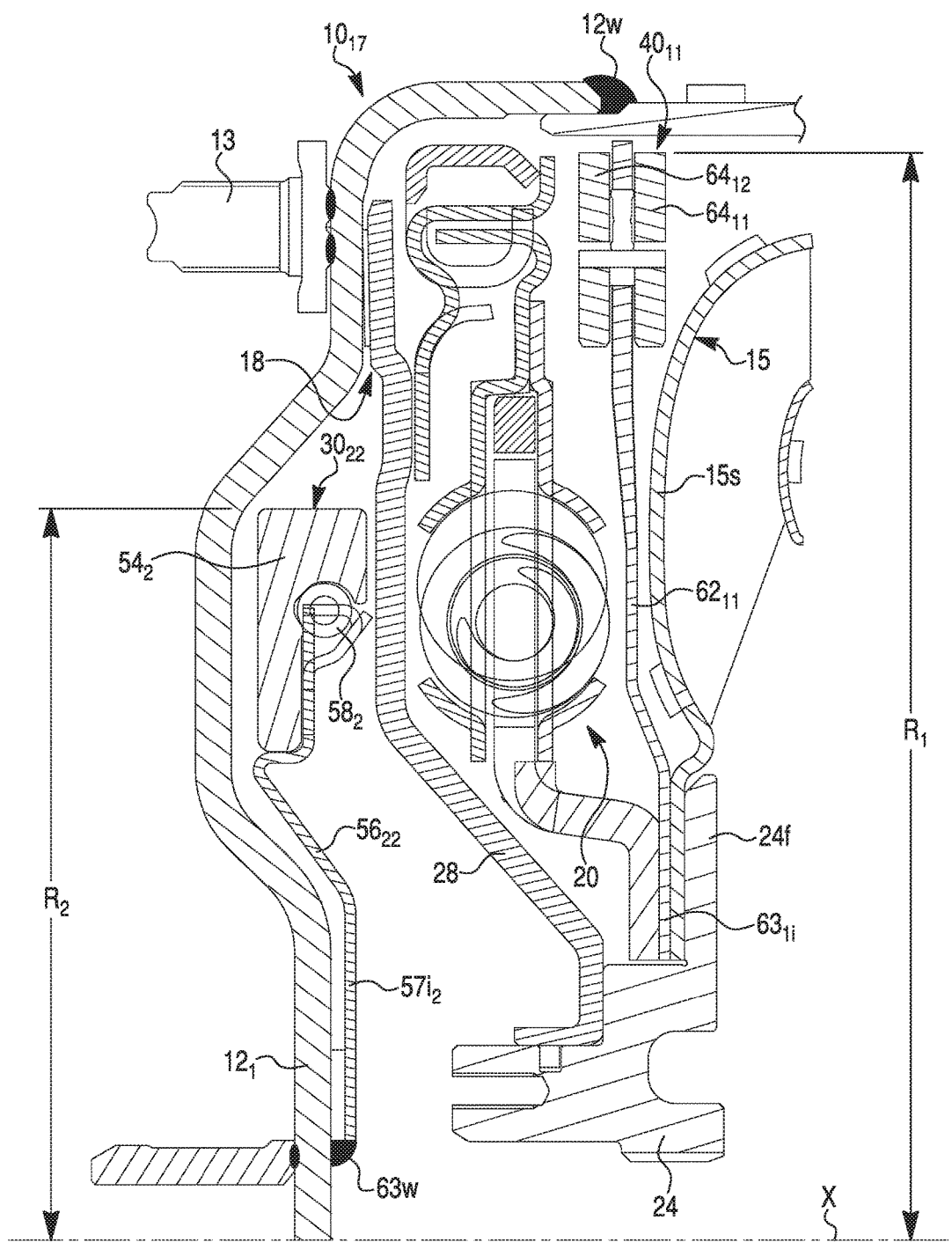
FIG. 42 is a fragmentary cross-sectional half-view of a torsional vibration damper and first and second vibration absorbers of the hydrokinetic torque coupling device in accordance with the seventeenth exemplary embodiment of the present invention.

A hydrokinetic torque coupling device $10_{17}$ of a seventeenth exemplary embodiment is illustrated in FIGS. 41-42. The hydrokinetic torque coupling device $10_{17}$ of FIGS. 41-42 corresponds substantially to the hydrokinetic torque coupling device $10_7$ of FIGS. 21-22, where the dynamic absorber $30_1$ is replaced by a centrifugal pendulum oscillator $40_{11}$. Thus, the torque coupling device $10_{17}$ of the seventeenth exemplary embodiment comprises a hydrodynamic torque converter 14, a lock-up clutch 18, a torsional vibration damper 20, a first vibration absorber in the form of a centrifugal pendulum oscillator $40_{11}$, described in detail in the eleventh exemplary embodiment illustrated in FIGS. 29-30, and a second vibration absorber in the form of a dynamic absorber $30_{22}$, described in detail in the seventh exemplary embodiment illustrated in FIGS. 21-22. According to the present invention, the centrifugal pendulum oscillator $40_{11}$ and the dynamic absorber $30_{22}$ are tuned to address different orders of vibrations. In other words, the centrifugal pendulum oscillator $40_{11}$ is substantially identical to the centrifugal pendulum oscillator according to the eleventh exemplary embodiment illustrated in FIGS. 29-30, while the dynamic absorber $30_{22}$ is substantially identical to the second dynamic absorber according to the seventh exemplary embodiment illustrated in FIGS. 21-22.

Furthermore, the mass $M_1$ of the flyweights $64_1$ of the centrifugal pendulum oscillator $40_{11}$ is different than the mass $M_2$ of the inertial member $54_2$ of the dynamic absorber $30_{22}$, while the outer radius $R_1$ of the flyweights $64_1$ is greater than an outer radius $R_2$ of the inertial member $54_2$, as best shown in FIG. 42. In other words, a radius of a center of gravity of the flyweights $64_1$ of the centrifugal pendulum oscillator $40_{11}$ is greater than a radius of a center of gravity of the inertial member $54_2$ of the dynamic absorber $30_{22}$. Accordingly, the centrifugal pendulum oscillator $40_{11}$ and the dynamic absorber $30_{22}$ are tuned to address different orders of vibrations.

An exemplary method for assembling the hydrokinetic torque coupling device $10_{17}$ according to the embodiment of FIGS. 41-42 will now be explained. The torque converter 14 including the turbine wheel 15, the impeller wheel 16 and the stator 17, the torsional vibration damper 20, the dynamic absorber $30_{22}$ and the centrifugal pendulum oscillator $40_{11}$ may each be preassembled. The torsional vibration damper 20 and the centrifugal pendulum oscillator $40_{11}$ are mounted to the turbine hub 24 and fixed to the turbine wheel 15. Specifically, the turbine shell 15s of the turbine wheel 15, the support member $62_{11}$ of the centrifugal pendulum oscillator $40_{11}$ and the flange 33 of the driven member 32 of the torsional vibration damper 20 are non-movably (i.e., fixedly) secured to the flange 24f of the turbine hub 24, as best shown in FIGS. 29 and 30, by appropriate means, such as by rivets or welding. Then, the turbine wheel 15, the impeller wheel 16, and the stator 17 are assembled together so as to form the torque converter 14. Next, the locking piston 28 is slidably mounted to the turbine hub 24. Then, the radially inner end $57i_2$ of the connecting plate $56_{22}$ is non-moveably attached to the first casing shell $12_1$ of the casing 12 by appropriate means, such as by welding (see the weld 63w as best shown in FIG. 22). After that, the first casing shell $12_1$ is fixed to the second casing shell $12_1$ of the casing 12 by the sealing weld 12w at their outer peripheries so that the torque converter 14 with the torsional vibration damper 20, the centrifugal pendulum oscillator $40_{11}$ and the dynamic absorber $30_{22}$ are sealed within the casing 12.

Figure 43:
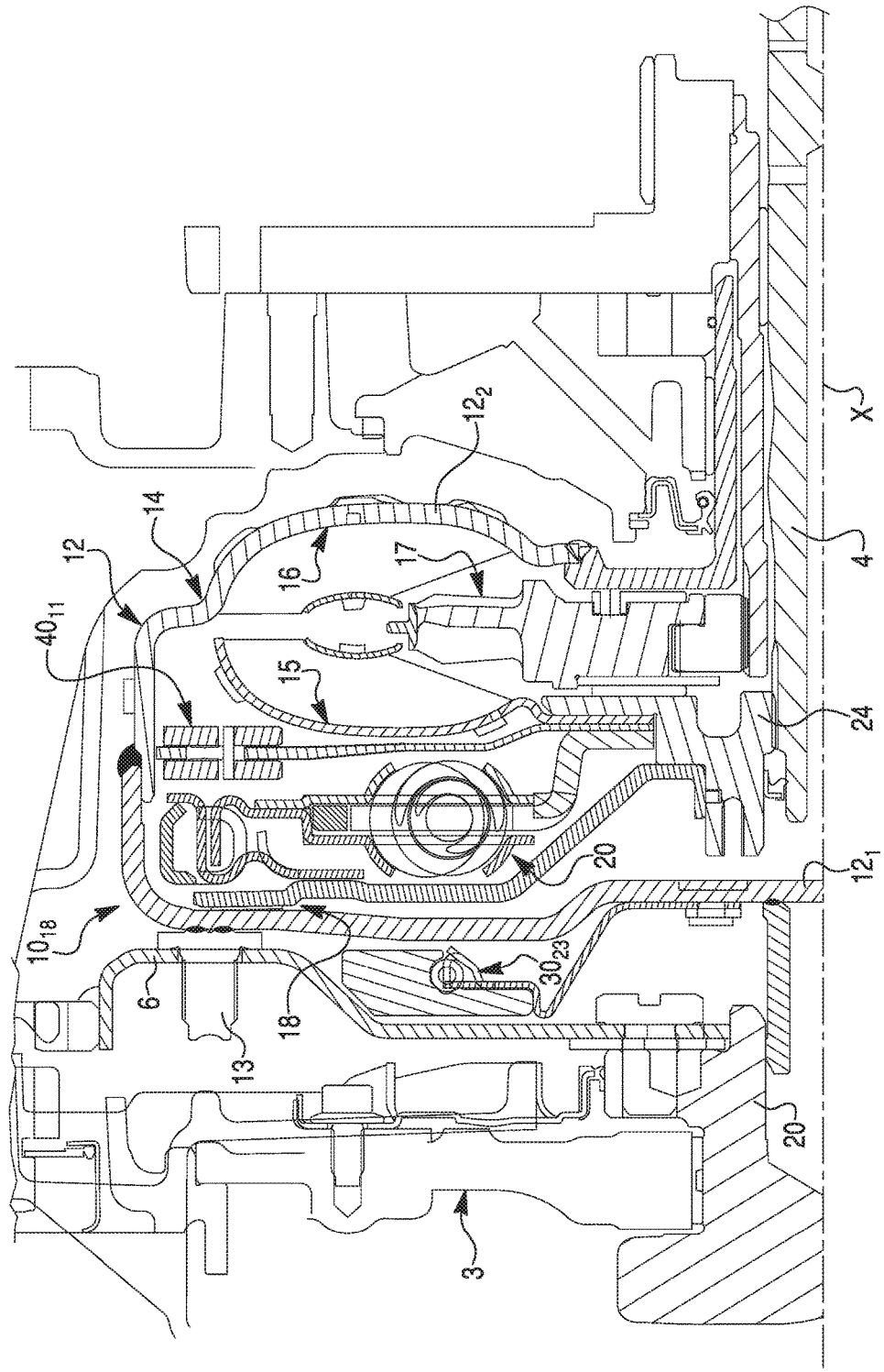
FIG. 43 is a fragmented half-view in axial section of a hydrokinetic torque coupling device in accordance with an eighteenth exemplary embodiment of the present invention.
Figure 44:
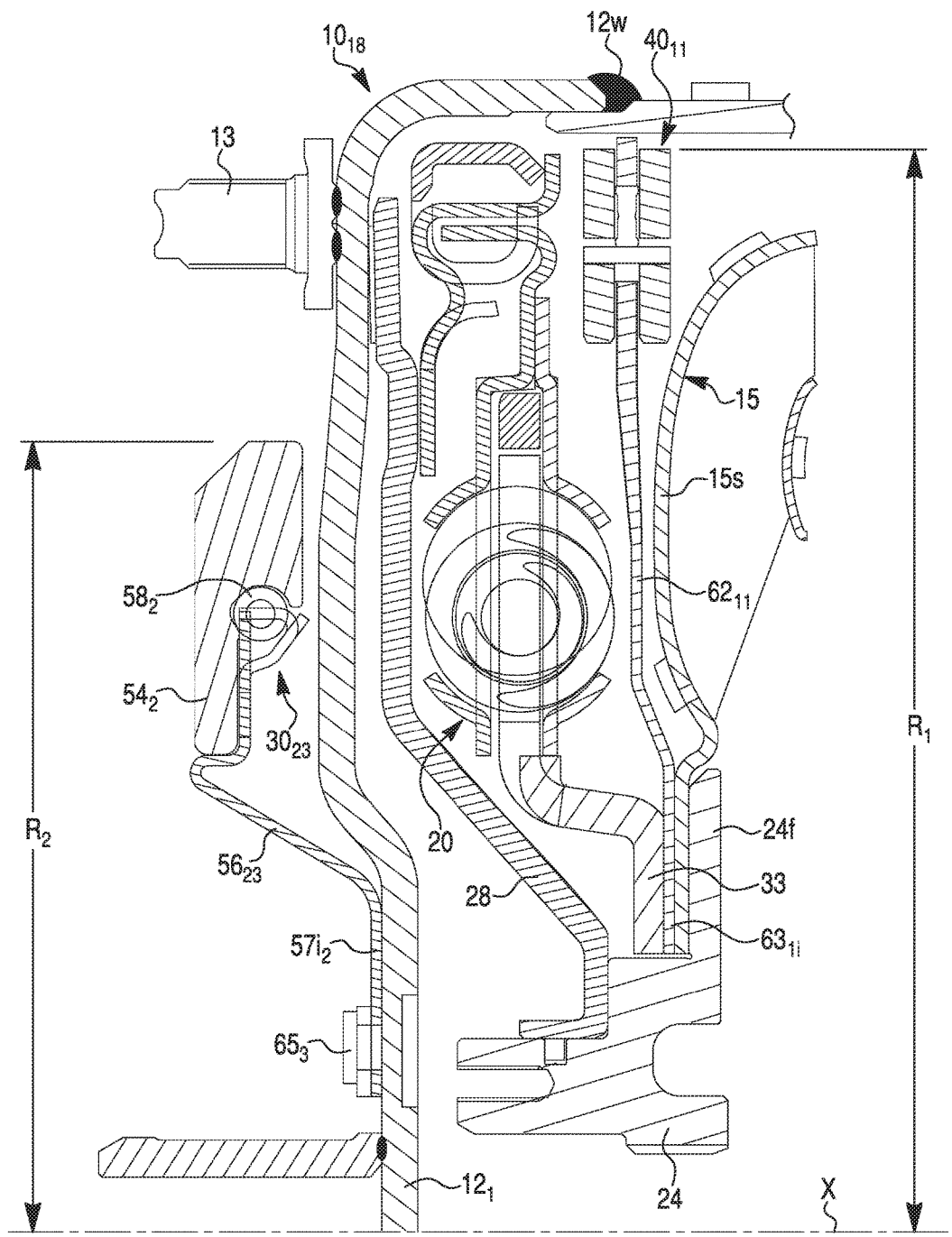
FIG. 44 is a fragmentary cross-sectional half-view of a torsional vibration damper and first and second vibration absorbers of the hydrokinetic torque coupling device in accordance with the eighteenth exemplary embodiment of the present invention.

A hydrokinetic torque coupling device $10_{18}$ of an eighteenth exemplary embodiment is illustrated in FIGS. 43-44. The hydrokinetic torque coupling device $10_{18}$ of FIGS. 43-44 corresponds substantially to the hydrokinetic torque coupling device $10_8$ of FIGS. 23-24, where the dynamic absorber $30_1$ is replaced by a centrifugal pendulum oscillator $40_{11}$. Thus, the torque coupling device $10_{18}$ of the eighteenth exemplary embodiment comprises a hydrodynamic torque converter 14, a lock-up clutch 18, a torsional vibration damper 20, a first vibration absorber in the form of a centrifugal pendulum oscillator $40_{11}$, described in detail in the eleventh exemplary embodiment illustrated in FIGS. 29-30, and a second vibration absorber in the form of a dynamic absorber $30_{23}$, described in detail in the eighth exemplary embodiment illustrated in FIGS. 23-24. According to the present invention, the centrifugal pendulum oscillator $40_{11}$ and the dynamic absorber $30_{23}$ are tuned to address different orders of vibrations. In other words, the centrifugal pendulum oscillator $40_{11}$ is substantially identical to the centrifugal pendulum oscillator according to the eleventh exemplary embodiment illustrated in FIGS. 29-30, while the dynamic absorber $30_{23}$ is substantially identical to the second dynamic absorber according to the eighth exemplary embodiment illustrated in FIGS. 23-24.

Furthermore, the mass $M_1$ of the flyweights $64_1$ of the centrifugal pendulum oscillator $40_{11}$ is different than the mass $M_2$ of the inertial member $54_2$ of the dynamic absorber $30_{23}$, while the outer radius $R_1$ of the flyweights $64_1$ is greater than an outer radius $R_2$ of the inertial member $54_2$, as best shown in FIG. 44. In other words, a radius of a center of gravity of the flyweights $64_1$ of the centrifugal pendulum oscillator $40_{11}$ is greater than a radius of a center of gravity of the inertial member $54_2$ of the dynamic absorber $30_{23}$. Accordingly, the centrifugal pendulum oscillator $40_{11}$ and the dynamic absorber $30_{23}$ are tuned to address different orders of vibrations.

An exemplary method for assembling the hydrokinetic torque coupling device $10_{18}$ according to the embodiment of FIGS. 43-44 will now be explained. The torque converter 14 including the turbine wheel 15, the impeller wheel 16 and the stator 17, the torsional vibration damper 20, the dynamic absorber $30_{23}$ and the centrifugal pendulum oscillator $40_{11}$ may each be preassembled. The torsional vibration damper 20 and the centrifugal pendulum oscillator $40_{11}$ are mounted to the turbine hub 24 and fixed to the turbine wheel 15. Specifically, the turbine shell 15s of the turbine wheel 15, the support member $62_{11}$ of the centrifugal pendulum oscillator $40_{11}$ and the flange 33 of the driven member 32 of the torsional vibration damper 20 are non-movably (i.e., fixedly) secured to the flange 24f of the turbine hub 24, as best shown in FIGS. 29 and 30, by appropriate means, such as by rivets or welding. Then, the turbine wheel 15, the impeller wheel 16, and the stator 17 are assembled together so as to form the torque converter 14. Next, the locking piston 28 is slidably mounted to the turbine hub 24. Then, the radially inner end $57i_2$ of the connecting plate $56_{23}$ of the dynamic absorber $30_{23}$ is non-moveably attached to the first casing shell $12_1$ of the casing 12 outside the casing 12 by appropriate means, such as by the rivers $65_3$ extending through apertures in the radially inner end $57i_2$ of the connecting plate $56_{23}$, as best shown in FIG. 44. After that, the first casing shell $12_1$ is fixed to the second casing shell $12_2$ of the casing 12 by sealing weld 12w at their outer peripheries so that the torque converter 14 with the torsional vibration damper 20 and the centrifugal pendulum oscillator $40_{11}$ is sealed within the casing 12, while the dynamic absorber $30_{23}$ is disposed outside the casing 12.

Figure 45:
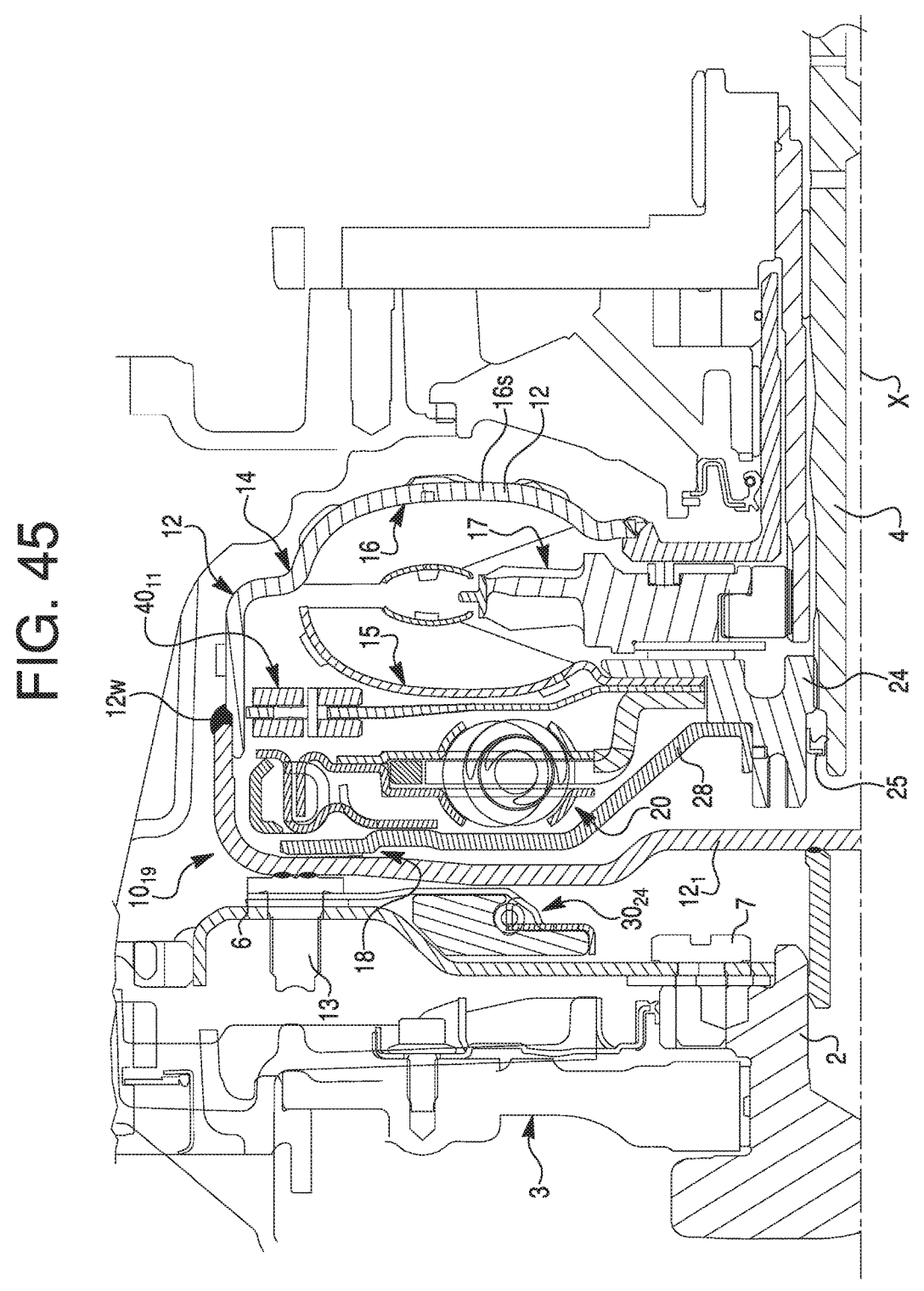
Figure 46:
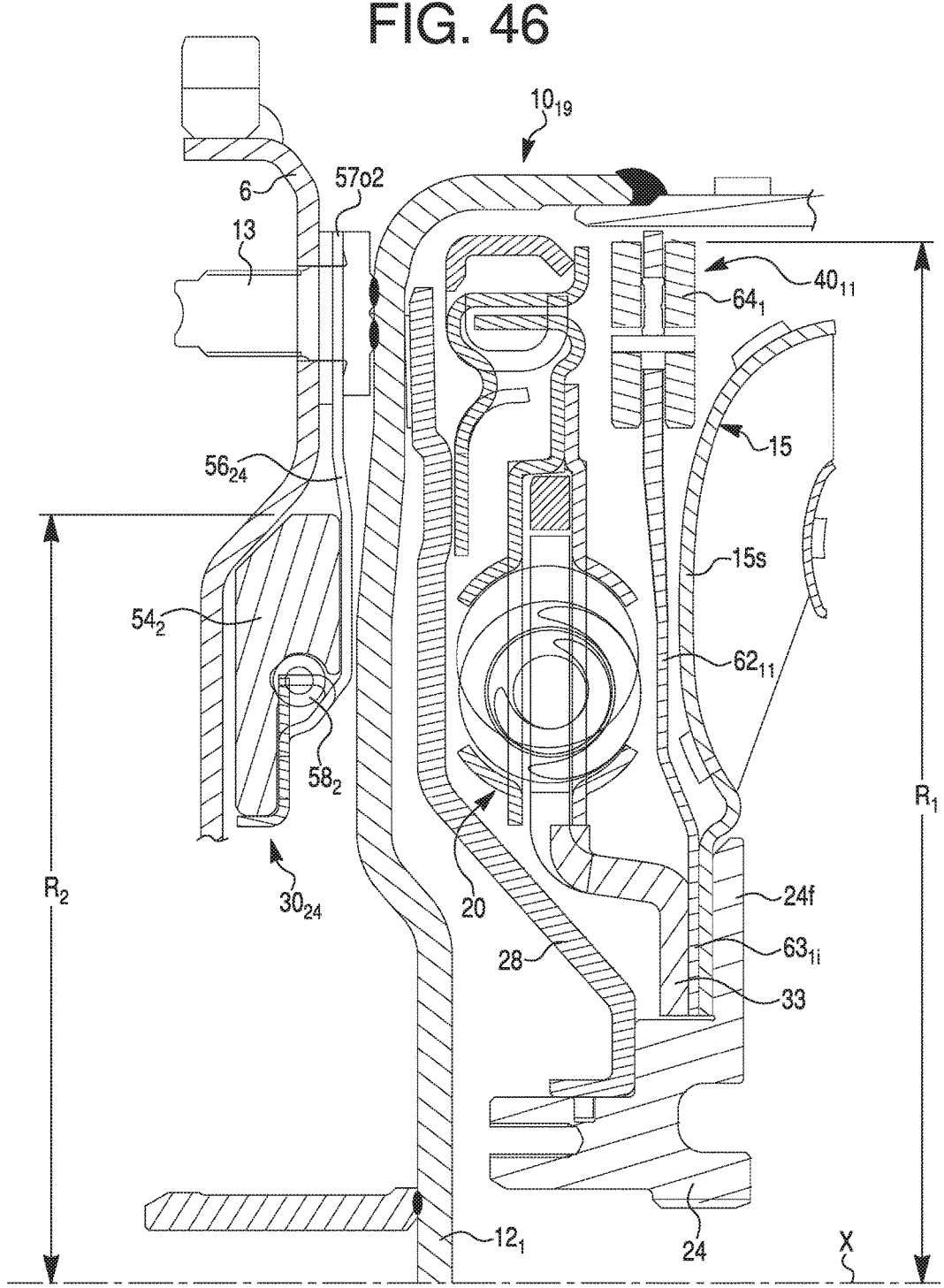
FIG. 46 is a fragmentary cross-sectional half-view of a torsional vibration damper and first and second vibration absorbers of the hydrokinetic torque coupling device in accordance with the nineteenth exemplary embodiment of the present invention.

A hydrokinetic torque coupling device $10_{19}$ of a nineteenth exemplary embodiment is illustrated in FIGS. 45-46. The hydrokinetic torque coupling device $10_{19}$ of FIGS. 45-46 corresponds substantially to the hydrokinetic torque coupling device $10_9$ of FIGS. 25-26, where the dynamic absorber $30_1$ is replaced by a centrifugal pendulum oscillator $40_{11}$. Thus, the torque coupling device $10_{19}$ of the nineteenth exemplary embodiment comprises a hydrodynamic torque converter 14, a lock-up clutch 18, a torsional vibration damper 20, a first vibration absorber in the form of a centrifugal pendulum oscillator $40_{11}$, described in detail in the eleventh exemplary embodiment illustrated in FIGS. 29-30, and a second vibration absorber in the form of a dynamic absorber $30_{24}$, described in detail in the ninth exemplary embodiment illustrated in FIGS. 25-26. According to the present invention, the centrifugal pendulum oscillator $40_{11}$ and the dynamic absorber $30_{24}$ are tuned to address different orders of vibrations. In other words, the centrifugal pendulum oscillator $40_{11}$ is substantially identical to the centrifugal pendulum oscillator according to the eleventh exemplary embodiment illustrated in FIGS. 29-30, while the dynamic absorber $30_{24}$ is substantially identical to the second dynamic absorber according to the ninth exemplary embodiment illustrated in FIGS. 25-26.

Furthermore, the mass $M_1$ of the flyweights $64_1$ of the centrifugal pendulum oscillator $40_{11}$ is different than the mass $M_2$ of the inertial member $54_2$ of the dynamic absorber $30_{24}$, while the outer radius $R_1$ of the flyweights $64_1$ is greater than an outer radius $R_2$ of the inertial member $54_2$, as best shown in FIG. 46. In other words, a radius of a center of gravity of the flyweights $64_1$ of the centrifugal pendulum oscillator $40_{11}$ is greater than a radius of a center of gravity of the inertial member $54_2$ of the dynamic absorber $30_{24}$. Accordingly, the centrifugal pendulum oscillator $40_{11}$ and the dynamic absorber $30_{24}$ are tuned to address different orders of vibrations.

An exemplary method for assembling the hydrokinetic torque coupling device $10_{19}$ according to the embodiment of FIGS. 45-46 will now be explained. The torque converter 14 including the turbine wheel 15, the impeller wheel 16 and the stator 17, the torsional vibration damper 20, the dynamic absorber $30_{24}$ and the centrifugal pendulum oscillator $40_{11}$ may each be preassembled. The torsional vibration damper 20 and the centrifugal pendulum oscillator $40_{11}$ are mounted to the turbine hub 24 and fixed to the turbine wheel 15. Specifically, the turbine shell 15s of the turbine wheel 15, the support member $62_{11}$ of the centrifugal pendulum oscillator $40_{11}$ and the flange 33 of the driven member 32 of the torsional vibration damper 20 are non-movably (i.e., fixedly) secured to the flange 24f of the turbine hub 24, as best shown in FIGS. 29 and 30, by appropriate means, such as by rivets or welding. Then, the turbine wheel 15, the impeller wheel 16, and the stator 17 are assembled together so as to form the torque converter 14. Then, the locking piston 28 is slidably mounted to the turbine hub 24.

Next, the first casing shell $12_1$ is fixed to the second casing shell $12_2$ of the casing 12 by sealing weld 12w at their outer peripheries so that the torque converter 14 with the torsional vibration damper 20 and the centrifugal pendulum oscillator $40_{11}$ is sealed within the casing 12, while the dynamic absorber $30_{24}$ is disposed outside the casing 12. After that, the stud bolts 13 are fixedly secured, such as by welding, to the first casing shell $12_1$ of the casing 12. Next, the connecting plate $56_{24}$ of the second dynamic absorber $30_{24}$ is non-movably (i.e., fixedly) attached to both the first casing shell $12_1$ of the casing 12 and the radially outer end of the flexplate 6 by the stud bolts 13 extending through the apertures in the radially outer end $57o_2$ of the connecting plate $56_{24}$. Then, the radially inner end of the flexplate 6 is non-rotatably connected to the crankshaft 2 by the one or more threaded fasteners 7.

A hydrokinetic torque coupling device $10_{20}$ of a twentieth exemplary embodiment is illustrated in FIGS. 47-48. The hydrokinetic torque coupling device $10_{20}$ of FIGS. 47-48 corresponds substantially to the hydrokinetic torque coupling device $10_{10}$ of FIGS. 27-28, where the dynamic absorber $30_1$ is replaced by a centrifugal pendulum oscillator $40_{11}$. Thus, the torque coupling device $10_{20}$ of the twentieth exemplary embodiment comprises a hydrodynamic torque converter 14, a lock-up clutch 18, a torsional vibration damper 20, a first vibration absorber in the form of a centrifugal pendulum oscillator $40_{11}$, described in detail in the eleventh exemplary embodiment illustrated in FIGS. 29-30, and a second vibration absorber in the form of a dynamic absorber $30_{25}$, described in detail in the ninth exemplary embodiment illustrated in FIGS. 27-28. According to the present invention, the centrifugal pendulum oscillator $40_{11}$ and the dynamic absorber $30_{25}$ are tuned to address different orders of vibrations. In other words, the centrifugal pendulum oscillator $40_{11}$ is substantially identical to the centrifugal pendulum oscillator according to the eleventh exemplary embodiment illustrated in FIGS. 29-30, while the dynamic absorber $30_{25}$ is substantially identical to the second dynamic absorber according to the tenth exemplary embodiment illustrated in FIGS. 27-28.

Furthermore, the mass $M_1$ of the flyweights $64_1$ of the centrifugal pendulum oscillator $40_{11}$ is different than the mass $M_2$ of the inertial member $54_2$ of the dynamic absorber $30_{25}$, while the outer radius $R_1$ of the flyweights $64_1$ is greater than an outer radius $R_2$ of the inertial member $54_2$, as best shown in FIG. 48. In other words, a radius of a center of gravity of the flyweights $64_1$ of the centrifugal pendulum oscillator $40_{11}$ is greater than a radius of a center of gravity of the inertial member $54_2$ of the dynamic absorber $30_{25}$. Accordingly, the centrifugal pendulum oscillator $40_{11}$ and the dynamic absorber $30_{25}$ are tuned to address different orders of vibrations.

An exemplary method for assembling the hydrokinetic torque coupling device $10_{20}$ according to the embodiment of FIGS. 47-48 will now be explained. The torque converter 14 including the turbine wheel 15, the impeller wheel 16 and the stator 17, the torsional vibration damper 20, the dynamic absorber $30_{25}$ and the centrifugal pendulum oscillator $40_{11}$ may each be preassembled. The torsional vibration damper 20 and the centrifugal pendulum oscillator $40_{11}$ are mounted to the turbine hub 24 and fixed to the turbine wheel 15. Specifically, the turbine shell 15s of the turbine wheel 15, the support member $62_{11}$ of the centrifugal pendulum oscillator $40_{11}$ and the flange 33 of the driven member 32 of the torsional vibration damper 20 are non-movably (i.e., fixedly) secured to the flange 24f of the turbine hub 24, as best shown in FIGS. 29 and 30, by appropriate means, such as by rivets or welding. Then, the turbine wheel 15, the impeller wheel 16, and the stator 17 are assembled together so as to form the torque converter 14. Then, the locking piston 28 is slidably mounted to the turbine hub 24.

Next, the first casing shell $12_1$ is fixed to the second casing shell $12_2$ of the casing 12 by sealing weld 12w at their outer peripheries so that the torque converter 14 with the torsional vibration damper 20 and the centrifugal pendulum oscillator $40_{11}$ is sealed within the casing 12, while the dynamic absorber $30_{25}$ is disposed outside the casing 12. After that, the stud bolts 13 are fixedly secured, such as by welding, to the first casing shell $12_1$ of the casing 12. Next, the connecting plate $56_{25}$ of the dynamic absorber $30_{25}$ is non-movably (i.e., fixedly) attached to both the crankshaft 2 and the radially inner end of the flexplate 6 by the threaded fasteners 7 extending through the apertures in the radially inner end $57i_2$ of the connecting plate $56_{25}$. Then, a radially outer end of the flexplate 6 is non-rotatably connected to the first casing shell $12_1$ of the casing 12 through the stud bolts 13.

The foregoing description of the exemplary embodiment (s) of the present invention has been presented for the purpose of illustration in accordance with the provisions of the Patent Statutes. It is not intended to be exhaustive or to limit the invention to the precise forms disclosed. The embodiments disclosed hereinabove were chosen in order to best illustrate the principles of the present invention and its practical application to thereby enable those of ordinary skill in the art to best utilize the invention in various embodiments and with various modifications as suited to the particular use contemplated, as long as the principles described herein are followed. This application is therefore intended to cover any variations, uses, or adaptations of the invention using its general principles. Further, this application is intended to cover such departures from the present disclosure as come within known or customary practice in the art to which this invention pertains. Thus, changes can be made in the above-described invention without departing from the intent and scope thereof. It is also intended that the scope of the present invention be defined by the claims appended thereto.

What is claimed is:

1. A hydrokinetic torque coupling device for coupling together a driving shaft and a driven shaft, the torque coupling device comprising:
   a hollow casing including a cover shell and an impeller shell non-movably secured to the cover shell;
   an impeller wheel coaxially aligned with a rotation axis and including the impeller shell;
   a turbine wheel coaxially aligned with and drivable by the impeller wheel;
   a torsional vibration damper;
   a turbine hub non-rotatably connected to the turbine wheel;
   a locking piston slidably mounted to the turbine hub and forming an input part of the torsional vibration damper;
   a first vibration absorber and a second vibration absorber, each of the first and second vibration absorbers being one of a dynamic absorber and a centrifugal pendulum oscillator;
   the torsional vibration damper comprising:
      a first retainer plate rotatable about the rotation axis;
      a driven member rotatable relative to the first retainer plate coaxially with the rotation axis; and
      a plurality of damper elastic members interposed between the first retainer plate and the driven member, the damper elastic members elastically coupling the first retainer plate to the driven member;
   the turbine hub non-rotatably coupled to the driven member of the torsional vibration damper;
   the first vibration absorber being mounted to the turbine hub;
   the second vibration absorber being mounted to the turbine hub and disposed axially between the cover shell and the locking piston;
   the first vibration absorber and the second vibration absorber tuned to damp different orders of vibration.

2. The hydrokinetic torque coupling device as defined in claim 1, wherein the torsional vibration damper and the first vibration absorber are disposed within the casing.

3. The hydrokinetic torque coupling device as defined in claim 1, wherein the second vibration absorber is disposed within the casing.

4. The hydrokinetic torque coupling device as defined in claim 1, wherein the first vibration absorber is the dynamic absorber and the second vibration absorber is the centrifugal pendulum oscillator.

5. The hydrokinetic torque coupling device as defined in claim 4, wherein the dynamic absorber includes an inertial member and a connecting plate coupled to the inertial member, wherein the centrifugal pendulum oscillator includes a support member and at least one pair of first and second flyweights configured to oscillate with respect to the support member in a rotation plane orthogonal to the rotation axis, wherein the first and second flyweights are mounted on axially opposite sides of the support member and connected axially to one another, and wherein both the connecting plate of the first vibration absorber and the support member of the second vibration absorber are non-rotatably connected to the turbine hub.

6. The hydrokinetic torque coupling device as defined in claim 1, wherein the first vibration absorber is the centrifugal pendulum oscillator and the second vibration absorber is the dynamic absorber.

7. The hydrokinetic torque coupling device as defined in claim 6, wherein the dynamic absorber includes an inertial member and a connecting plate coupled to the inertial member, wherein the centrifugal pendulum oscillator includes a support member and at least one pair of first and second flyweights configured to oscillate with respect to the support member in a rotation plane orthogonal to the rotation axis, wherein the first and second flyweights are mounted on axially opposite sides of the support member and connected axially to one another, and wherein both the support member of the first vibration absorber and the connecting plate of the second vibration absorber are non-rotatably connected to the turbine hub.

8. The hydrokinetic torque coupling device as defined in claim 1, wherein both the first and second vibration absorbers are dynamic absorbers.

9. The hydrokinetic torque coupling device as defined in claim 8, wherein the dynamic absorber includes an inertial member and a connecting plate coupled to the inertial member, and wherein the connecting plates of both the first and second vibration absorbers are non-rotatably connected to the turbine hub.

10. The hydrokinetic torque coupling device as defined in claim 1, wherein both the first and second vibration absorbers are centrifugal pendulum oscillators.

11. The hydrokinetic torque coupling device as defined in claim 10, wherein the centrifugal pendulum oscillator includes a support member and at least one pair of first and second flyweights configured to oscillate with respect to the support member in a rotation plane orthogonal to the rotation axis, wherein the first and second flyweights are mounted on axially opposite sides of the support member and connected axially to one another, and wherein the support members of both the first and second vibration absorbers are non-rotatably connected to the turbine hub.

12. The hydrokinetic torque coupling device as defined in claim 1, wherein a radially inner portion of the second vibration absorber is attached to an axial end portion of the turbine hub facing the casing.

13. An internal combustion engine in combination with a hydrokinetic torque coupling device, the engine comprising:
a driving shaft rotatable about a rotation axis;
the torque coupling device configured for drivingly coupling together the driving shaft and a driven shaft, the torque coupling device comprising:
a hydrodynamic torque converter including a hollow casing non-rotatably coupled to the driving shaft, an impeller wheel coaxial with the rotation axis and including an impeller shell, and a turbine wheel coaxial with and drivable by the impeller wheel,
a torsional vibration damper,
a turbine hub non-rotatably connected to the turbine wheel,
a locking piston slidably mounted to the turbine hub and forming an input part of the torsional vibration damper, and
first and second vibration absorbers, each of the first and second vibration absorbers being one of a dynamic absorber and a centrifugal pendulum oscillator;
the torsional vibration damper comprising:
a first retainer plate rotatable about the rotation axis,
a driven member rotatable relative to the first retainer plate coaxially with the rotation axis, and
a plurality of damper elastic members interposed between the first retainer plate and the driven member, the damper elastic members elastically coupling the first retainer plate to the driven member;
the hollow casing including a cover shell and the impeller shell non-movably secured to the cover shell;
the turbine hub non-rotatably coupled to the driven member of the torsional vibration damper;
the turbine wheel, the turbine hub, the torsional vibration damper and the first vibration absorber disposed within the casing;
the first vibration absorber being mounted to the turbine hub,
the second vibration absorber being mounted to the turbine hub and disposed axially between the cover shell and the locking piston;
the first vibration absorber and the second vibration absorber tuned to damp different orders of vibration.

\* \* \* \* \*